US012793364B2

(12) United States Patent
Ahn et al.

(10) Patent No.: US 12,793,364 B2
(45) Date of Patent: Nov. 10, 2026

(54) WEARABLE DEVICE FOR CHANGING UI FOR INTERACTION ON BASIS OF EXTERNAL OBJECT, AND METHOD THEREFOR

(71) Applicant: SAMSUNG ELECTRONICS CO., LTD., Suwon-si (KR)

(72) Inventors: Stephanie Ahn, Suwon-si (KR); Sooryuh Kim, Suwon-si (KR); Eunyoung Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/267,170

(22) Filed: Jul. 11, 2025

(65) Prior Publication Data

US 2025/0342670 A1 Nov. 6, 2025

Related U.S. Application Data

(63) Continuation of application No. PCT/KR2024/000572, filed on Jan. 11, 2024.

(30) Foreign Application Priority Data

Jan. 12, 2023 (KR) ........................ 10-2023-0004528
Feb. 2, 2023 (KR) ........................ 10-2023-0014488
Jan. 10, 2024 (KR) ........................ 10-2024-0004369

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06F 3/017* (2013.01);
(Continued)

(58) Field of Classification Search
CPC ........ G06F 3/04842; G06F 1/16; G06F 1/163; G06F 3/00; G06F 3/01; G06F 3/011;
(Continued)

(56) References Cited

U.S. PATENT DOCUMENTS 9,971,415 B2 5/2018 Poupyrev et al.
10,185,399 B2 1/2019 Niinuma et al.
(Continued)

FOREIGN PATENT DOCUMENTS

JP 6596883 B2 10/2019
KR 10-2017-0074161 A 6/2017
(Continued)

OTHER PUBLICATIONS

International Search Report (PCT/ISA/210) and Written Opinion (PCT/ISA/237) issued Apr. 25, 2024 by the International Searching Authority in International Patent Application No. PCT/KR2024/000572.

(Continued)

*Primary Examiner* — Deeprose Subedi
(74) *Attorney, Agent, or Firm* — Sughrue Mion, PLLC

(57) ABSTRACT

A method of a wearable device, includes: obtaining an image with respect to external environment; displaying a first visual object in a state of displaying at least a portion of the image with respect to the external environment; based on a signal being received from an external electronic device connected through communication circuitry while the first visual object is displayed, controlling a function of the first visual object based on whether an input to control the first visual object is received through the external electronic device; based on identifying a body part having a first posture facing the first visual object while the first visual object is displayed: changing the first visual object to a second visual object corresponding to a shape of the body (Continued)

part; and based on identifying a second posture of the body part about the second visual object, controlling the function of the first visual object.

20 Claims, 27 Drawing Sheets

(51) Int. Cl.

| | |
|---|---|
| ***G06F 3/04815*** | (2022.01) |
| ***G06F 3/0485*** | (2022.01) |
| ***G06V 20/20*** | (2022.01) |
| ***G06V 40/10*** | (2022.01) |
| ***G06V 40/20*** | (2022.01) |

(52) U.S. Cl.
CPC ........ *G06F 3/04815* (2013.01); *G06F 3/0485* (2013.01); *G06V 20/20* (2022.01); *G06V 40/10* (2022.01); *G06V 40/28* (2022.01); *G06T 2200/24* (2013.01)

(58) Field of Classification Search
CPC .. G06F 3/017; G06F 3/04815; G06F 3/04847; G06F 3/0485; G06F 3/04855; G06T 19/006; G06T 2200/24; G02B 27/017; G02B 2027/0138; G06V 20/20; G06V 40/10; G06V 40/28; G11B 27/031
See application file for complete search history.

(56) References Cited

U.S. PATENT DOCUMENTS

| | | | | |
|---|---|---|---|---|
| 10,521,025 | B2 | 12/2019 | Powderly et al. | |
| 10,521,026 | B2 | 12/2019 | Balan et al. | |
| 10,606,344 | B2 | 3/2020 | Faaborg et al. | |
| 11,144,115 | B2 | 10/2021 | Herling et al. | |
| 11,538,443 | B2 | 12/2022 | Woo et al. | |
| 11,635,805 | B2 | 4/2023 | Lee et al. | |
| 2015/0324001 | A1 | 11/2015 | Yanai et al. | |
| 2021/0192854 | A1* | 6/2021 | Ryu | G06T 7/73 |
| 2023/0325006 | A1 | 10/2023 | Kim et al. | |
| 2024/0111358 | A1 | 4/2024 | Ishihara et al. | |
| 2024/0329755 | A1 | 10/2024 | Powderly et al. | |

FOREIGN PATENT DOCUMENTS

| | | | |
|---|---|---|---|
| KR | 10-2018-0070681 | A | 6/2018 |
| KR | 10-2018-0071398 | A | 6/2018 |
| KR | 10-2003493 | B1 | 7/2019 |
| KR | 10-2020-0076325 | A | 6/2020 |
| KR | 10-2021-0091662 | A | 7/2021 |
| KR | 10-2022-0087104 | A | 6/2022 |
| KR | 10-2743763 | B1 | 12/2024 |

OTHER PUBLICATIONS

"Interactive Objects", Feb. 19, 2025. (14 pages total).
Communication dated Mar. 25, 2026, issued by the European Patent Office in European Application No. 24741737.1.

* cited by examiner

WEARABLE DEVICE FOR CHANGING UI FOR INTERACTION ON BASIS OF EXTERNAL OBJECT, AND METHOD THEREFOR

CROSS-REFERENCE TO RELATED APPLICATIONS

This application is a by-pass continuation application of International Application No. PCT/KR2024/000572, filed on Jan. 11, 2024, which is based on and claims priority to Korean Patent Application No. 10-2023-0004528, filed on Jan. 12, 2023, Korean Patent Application No. 10-2023-0014488, filed on Feb. 2, 2023, and Korean Patent Application No. 10-2024-0004369, filed on Jan. 10, 2024, in the Korean Intellectual Property Office, the disclosures of which are incorporated by reference herein their entireties.

BACKGROUND

1. Field

The present disclosure relates to a wearable device for changing a user interface (UI) for interaction based on an external object and a method therefor.

2. Description of Related Art

In order to provide enhanced user experience, an electronic device has been developed to provide an augmented reality (AR) service that displays information generated by a computer in association with an external object in the real-world. The electronic device may be a wearable device worn by a user. For example, the electronic device may be AR glasses and/or a head-mounted device (HMD).

SUMMARY

According to an aspect of the disclosure, a wearable device includes: communication circuitry; a camera; a display; memory, comprising one or more storage mediums, storing instructions; and at least one processor, wherein the instructions, when executed by the at least one processor individually or collectively, cause the wearable device to: obtain an image with respect to external environment using the camera; display a first visual object in a state of displaying at least a portion of the image with respect to the external environment in the display; and based on a signal being received from an external electronic device connected through the communication circuitry while the first visual object is displayed, control a function of the first visual object based on whether an input to control the first visual object is received through the external electronic device; based on identifying a body part having a first posture facing the first visual object while the first visual object is displayed: change the first visual object to a second visual object corresponding to a shape of the body part; and based on identifying, using the camera, a second posture of the body part associated with the second visual object, control the function of the first visual object.

According to an aspect of the disclosure, a method of a wearable device, includes: obtaining, using a camera of the wearable device, an image with respect to external environment; displaying, by a display of the wearable device, a first visual object in a state of displaying at least a portion of the image with respect to the external environment; based on a signal being received from an external electronic device connected through communication circuitry of the wearable device while the first visual object is displayed, controlling a function of the first visual object based on whether an input to control the first visual object is received through the external electronic device; based on identifying a body part having a first posture facing the first visual object while the first visual object is displayed: changing the first visual object to a second visual object corresponding to a shape of the body part; and based on identifying, using the camera, a second posture of the body part associated with the second visual object, controlling the function of the first visual object.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
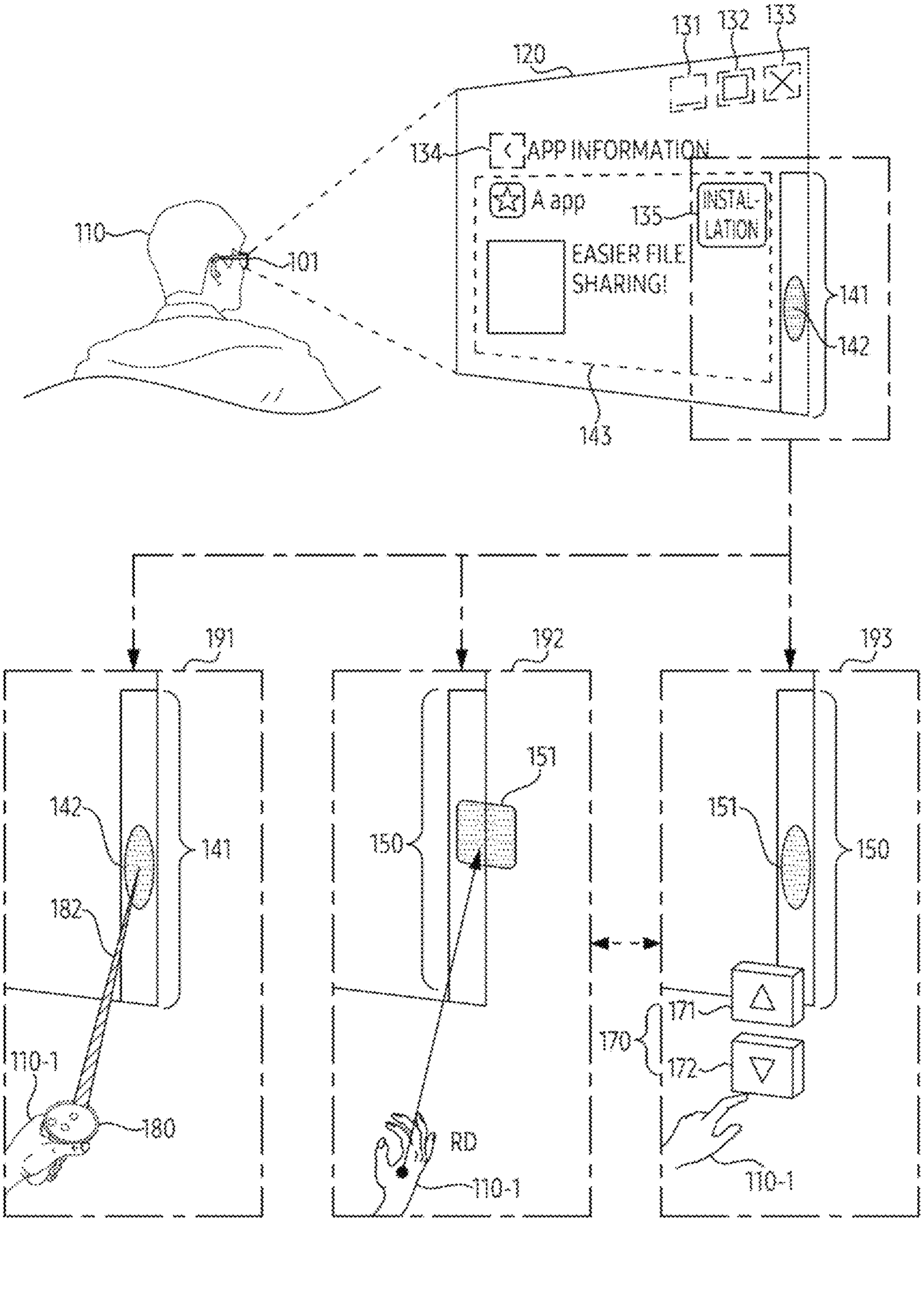
FIG. 1 illustrates an example of an operation in which a wearable device displays a screen, according to an embodiment.

Hereinafter, various embodiments of the present disclosure will be described with reference to the accompanying drawings.

The various embodiments of the present disclosure and terms used herein are not intended to limit the technology described in the present disclosure to specific embodiments, and should be understood to include various modifications, equivalents, or substitutes of the corresponding embodiment. In relation to the description of the drawings, a reference numeral may be used for a similar component. A singular expression may include a plural expression unless it is clearly meant differently in the context. In the present disclosure, an expression such as "A or B", "at least one of A and/or B", "A, B or C", or "at least one of A, B and/or C", and the like may include all possible combinations of items listed together. Expressions such as "1st", "2nd", "first" or "second", and the like may modify the corresponding components regardless of order or importance, is only used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the present disclosure may include a unit configured with hardware, software, firmware, or combinations thereof and may be used interchangeably with terms such as logic, logic block, component, or circuit, and the like. The module may be an integrally configured component or a minimum unit or part thereof that performs one or more functions. For example, a module may be configured with an application-specific integrated circuit (ASIC). For example, a module may be computer codes or a computer code.

FIG. 1 illustrates an example of an operation in which a wearable device 101 displays a screen 120 according to an embodiment. In an embodiment, the wearable device 101 may include a head-mounted display (HMD) wearable on a head of a user 100. Although an external appearance of the wearable device 101 having a shape of glasses is illustrated, embodiments of the present disclosure are not limited thereto. An example of one or more hardware included in the wearable device 101 is described exemplarily with reference to FIG. 2. An example of a structure of the wearable device 101 wearable on the head of the user 110 is described with reference to FIGS. 16A and 16B and/or 17A and 17B. The wearable device 101 may be referred to as an electronic device. For example, the electronic device may form an HMD by being coupled with an accessory to be attached to the user's head.

According to an embodiment, the wearable device 101 may execute a function related to a video see-through (VST) and/or virtual reality (VR). Referring to FIG. 1, in a state that the user 110 wears the wearable device 101, the wearable device 101 may include a housing covering the user 110's eyes. The wearable device 101 may include a display disposed on a first surface of the housing facing the eye in the state. The wearable device 101 may include a camera disposed on a second surface opposite to the first surface. Using the camera, the wearable device 101 may obtain frames including ambient light. The wearable device 101 may output the frames in a display disposed on the first surface so that the user 110 recognizes the ambient light through the display. A display area of the display disposed on the first surface may be formed by one or more pixels included in the display. The wearable device 101 may synthesize a virtual object in frames outputted through the display so that the user 110 recognizes the virtual object together with a real object recognized by ambient light.

According to an embodiment, the wearable device 101 may execute a function related to augmented reality (AR) and/or mixed reality (MR). As shown in FIG. 1, in a state that the user 110 wears the wearable device 101, the wearable device 101 may include at least one lens disposed adjacent to the user 110's eyes. The wearable device 101 may combine ambient light passing through a lens with light emitted from the display of the wearable device 101. A display area of the display may be formed in a lens through which ambient light passes. Since the wearable device 101 combines the ambient light and the light emitted from the display, the user 110 may see an image in which a real object recognized by the ambient light and a virtual object formed by the light emitted from the display are mixed.

Referring to FIG. 1, according to an embodiment, the wearable device 101 may display a screen 120 having a sense of perspective by using binocular disparity. The wearable device 101 may project light including the screen 120 displayed at different positions to the two eyes of the user 110 wearing the wearable device 101, based on the binocular disparity. The screen 120 may include a window (e.g., activity) and/or a widget (or gadget) provided from a program (e.g., a software application) executed by the wearable device 101. The wearable device 101 may display a screen 120 floating in a field-of-view (FoV) of the user 110 by using the binocular disparity. For example, when the user uses the wearable device 101 for AR services, the wearable device 101 may display the screen 120 overlapped on the image, in a state that displaying at least a portion of an image for external environment. The image may be obtained using a camera. When providing a user experience based on VR, the wearable device 101 may display a screen 120 that does not include the image.

According to an embodiment, the wearable device 101 may display, within the screen 120, one or more visual objects. A visual object may mean an object deployable within a screen for transmission and/or interaction of information, such as text, image, icon, video, button, check box, radio button, text box, slider, time picker, progress bar, and/or table. The visual object may be referred to as a virtual object, visual elements, a user interface (UI) and/or a UI element.

FIG. 1 illustrates one or more visual objects included in a screen 120. The wearable device 101 may arrange one or more visual objects within the screen 120, based on execution of an application corresponding to the screen 120. For example, when a designated 'application programming interface' (API) is called by execution of instructions included in the application, the wearable device 101 may arrange at least one visual object on the screen 120, based on one or more parameters referenced by the designated API.

For example, the wearable device 101 may display buttons 131, 132, and 133 for controlling the screen 120, as visual objects. For example, the wearable device 101 may display a button 134 (e.g., a backward button) for switching the screen 120 as a visual object. For example, the wearable device 101 may display a button 135 for executing a function set by an application as a visual object. For example, the wearable device 101 may display a scroll bar 141 for scrolling information as a visual object. The scroll bar 141 may be matched to a portion 143 of the screen 120. For example, based on an input related to the scroll bar 141, the wearable device 101 may perform scrolling on information displayed through the portion 143. Based on the scrolling, the wearable device 101 may move information displayed through the portion 143. The wearable device 101 may visualize a position within the information of a portion of the information displayed through the portion 143, by using a handle 142 overlapped on the scroll bar 141.

According to an embodiment, the wearable device 101 may interact with the user 110 through different input means. For example, the wearable device 101 may identify a gesture and/or motion of the user 110 identified by an external electronic device 180 by communicating with the external electronic device 180. The external electronic device 180 may be referred to as a remote controller. The embodiment is not limited thereto, and the wearable device 101 may recognize a hand 110-1 of the user 110. Recognizing the hand 110-1 by the wearable device 101 may be performed by an image and/or a video obtained from a camera included in the wearable device 101. Recognizing the hand 110-1 by the wearable device 101 may include an operation of obtaining information indicating a position, a posture, and/or a shape of the hand 110-1 from the image and/or the video. An operation in which the wearable device 101 obtains the information by recognizing the hand 110-1 will be described with reference to FIG. 3.

According to an embodiment, the wearable device 101 may provide multiple input means (or multiple input modes) to the user. For example, the wearable device 101 may display a screen 120 suitable for an interaction between the user 110 and the wearable device 101 based on the identified input means by changing and/or replacing a visual object in the screen 120. In an example case of FIG. 1 in which the scroll bar 141 is displayed, the wearable device 101 may replace and/or deform the scroll bar 141 according to input means. The different states 191, 192, and 193 of FIG. 1 may be classified according to the input means identified by the wearable device 101.

Referring to FIG. 1, in a state of identifying the external electronic device 180, the wearable device 101 may perform, based on a position and/or motion of the external electronic device 180, an operation for guiding an interaction between the wearable device 101 and the user 110 based on the external electronic device 180. Referring to the state 191 of FIG. 1, the operation may include an operation of displaying a ray 182 indicating a reference direction based on a position and/or a direction of the external electronic device 180 within an external space. The ray 182 may be displayed along an axis extending by a shape of the external electronic device 180 from a point of the external electronic device 180. The ray 182 may be displayed by the wearable device 101 to inform the user 110 of an object controlled by the external electronic device 180. In terms of a shape extending from a side of the external electronic device 180, the ray 182 may be referred to as a line and/or a pointer.

Referring to FIG. 1, the wearable device 101 (identifying the external electronic device 180 which is an example of a remote controller) may identify motion of the user 110 by using a signal received from the external electronic device 180. In the state 191, the wearable device 101 may receive, from the external electronic device 180, a signal indicating that the external electronic device 180 faces the scroll bar 141 of the screen 120. In the state 191 of displaying the ray 182 facing the scroll bar 141 based on the signal, the wearable device 101 may execute a function related to the scroll bar 141, in response to another signal notifying that at least one button included in the external electronic device 180 is pressed. For example, based on the other signals indicating a click and/or a drag on the handle 142 overlapped on the scroll bar 141, the wearable device 101 may perform movement of the handle 142 and/or scrolling on the information included in the portion 143. For example, the wearable device 101 identifying the external electronic device 180 may perform, while maintaining the display of the scroll bar 141, scrolling on the scroll bar 141 and/or the portion 143 by using a signal of the external electronic device 180.

According to an embodiment, based on input means for controlling the wearable device 101, the wearable device 101 may replace and/or change a visual object in the screen 120 with another visual object corresponding to the changed input means. In the state 192 of FIG. 1, the wearable device 101 may identify the hand 110-1 from among the external electronic device 180 and the hand 110-1. Based on identifying a body part including the hand 110-1, the wearable device 101 may replace the scroll bar 141 and/or the handle 142. In the example state 192 of FIG. 1, the wearable device 101 may replace the scroll bar 141 and/or the handle 142 with a scroll bar 150 and a handle 151. The wearable device 101 may perform the replacement of the scroll bar 150 and the handle 151, in response to identifying the hand 110-1 having a second direction RD facing the scroll bar 141.

Referring to FIG. 1, a visual object displayed by the wearable device 101 based on the identification of the hand 110-1 may be classified by a shape of the hand 110-1. When no fingers are in contact with each other or are folded, as in a shape of the hand 110-1 shown in the state 192, the wearable device 101 may display the scroll bar 150 and the handle 151. Referring to the state 193 of FIG. 1, the wearable device 101 that identifies the hand 110-1 including an index finger that is spread toward the scroll bar 141 may display a group 170 of buttons 171 and 172 adjacent to a fingertip of the index finger, by using binocular disparity corresponding to a position of the index finger. Embodiments are not limited thereto, and whether the wearable device 101 displays the group 170 may depend on a distance of the user 110 and the scroll bar 150.

Referring to the state 192 of FIG. 1, at least one of the scroll bar 150, the handle 151, or the group 170 displayed by the wearable device 101 may have a shape of the hand 110-1 and/or a shape related to a gesture. For example, a width of the scroll bar 150 displayed by the identification of the hand 110-1 may be greater than a width of the scroll bar 141. For example, the handle 151 may be deformed by a gesture caused by deformation of the hand 110-1. For example, based on identifying a gesture (e.g., pinch gesture) in which fingertips of at least two fingers (e.g., thumb and another finger) included in the hand 110-1 are in contact, the wearable device 101 may change a shape of the handle 151 to a designated shape for guiding the identification of the gesture. For example, the buttons 171 and 172 of the group 170 may be deformed by movement of a fingertip of the hand 110-1. For example, when a fingertip of the index finger included in the hand 110-1 is moved longer than a designated distance toward a space where the button 172 is displayed, the wearable device 101 may visualize the pressing of the button 172 by the fingertip by deforming the button 172. An operation in which the wearable device 101 displays the scroll bar 150, the handle 151, and/or the group 170 in each of the states 192 and 193 will be described with reference to FIGS. 4A and 4B.

Although an embodiment in which the wearable device 101 reacts to different input means by deforming the scroll bar 141 has been described, embodiments are not limited thereto. A type of visual object that the wearable device 101 deforms by the input means is not limited to the scroll bar 141 of FIG. 1. For example, among visual objects capable of being displayed to the user 110, a category for classifying one or more visual objects for reacting to the user 110 may be set. While displaying a visual object (e.g., the scroll bar 141 of FIG. 1) included in the category, the wearable device 101 may change and/or replace the visual object based on input means identified by the wearable device 101. The following drawings and/or descriptions based on the drawings may relate to an operation of the wearable device 101 with respect to a visual object included in the category.

For example, an operation of the wearable device 101 displaying a visual object (e.g., an icon and/or a button) designed to react to a gesture of the user 110 for execution of a function is described with reference to FIGS. 5A and 5B. For example, an operation of the wearable device 101 displaying a visual object (e.g., slider) designed to react to a gesture of the user 110 for video search and/or input of a numerical value is described with reference to FIGS. 6A, 6B, and 6C. For example, an operation of the wearable device 101 displaying a visual object (e.g., a time picker) designed to react to a gesture of the user 110 for input of a time period is described with reference to FIGS. 7A and 7B. For example, an operation of the wearable device 101 with respect to a visual object displayed for a control of the screen 120, such as the buttons 131, 132, and 133, is described with reference to FIG. 8. For example, an operation of the wearable device 101 displaying a visual object (e.g., a switch) designed to react to a gesture of the user 110 for toggling of state and/or a numerical value is described with reference to FIGS. 9A, 9B, and 9C. For example, an operation of the wearable device 101 displaying a visual object (e.g., a cursor) displayed for text input is described with reference to FIGS. 10A and 10B.

As described above, according to an embodiment, the wearable device 101 may deform and/or replace a visual object (e.g., a scroll bar 141 and/or a handle 142) displayed to interact with the user 110, based on a shape and/or a position suitable for input means (e.g., the hand 110-1). For example, the wearable device 101 may deform, replace, or move the visual object according to input means. The movement of the visual object may include a change in distance sensation based on a change in binocular disparity. The deformation and/or replacement of the visual object by the wearable device 101 may be performed based on a sense of unity on the screen 120 including the visual object.

Hereinafter, an example of one or more hardware and/or software included in the wearable device 101 of FIG. 1 will be described with reference to FIG. 2.

Figure 2:
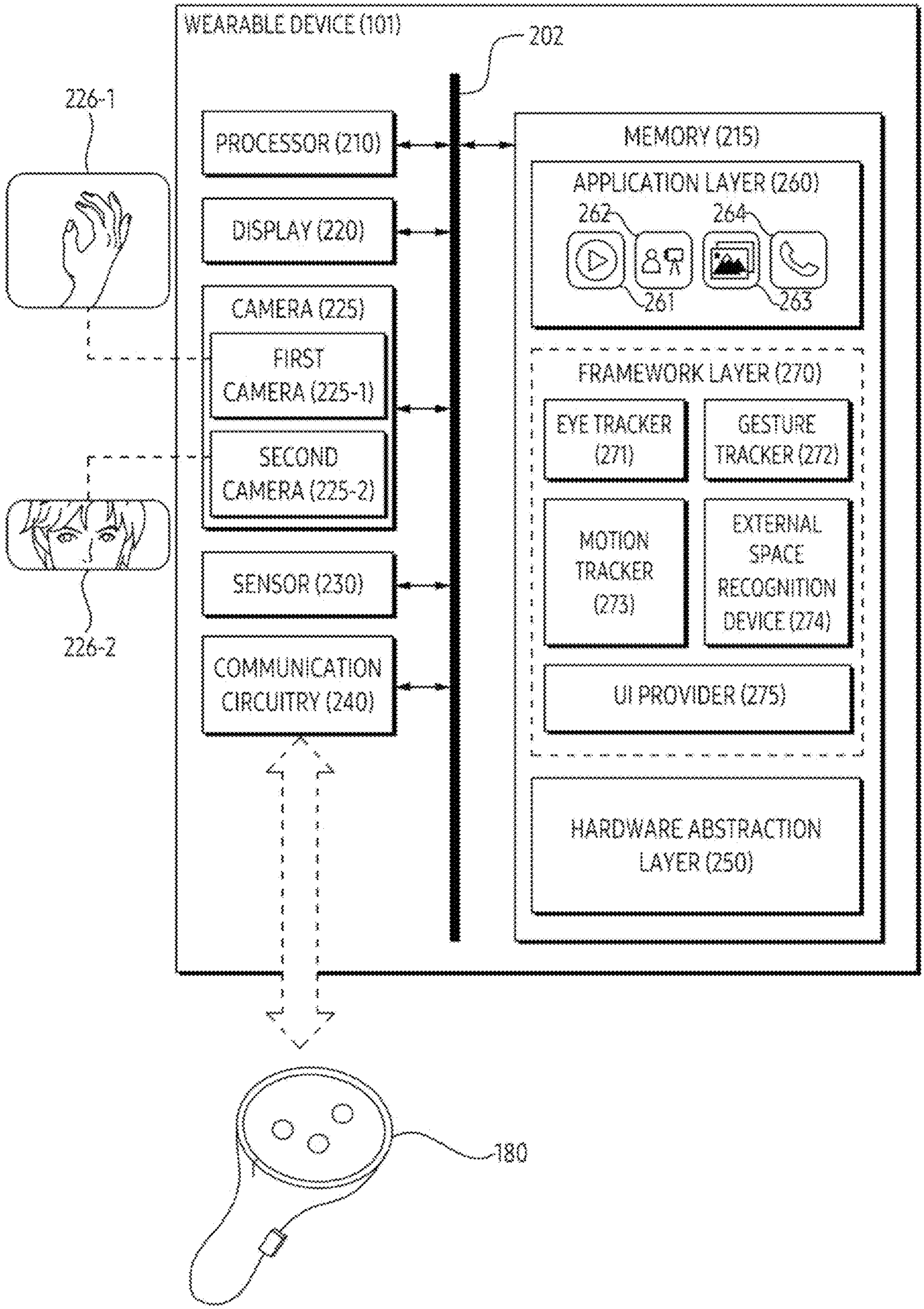
FIG. 2 illustrates an example of a block diagram of a wearable device according to an embodiment.

FIG. 2 illustrates an example of a block diagram of a wearable device 101 according to an embodiment. The wearable device 101 of FIG. 2 may include the wearable device 101 of FIG. 1. An external electronic device 180 of FIG. 2 may include the external electronic device 180 of FIG. 1.

According to an embodiment, the wearable device 101 may include at least one of a processor 210 (at least one processor), memory 215 (at least one memory), a display 220, a camera 225, a sensor 230, or communication circuitry 240. The processor 210, the memory 215, the display 220, the camera 225, the sensor 230, and the communication circuitry 240 may be electronically and/or operably coupled with each other by an electronic component such as a communication bus 202. Hereinafter, the hardware being operably coupled may mean that a direct connection or an indirect connection between hardware is established by wire or wirelessly so that a second hardware is controlled by a first hardware among the hardware. FIG. 2 illustrates different blocks for different components. However, the present disclosure is not limited to the above example embodiment of FIG. 2. For example, a portion of hardware of FIG. 2 (e.g., at least a portion of the processor 210, the memory 215, and the communication circuitry 240) may be included in a single integrated circuit such as a system on a chip (SoC). The type and/or number of hardware included in the wearable device 101 is not limited as illustrated in FIG. 2. For example, the wearable device 101 may include only a portion of hardware components illustrated in FIG. 2.

In an embodiment, the processor 210 of the wearable device 101 may include hardware for processing data based on one or more instructions. For example, the hardware for processing data may include an arithmetic and logic unit (ALU), a floating point unit (FPU), a field programmable gate array (FPGA), a central processing unit (CPU), and/or an application processor (AP). The processor 210 may have a single-core processor structure, or a multi-core processor structure such as a dual core, a quad core, or a hexa core.

In an embodiment, the memory 215 of the wearable device 101 may include a hardware component for storing data and/or instruction inputted to and/or outputted from the processor 210 of the wearable device 101. For example, the memory (215) may include volatile memory, such as random-access memory (RAM), and/or non-volatile memory, such as read-only memory (ROM). For example, the volatile memory may include at least one of a dynamic RAM (DRAM), a static RAM (SRAM), a Cache RAM, and a pseudo SRAM (PSRAM). For example, the nonvolatile memory may include at least one of a programmable ROM (PROM), an erasable PROM (EPROM), an electrically erasable PROM (EEPROM), a flash memory, a hard disk, a compact disc, a solid state drive (SSD), and an embedded multimedia card (eMMC).

In an embodiment, the display 220 of the wearable device 101 may output visualized information (e.g., screens of FIG. 1, FIG. 4A to FIG. 4B, FIG. 5A to FIG. 5B, FIG. 6A, FIG. 6B, and FIG. 6C, FIG. 7A to FIG. 7B, FIG. 8, FIG. 9A, FIG. 9B, and FIG. 9C and/or FIG. 11) to a user (e.g., the user 110 of FIG. 1). For example, the display 220 may be controlled by the processor 210 including a circuit such as a graphic processing unit (GPU) to output visualized information to the user. The display 220 may include a flat panel display (FPD) and/or electronic paper. The FPD may include a liquid crystal display (LCD), a plasma display panel (PDP), and/or one or more light emitting diodes (LEDs). The LED may include organic LED (OLED). The display 220 of FIG. 2 may include at least one display 1650 and 1750 to be described later with reference to FIGS. 16A and 16B, and/or FIGS. 17A and 17B.

In an embodiment, the camera 225 of the wearable device 101 may include one or more optical sensors (e.g., a charged coupled device (CCD) sensor, a complementary metal oxide semiconductor (CMOS) sensor) that generate an electrical signal indicating a color and/or brightness of light. A plurality of optical sensors included in the camera 225 may be arranged in a form of a 2 dimensional array. The camera 225 may generate 2-dimensional frame data corresponding to light reaching optical sensors of 2 two-dimensional array, by substantially simultaneously obtaining electric signals of each of the plurality of optical sensors. For example, photograph data captured using the camera 225 may mean a two-dimensional frame data obtained from the camera 225. For example, video data captured using the camera 225 may mean a sequence of a plurality of 2-dimensional frame data obtained from the camera 225 according to a frame rate. The camera 225 may further include a flash light, arranged toward a direction in which the camera 225 receives light, for outputting light toward the direction.

According to an embodiment, the wearable device 101 may include a first camera 225-1 and a second camera 225-2 positioned toward different directions, as an example of the camera 225. The first camera 225-1 may be referred to as a motion recognition camera, and the second camera 225-2 may be referred to as an eye tracking camera. The wearable device 101 may identify a position, a shape, and/or a gesture of a hand (e.g., the hand 110-1 of FIG. 1) using an image 226-1 of the first camera 225-1. The wearable device 101 may identify a direction of a gaze of a user wearing the wearable device 101 using an image 226-2 of the second camera 225-2. In an embodiment, the wearable device 101 may activate the first camera 225-1 according to whether a communication link between the wearable device 101 and an external electronic device 180, such as a remote controller, is established. For example, when the wearable device 101 detects the external electronic device 180 held in the user's hand using the first camera 225-1 or detects the external electronic device 180 through the communication circuitry 240, the wearable device 101 may deactivate the first camera 225-1. Based on receiving, from the external electronic device 180 via the communication circuitry 240, a signal indicating a release of a hand with respect to the external electronic device 180 (or the hand is separated from the external electronic device 180), the wearable device 101 may resume identifying a position, a shape and/or a gesture of the hand by activating the first camera 225-1 again.

According to an embodiment, the sensor 230 of the wearable device 101 may generate electronic information capable of being processed by the processor 210 and/or the memory 215 of the wearable device 101 from non-electronic information related to the wearable device 101. The information may be referred to as sensor data. The sensor 230 may include a global positioning system (GPS) sensor for detecting a geographic location of the wearable device 101, an image sensor, an illuminance sensor, and/or a time-of-flight (ToF) sensor, and an inertial measurement unit (IMU) for detecting a physical motion of the wearable device 101.

In an embodiment, the communication circuitry 240 of the wearable device 101 may include a hardware component for supporting transmission and/or reception of an electrical signal between the wearable device 101 and the external electronic device 180. For example, the communication circuitry 240 may include at least one of a modem, an antenna, and an optic/electronic (O/E) converter. The communication circuitry 240 may support transmission and/or reception of an electrical signal based on various types of protocols, such as Ethernet, a local area network (LAN), a wide area network (WAN), wireless fidelity (Wi-Fi), Bluetooth®, Bluetooth low energy (BLE), ZigBee, long term evolution (LTE), 5G new radio (NR), and/or 6G.

According to an embodiment, the wearable device 101 may include an output means for outputting information in a form other than a visualized form. For example, the wearable device 101 may include a speaker for outputting an acoustic signal. For example, the wearable device 101 may include a motor for providing haptic feedback based on vibration.

Referring to FIG. 2, an external appearance of the external electronic device 180 connected to the wearable device 101 is illustrated. The wearable device 101 may establish a communication link with the external electronic device 180 using the communication circuitry 240. The external electronic device 180 may include one or more buttons capable of being pressed. The external electronic device 180 may transmit, to the wearable device 101 via the communication link, a signal for notifying the pressing of the button. The external electronic device 180 may include a sensor for detecting a movement and/or a rotation of the external electronic device 180, such as an IMU. The external electronic device 180 may transmit, to the wearable device 101 via the communication link, a signal for notifying the movement and/or the rotation of the external electronic device 180.

In an embodiment, the external electronic device 180 for controlling the wearable device 101 may include a first remote controller dedicated to the wearable device 101. However, embodiments are not limited thereto, and the external electronic device 180 may include a second remote controller for universal control of an HMD such as the wearable device 101. The wearable device 101 identifying different remote controllers may selectively connect to a specific remote controller based on a priority of the remote controllers. For example, the wearable device 101 identifying both the first remote controller and the second remote controller may preferentially establish a communication link with the first remote controller among the remote controllers. In a state in which the communication link with the first remote controller is preferentially established, the wearable device 101 may at least temporarily cease to establish a communication link with the second remote controller. In the above state, the wearable device 101 may establish a communication link with the second remote controller, based on deactivation (or missing) of the first remote controller.

Referring to an embodiment of FIG. 2, in the memory 215 of the wearable device 101, one or more instructions (or commands) indicating a calculation and/or an operation to be performed by the processor 210 of the wearable device 101 on data may be stored. A set of one or more instructions may be referred to as a program, a firmware, an operating system, a process, a routine, a sub-routine and/or an application. Hereinafter, an application being installed in an electronic device (e.g., the wearable device 101) may mean that one or more instructions provided in a form of an application are stored in the memory 215, and that the one or more applications are stored in a format executable by a processor of the electronic device (e.g., a file having an extension specified by an operating system of the wearable device 101). According to an embodiment, the wearable device 101 may perform operations of FIGS. 11 to 15 by executing the one or more instructions stored in the memory 215.

Referring to FIG. 2, programs installed in the wearable device 101 may be classified into one of different layers, including an application layer 260, a framework layer 270, and/or a hardware abstraction layer (HAL) 250, based on a target. For example, programs (e.g., driver) designed to target hardware (e.g., the display 220, the camera 225, the sensor 230, and/or the communication circuitry 240) of the wearable device 101 may be classified into the hardware abstraction layer 250. For example, programs (e.g., an eye tracker 271, a gesture tracker 272, a motion tracker 273, an external space recognizer 274, and/or a UI provider 275) designed to target at least one of the hardware abstraction layer 250 and/or the application layer 260 may be classified into the framework layer 270. Programs classified into the framework layer 270 may provide an application programming interface (API) that is executable based on another program.

Referring to FIG. 2, a program designed to target a user (e.g., the user 110 of FIG. 1) controlling the wearable device 101 may be classified into the application layer 260. For example, a program classified into the application layer 260 may include at least one of an application 261 for playing and/or streaming video, an application 262 for video conference, an application 263 for viewing media content (e.g., image and/or video) of the memory 215, or an application 264 for call connection. However, it is not limited thereto. For example, a program classified into the application layer 260 may cause execution of a function supported by programs classified into the framework layer 270, by calling the API.

Referring to FIG. 2, the wearable device 101 may process information related to a gaze of a user wearing the wearable device 101, based on the execution of the eye tracker 271 in the framework layer 270. For example, the wearable device 101 may obtain an image 226-2 including the eye of the user from the second camera 225-2. Based on a position and/or a direction of a pupil included in the image 226-2, the wearable device 101 may identify a direction of the user's gaze.

Referring to FIG. 2, the wearable device 101 may identify motion of a designated body part including a hand, based on the execution of the gesture tracker 272 in the framework layer 270. For example, the wearable device 101 may obtain an image 226-1 and/or a video including the body part from the first camera 225-1. Based on a motion and/or a posture of the designated body part indicated by the image 226-1 and/or the video, the wearable device 101 may identify a gesture performed by the designated body part.

Referring to FIG. 2, the wearable device 101 may identify a motion of the wearable device 101, based on the execution of the motion tracker 273 in the framework layer 270. In a state that the wearable device 101 is worn by the user, a motion of the wearable device 101 may be related to a motion of a head of the user. For example, the wearable device 101 may identify a direction of the wearable device 101 that substantially coincides with a direction of the head. The wearable device 101 may identify the motion of the wearable device 101, based on sensor data of the sensor 230 including the IMU.

Referring to FIG. 2, the wearable device 101 may obtain information about an external space including the wearable device 101 or adjacent to the wearable device 101, based on the execution of the external space recognizer 274 in the framework layer 270. The wearable device 101 may obtain the information using the camera 225 and/or the sensor 230. Referring to FIG. 2, in a state that the external space recognizer 274 is executed, the wearable device 101 may identify a virtual space mapped to the external space, based on the information obtained based on the external space recognizer 274. Based on the execution of the external space recognizer 274, the wearable device 101 may identify a position and/or a direction of the wearable device 101 in the external space. For example, based on the execution of the external space recognizer 274 and/or the motion tracker 273, the wearable device 101 may perform a simultaneous localization and mapping (SLAM) to recognize an external space and a position of the wearable device 101 within the external space.

Referring to FIG. 2, the wearable device 101 may support the execution of an application classified into the application layer 260, based on the execution of the UI provider 275 in the framework layer 270. Supporting the execution of an application may include an operation of displaying one or more visual objects (e.g., the scroll bar 141 of FIG. 1) included in a screen (e.g., the screen 120 of FIG. 1) of the application. In a state of executing the application, the processor 210 of the wearable device 101 may execute, in response to identifying a designated API corresponding to a function of the UI provider 275, the function by using the UI provider 275. The UI provider 275 may include information for displaying a replaceable visual object according to input means, such as the scroll bar 141 of FIG. 1. Using the information, the wearable device 101 may display, change, and/or replace a visual object on the display 220.

According to one embodiment, the wearable device 101 may perform a visual object replacement according to input means for controlling the wearable device 101, based on the execution of the UI provider 275. For example, the wearable device 101 may control a function of a visual object displayed on the display 220, according to a signal received from the external electronic device 180, based on identifying the external electronic device 180 using the communication circuitry 240. Based on failing to identify the external electronic device 180, or based on identifying a body part (e.g., the hand 110-1 of FIG. 1) facing the visual object using the first camera 225-1, the wearable device 101 may change the visual object to another visual object corresponding to a shape of the body part. The wearable device 101 may control the function based on identifying a gesture of the body part related to the other visual object using the first camera 225-1. For example, independently of replacing the first visual object with the second visual object, the wearable device 101 may execute a function supported by the first visual object, by using the second visual object.

As described above, according to an embodiment, the wearable device 101 may display a visual object using one or more instructions and/or resources included in the UI provider 275, while executing an application included in the application layer 260. The wearable device 101 may change or replace the visual object displayed through the display 220, based on the external electronic device 180 and/or input means including a hand. For example, in each of a first state of identifying the external electronic device 180 (e.g., the state 191 of FIG. 1) or a second state of identifying a hand (e.g., the states 192 and 193 of FIG. 1), the wearable device 101 may display a visual object designed appropriately for the input means by controlling whether to replace the visual object.

As described above with reference to the states 192 and 193 of FIG. 1, the wearable device 101 may selectively display one of visual objects having different shapes, by using a shape of a hand identified by the image 226-1 obtained through the first camera 225-1. Hereinafter, according to an embodiment, an example of an operation in which the wearable device 101 recognizes a shape of a hand will be described with reference to FIG. 3.

Figure 3:
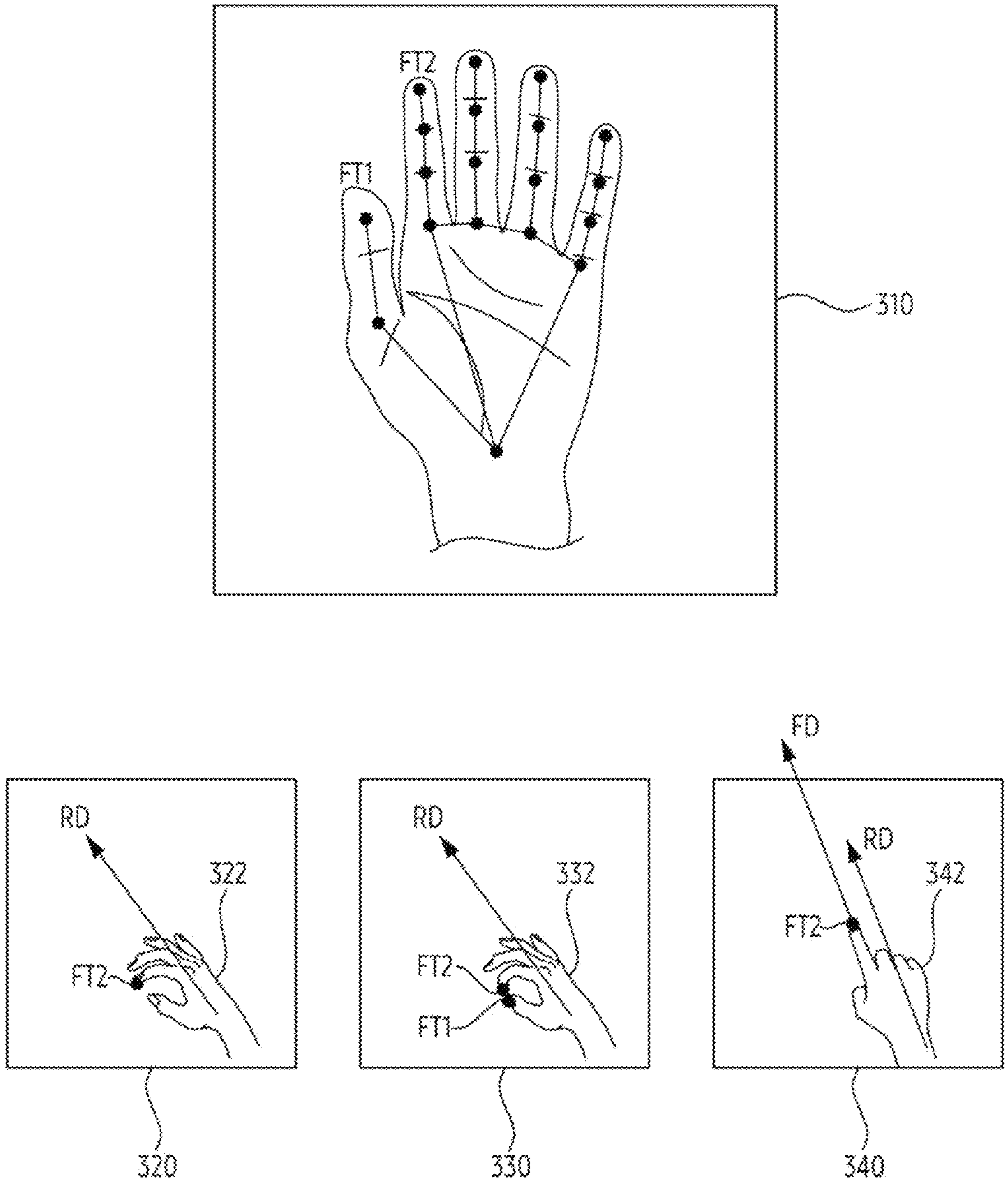
FIG. 3 illustrates an example of an operation in which a wearable device identifies a shape of a body part including a hand, according to an embodiment.

FIG. 3 illustrates an example of an operation in which a wearable device identifies a shape of a body part including a hand (e.g., the hand 110-1 of FIG. 1), according to an embodiment. The wearable device of FIG. 3 may include the wearable device 101 of FIGS. 1 and 2. The wearable device 101 may perform an operation described with reference to FIG. 3 based on the execution of the gesture tracker 272 of FIG. 2.

Referring to FIG. 3, an example of a model 310 used to identify a designated body part (e.g., hand) is illustrated. The wearable device 101 may identify a shape and/or a posture of a hand by using a plurality of parameters set by the model 310. The plurality of parameters may indicate coordinates of different points (e.g., points indicated by dots in the model 310) included in the hand and/or information on a rotation of the points.

According to an embodiment, the wearable device 101 may recognize a hand by using an image obtained from a camera (e.g., the first camera 225-1 of FIG. 2). Recognizing the hand by the wearable device 101 may include an operation of obtaining and/or adjusting the plurality of parameters set by the model 310. Recognizing a hand by the wearable device 101 may include an operation of selecting a shape of the hand from among designated shapes, based on the plurality of parameters. Recognizing the hand by the wearable device 101 may include an operation of generating an event (e.g., software interrupt) corresponding to a shape (or gesture) of the hand recognized based on the model 310.

Referring to FIG. 3, images 320, 330, and 340 obtained using the camera of the wearable device 101 are exemplified. When the image 320 is obtained using the camera, the wearable device 101 may identify a shape of a hand 322 by adjusting a plurality of parameters included in the model 310, based on the image 320. In order to identify and/or adjust the plurality of parameters from the image 320, the wearable device 101 may obtain feature information (e.g., one or more feature points included in the image 320 and/or a histogram indicating a color distribution) on the image 320. The wearable device 101 may obtain the plurality of parameters by inputting the feature information and/or the image 320 into an artificial neural network. The artificial neural network may include a convolution neural network (CNN), a recurrent neural network (RNN), and/or a long-short term memory (LSTM).

Referring to FIG. 3, in an example case of obtaining the image 320, the wearable device 101 may adjust a plurality of parameters of the model 310 based on the image 320, and identify a shape of the hand 322 based on the plurality of adjusted parameters. The operation of identifying the shape of the hand 322 by the wearable device 101 may include an operation of identifying a second direction RD of the hand 322. The second direction RD may include a line connecting different points (e.g., two points positioned at the palm and/or wrist) included in the hand 322. The wearable device 101 may identify a shape of the hand 322 included in the image 320 by comparing the second direction RD and a direction of one or more fingers. For example, the wearable device 101 may compare the second direction RD and a direction of an index finger, by using coordinates of a point FT2 corresponding to a fingertip of the index finger. A shape in which the second direction RD and the direction of the index finger are different and no finger is spread, as in the shape of the hand 322 illustrated in FIG. 3, may be referred to as an idle gesture and/or a neutral gesture.

Referring to FIG. 3, when the image 330 is obtained using a camera, the wearable device 101 may identify the shape of the hand 332 captured in the image 330 by comparing the model 310 and the image 330. When the image 330 including the hand 332 in which the index finger and the thumb are in contact with each other is obtained, the wearable device 101 may identify that coordinates of the point FT2 of the fingertip of the index finger and a point FT1 of the fingertip of the thumb match with each other, or that a distance between the coordinates is less than a specified distance. While identifying points FT1 and FT2 that match each other or are spaced apart less than a specified distance, the wearable device 101 may identify a gesture represented by the contacted index finger and thumb. A shape in which the fingertip of the index finger and the fingertip of the thumb are in contact with each other, as in the shape of the hand 332 of FIG. 3, may be referred to as a pinch gesture. The wearable device 101 identifying the pinch gesture may identify the type and/or number of finger (the thumb in the case of the image 330) in contact with the index finger, together with the second direction RD of the hand 332.

Referring to FIG. 3, when the image 340 is obtained using a camera, the wearable device 101 may identify a shape of the hand 342 captured in the image 340 by comparing the model 310 and the image 340. A shape in which one or more joints included in the index finger are spread by a threshold angle (e.g., 160° to 180°) or more, and joints of other fingers other than the index finger are folded, as in the hand 342 of FIG. 3, may be referred to as a pointing gesture. When the hand 342 has a shape of the pointing gesture, a first direction FD from the index finger toward the point FT2 and the second direction RD may be parallel to each other. Using the image 340, the wearable device 101 may identify the pointing gesture represented by the hand 342. The wearable device 101 identifying the pointing gesture may identify the first direction FD extending from the point FT2 of the index finger. Identifying the pointing gesture from the hand 342 by the wearable device may be performed in a state that a position of the hand 342 identified by the image 340 is included in the FoV of a user wearing the wearable device 101.

As described above, according to an embodiment, the wearable device 101 may recognize, based on the model 310, an image (e.g., the images 320, 330, and 340) obtained using a camera. The wearable device 101 may identify a direction and/or an angle of fingers of a hand included in the image. The wearable device 101 may identify a shape of the hand including the fingers, based on directions and/or angles of the fingers. For example, the wearable device 101 may identify the pointing gesture and/or the pinch gesture described above with reference to FIG. 3. Based on a direction (e.g., the first direction FD and the second direction RD) and/or a shape of the hand, the wearable device 101 may change the visual object. For example, the wearable device 101 identifying the hand 322 having a shape of the idle gesture may change a visual object disposed in the second direction RD of the hand 322 into another visual object having a shape related to the hand 322. For example, the wearable device 101 identifying the hand 332 having a shape of the pinch gesture may move or/or change a visual object corresponding to the hand 332, based on a moving direction of the hand 332. For example, the wearable device 101 identifying the hand 342 having a shape of the pointing gesture may change a visual object disposed in the first direction FD of the index finger.

Hereinafter, an example of an operation performed by the wearable device 101 based on a shape and/or a posture of a hand identified using the model 310 will be described with reference to FIGS. 4A and 4B.

Figure 4A:
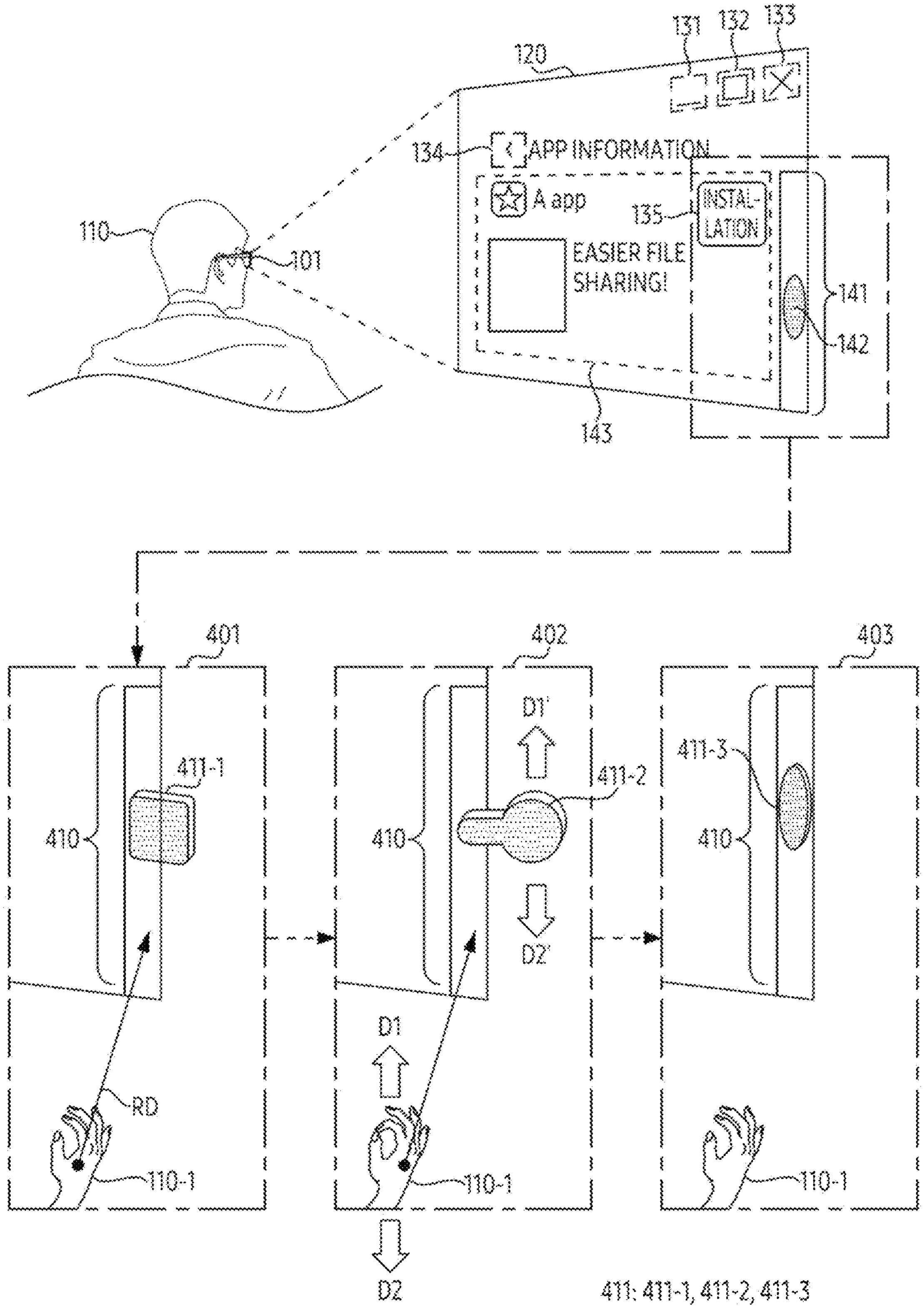
FIGS. 4A and 4B illustrate an example of an operation in which a wearable device displays a visual object for scrolling information, according to an embodiment.
Figure 4B:
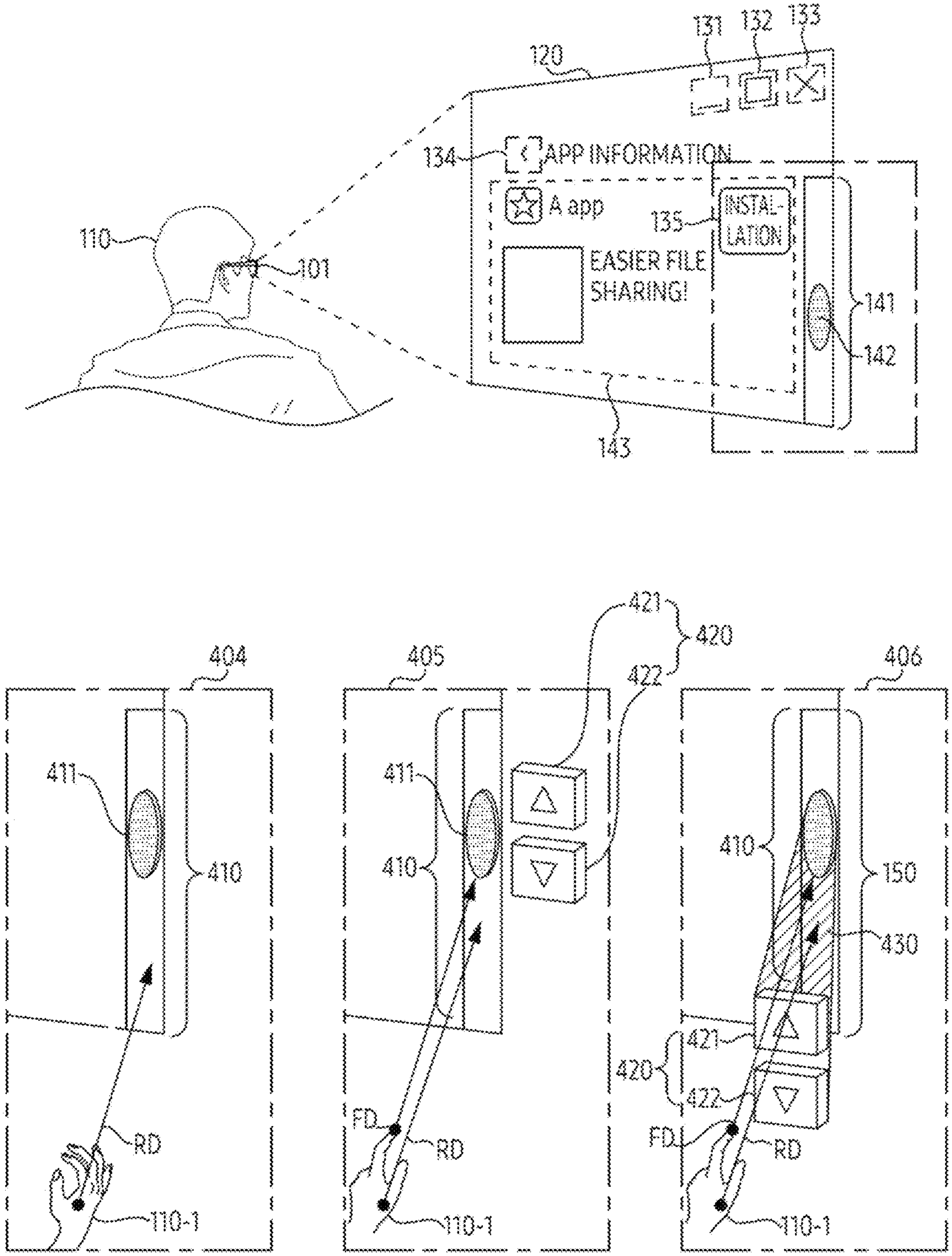

FIGS. 4A and 4B illustrate an example of an operation in which the wearable device 101 displays a visual object for scrolling information, according to an embodiment. The wearable device 101 of FIGS. 1 and 2 may include the wearable device 101 of FIGS. 4A and 4B. Referring to FIGS. 4A and 4B, different states 401, 402, 403, 404, 405, and 406 of the wearable device 101 entering based on a shape and/or a posture of a hand 110-1 of a user 110 while the screen 120 of FIG. 1 is displayed are illustrated.

According to an embodiment, the wearable device 101 may display a scroll bar 141 for performing scrolling of information displayed on a portion 143 of the screen 120. Using a handle 142 displayed on the scroll bar 141, the wearable device 101 may display a position of information displayed through the portion 143. While communicating with an external electronic device (e.g., the external electronic device 180 of FIG. 1) including a remote controller, the wearable device 101 may maintain displaying the scroll bar 141. Based on a signal received from the external electronic device, the wearable device 101 may move the handle 142 overlapped on the scroll bar 141 and perform scrolling of information displayed through an area (e.g., the portion 143) matched to the scroll bar 141.

In the state 401 of FIG. 4A, the wearable device 101 may identify the hand 110-1 having a second direction RD facing the scroll bar 141 and having a shape of an idle gesture, such as the hand 322 of FIG. 3. Based on identifying the hand 110-1 having the shape of an idle gesture, the wearable device 101 may replace the scroll bar 141 with a scroll bar 410 having a shape corresponding to the hand 110-1. For example, the wearable device 101 identifying a designated body part including the hand 110-1 may display the scroll bar 410, which has a size larger than the scroll bar 141 and includes a handle 411 deformable by a gesture of the hand 110-1. The wearable device 101 may display the scroll bar 410 having a size larger than a size (e.g., a width) of the scroll bar 141 at a position of the scroll bar 141. The wearable device 101 may display the handle 411 together with the scroll bar 410. Within the scroll bar 410 having a shape of a line along a first direction, the wearable device 101 may display the handle 411 having a shape extending along a second direction perpendicular to the first direction. The wearable device 101 may display the handle 411 having a shape protruding from the scroll bar 410 toward the user 110 by displaying the handle 411 in three dimensions. For example, the binocular disparity of the handle 411 may be greater than the binocular disparity of the scroll bar 410 on which the handle 411 is positioned and/or the screen 120. According to an embodiment, the wearable device 101 may guide selection of the handle 411 by a second direction RD of the hand 110-1, by using the handle 411 having a size larger than the handle 142 displayed together with the scroll bar 141. Referring to FIG. 4A, different shapes of the handle 411 displayed by the wearable device 101 are illustrated in each of the states 401, 402, and 403.

Referring to FIG. 4A, in a state 401 of displaying the scroll bar 410 replacing the scroll bar 141, the wearable device 101 may identify deformation of the hand 110-1. Using an image (e.g., the image 226-1 of FIG. 2) including the hand 110-1, the wearable device 101 may identify that the shape of the hand 110-1 is deformed from the idle gesture to the pinch gesture. Based on identifying the hand 110-1 deformed to the pinch gesture, the wearable device 101 may enter the state 402. In the state 402, the wearable device 101 may change the shape of the handle 411-1 to a shape for guiding the identification of the pinch gesture. For example, the wearable device 101 may display a handle 411-1 having a shape held by the hand 110-1 in the pinch gesture, by varying a size of a portion overlapping the scroll bar 410 and another portion extending outside the scroll bar 410.

Referring to FIG. 4A, in a state 402 of identifying the pinch gesture on the scroll bar 410, the wearable device 101 may perform a function (e.g., scrolling) related to the scroll bar 410, based on a position of the hand 110—performing the pinch gesture. In the state 402, the wearable device 101 may guide that the pinch gesture is identified by deforming a handle 411-2 at a time point at which the pinch gesture of the hand 110-1 is identified. For example, based on identifying the hand 110-1 moved along a direction D1 parallel to the scroll bar 410, the wearable device 101 may move the handle 411-2 along a direction D1' on the scroll bar 410. Based on a position of the handle 411-2 moved along a direction D1' at the scroll bar 410, the wearable device 101 may move information displayed on a portion 143 corresponding to the scroll bar 410. When moving the handle 411-2 based on the direction D1', the wearable device 101 may display, on the portion 143, other information prior to the information displayed on the portion 143.

Similarly, based on identifying the hand 110-1 moved along a direction D2 parallel to the scroll bar 410, the wearable device 101 may move the handle 411-2 along a direction D2' on the scroll bar 410. Based on the handle 411-2 moved along the direction D2', the wearable device 101 may replace information displayed on the portion 143 with other information subsequent to the information. After replacing the scroll bar 141 linked to the portion 143 with the scroll bar 410, the wearable device 101 may perform scrolling on the portion 143, based on a gesture related to the scroll bar 410.

Referring to FIG. 4A, in the state 402 of identifying the hand 110-1 having a shape of the pinch gesture, the wearable device 101 identifying that the pinch gesture is stopped may switch to a state 403. In the state 403, the wearable device 101 may deform a handle 411-3 in a shape different from the handle 411-2 illustrated in the state 402. Based on the deformation of the handle 411-3, the wearable device 101 may visualize the stopping of the pinch gesture. In the state 403, the wearable device 101 may display the handle 411-3 having a width of the scroll bar 410 and protruding toward the user 110.

An example case in which the wearable device 101 changes the scroll bar 141 to the scroll bar 410 based on sequential switching of the states 401, 402, and 403 has been described. Based on the movement of the hand 110-1, the wearable device 101 may cease displaying the scroll bar 410 and resume displaying the scroll bar 141. For example, in the state 403 of identifying the hand 110-1 having a shape of the idle gesture, the wearable device 101 may change and/or replace the scroll bar 410 with the scroll bar 141, in response to identifying movement of the hand 110-1 (e.g., movement of the 110-1 out of the user 110's FoV).

According to an embodiment, a visual object displayed by the wearable device 101 for replacing the scroll bar 141 is not limited to the scroll bar 410 and/or the handle 411 of FIG. 4A. Referring to FIG. 4B, according to a shape of the hand 110-1, the wearable device 101 may display a visual object suitable for the shape along with the replacement of the scroll bar 141. In a state 404 of FIG. 4B, the wearable device 101 may replace the scroll bar 141 with the scroll bar 410 based on identifying the hand 110-1 having the shape of the idle gesture. By using the handle 411 overlapped on the replaced scroll bar 410, the wearable device 101 may visualize a position of information displayed on the portion 143 of the screen 120 corresponding to the scroll bar 410.

In the state 404 of FIG. 4B, the wearable device 101 may identify deformation of the hand 110-1. For example, the user 110 may perform a pointing gesture on the scroll bar 410. In a state 405 of identifying the pointing gesture, the wearable device 101 may identify selection of the scroll bar 410 by the pointing gesture using a first direction FD of the index finger. In a state 405 of identifying the first direction FD facing the scroll bar 410, the wearable device 101 may display a group 420 of buttons 421 and 422 corresponding to each of both directions of the scroll bar 410, together with the scroll bar 410. The wearable device 101 may maintain a shape (e.g., a shape of the pointing gesture) of the hand 110-1, by using the buttons 421 and 422 for performing scrolling by selecting one of both directions of an axis in which the scroll bar 410 is extended. For example, the user 110 may select one of the buttons 421 and 422 by moving the hand 110-1 having the shape of the pointing gesture, without performing the pinch gesture for selecting the handle 411. In an embodiment, the wearable device 101 may further display a line (e.g., ray) representing the first direction FD.

Referring to FIG. 4B, the wearable device 101 may adjust a distance of a group 420 of the buttons 421 and 422, based on a distance at which the screen 120 is displayed. In a state 405 in which the screen 120 is displayed in a range less than or equal to a threshold distance (e.g., 50 cm) from the user 110, the wearable device 101 may display the group 420 of buttons 421 and 422 based on a distance between the screen 120 and the user 110. In a state 406 in which the screen 120 is displayed in a range longer than the threshold distance from the user 110, the wearable device 101 may display the group 420 of buttons 421 and 422 at a distance shorter than or equal to the threshold distance. For example, the group 420 of buttons 421 and 422 may be displayed adjacent to the hand 110-1, based on a spatial position of the hand 110-1. The threshold distance may be set to distinguish an external space reachable by the hand 110-1 of the user 110. However, embodiments are not limited thereto, and the wearable device 101 may change, based on a distance between the hand 110-1 and a virtual object pointed by the hand 110-1, a distance at which the virtual object is displayed. For example, when a distance between the group 420 of buttons 421 and 422 pointed by the hand 110-1 and the hand 110-1 is greater than the threshold distance, the wearable device 101 may move the group 420 so that the distance between the hand 110-1 and the group 420 becomes less than the threshold distance.

For example, while displaying the screen 120 longer than the threshold distance, the wearable device 101 may display one or more visual objects (e.g., the scroll bar 410, the handle 411, and/or the group 420 of buttons 421 and 422) corresponding to the shape of the hand 110-1, based on identifying the hand 110-1 from among the hand 110-1 or an external electronic device (e.g., a remote controller). When a shape of the hand 110-1 corresponds to a shape of an idle gesture, the wearable device 101 may display the scroll bar 410, based on a distance of the scroll bar 141 and/or the screen 120, as in the state 404. When the shape of the hand 110-1 corresponds to the shape of the pointing gesture, the wearable device 101 may display a visual object (e.g., the group 420 of buttons 421 and 422) adjacent to the hand 110-1, as in the state 406. In order to display the visual object adjacent to the hand 110-1, the wearable device 101 may display the visual object at a distance shorter than or equal to a threshold distance of the hand 110-1 of the user. In an embodiment, the wearable device 101 may display a visual object 430 for indicating that the group 420 corresponds to the scroll bar 410. In the state 406 of FIG. 4B, the wearable device 101 may notify that the buttons 421 and 422 included in the group 420 are in association with the scroll bar 410 by using the visual object 430 having a shape of a figure (e.g., polygon) connecting the group 420 and the scroll bar 410. The wearable device 101 may prevent other virtual objects from being obscured by the visual object 430, by setting a transparency of the visual object 430 to a specified transparency (e.g., a transparency being greater than 0% and less than 100%).

As described above, according to an embodiment, the wearable device 101 may replace the scroll bar 141 with the scroll bar 410, based on a shape, a posture, and/or a position of the hand 110-1 identified by the wearable device 101. The replaced scroll bar 410 may have a shape, a size, and/or a position for guiding a gesture of the hand 110-1. The wearable device 101 may display, on the scroll bar 410, the handle 411 having a three-dimensional shape or the group 420 of buttons 421 and 422 adjacent to the hand 110-1. Displaying the group 420 by the wearable device 101 may be performed based on whether the screen 120 including the scroll bar 410 and/or the scroll bar 410 is spaced apart from the user 110 by exceeding a threshold distance.

In an embodiment of FIGS. 4A and 4B, the wearable device 101 may display the scroll bar 141 along a first direction referred to as a vertical direction. The vertical direction may be perpendicular to an axis connecting the two eyes of the user 110, in a state that the user 110 wears the wearable device 101. In an embodiment, the vertical direction may be parallel to a direction of a line feed in text (e.g., text written in English) included in the screen 120. In an embodiment, the vertical direction may be parallel to a direction of a line in text (e.g., text written in Chinese) included in the screen 120. In an embodiment, the vertical direction may be parallel to a direction of a force (e.g., gravity) applied to the wearable device 101, or may be parallel to a direction of an edge of the display having a difference from the direction of the force by less than a designated angle (e.g., 45°).

In the embodiment of FIGS. 4A and 4B, an operation of the wearable device 101 for replacing the scroll bar 141 displayed along the vertical direction has been described, but embodiments are not limited thereto. For example, the wearable device 101 may display a scroll bar along a horizontal direction perpendicular to the vertical direction. In an embodiment, the wearable device 101 may selectively display or substantially simultaneously display a scroll bar parallel to the vertical direction and another scroll bar parallel to the horizontal direction. The horizontal direction may be parallel to an axis connecting the two eyes of the user 110 in a state that the user 110 wears the wearable device 101. In an embodiment, the horizontal direction may be perpendicular to the direction of the line feed. In an embodiment, the horizontal direction may be perpendicular to a direction of a force applied to the wearable device 101, or may be parallel to a direction of an edge of the display having a difference from the direction of the force greater than a designated angle (e.g., 45°). In an embodiment in which the scroll bar is displayed along the horizontal direction, the wearable device 101 may change the scroll bar displayed along the horizontal direction based on a shape, a posture, and/or a position of the hand 110-1, similar to the description with reference to FIGS. 4A and 4B.

Although the operation of the wearable device 101 for replacing the scroll bar 141 has been described, embodiments are not limited thereto. The wearable device 101 may change and/or replace a visual object capable of reacting to a gesture of the user 110, based on input means. Hereinafter, an example of an operation of the wearable device 101 for changing and/or replacing a button and/or an icon will be described with reference to FIGS. 5A and 5B.

Figure 5A:
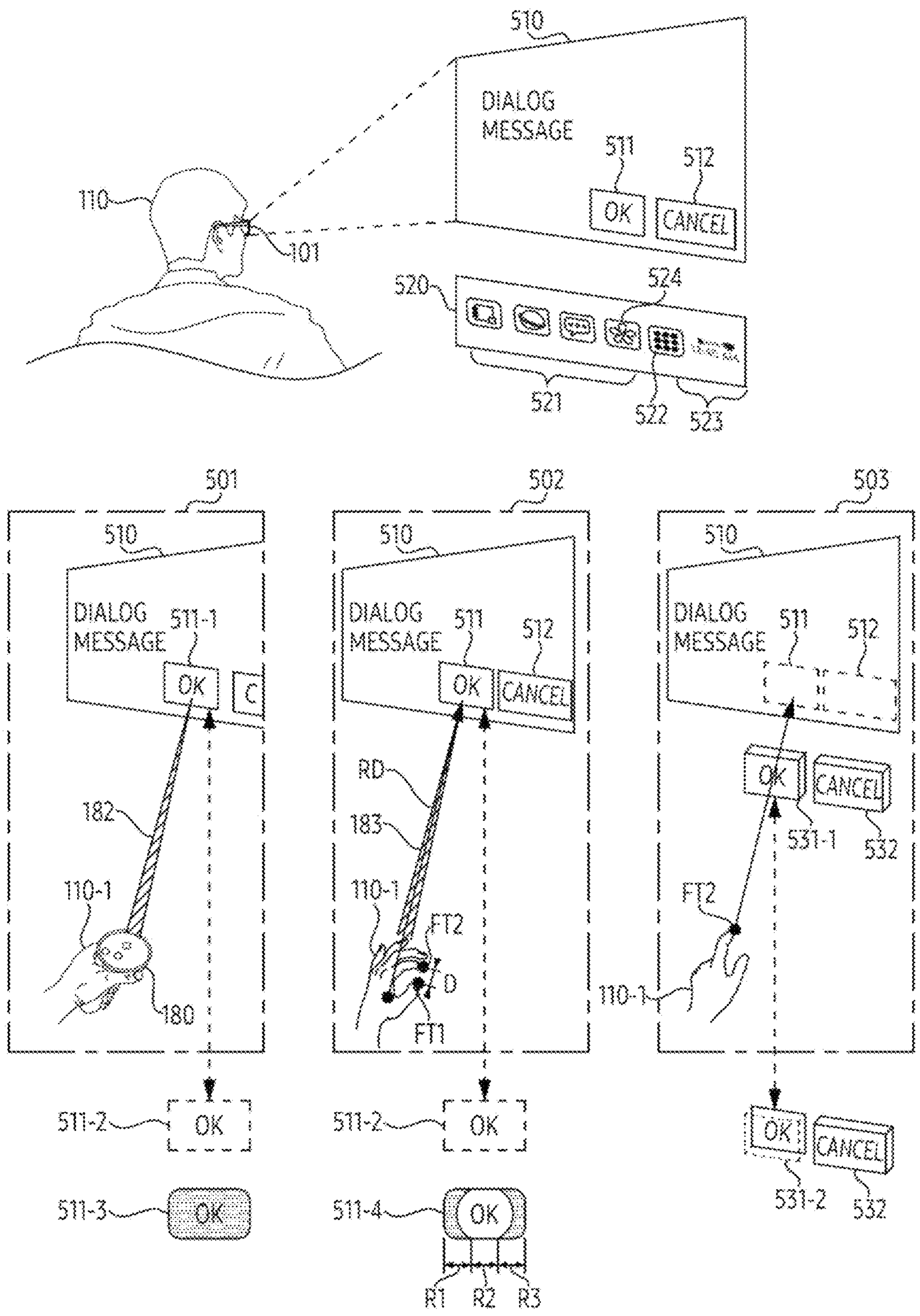
FIGS. 5A and 5B illustrate an example of an operation in which a wearable device displays a visual object having a shape of a button, according to an embodiment.
Figure 5B:
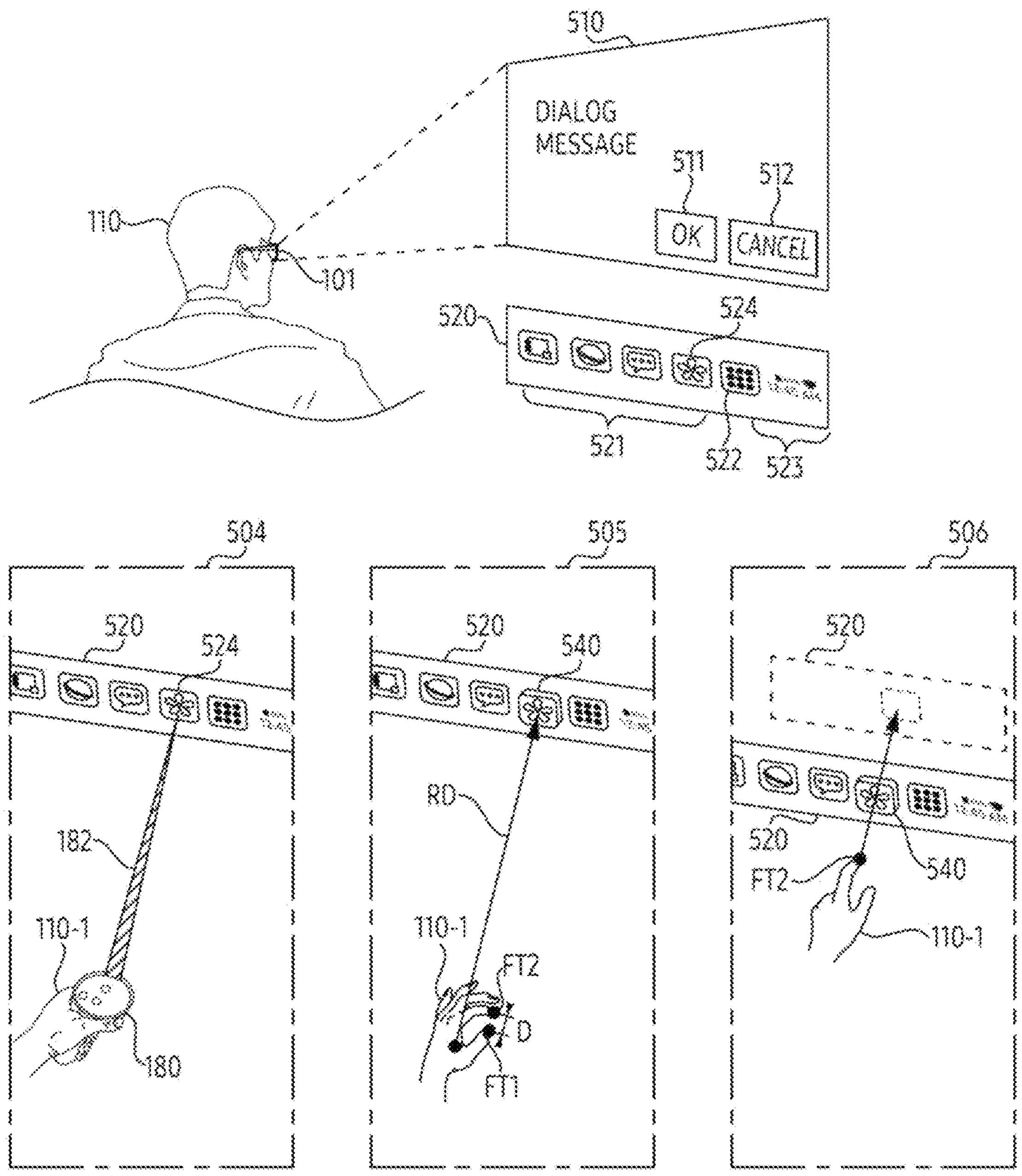

FIGS. 5A and 5B illustrate an example of an operation in which a wearable device 101 displays a visual object having a shape of a button according to an embodiment. The wearable device 101 of FIGS. 1 and 2 may include the wearable device 101 of FIGS. 5A and 5B. Referring to FIGS. 5A and 5B, different states 501, 502, 503, 504, 505, and 506 of the wearable device 101 distinguished by input means are illustrated.

According to an embodiment, the wearable device 101 may display a pop-up window 510 (or a message dialog, or dialog box) on the FoV of the user 110, by controlling a display (e.g., the display 220 of FIG. 2). The pop-up window 510 may be provided by a framework (e.g., the UI provider 275 of FIG. 2) of the wearable device 101 and may have a shape dependent on input means identified by the wearable device 101. Referring to FIG. 5A, the wearable device 101 may display the pop-up window 510 including buttons 511 and 512 having a two-dimensional shape. When the user 110 wears the wearable device 101, the pop-up window 510 may float within the FoV of the user 110, based on binocular disparity adjusted by the wearable device 101.

Referring to FIG. 5A, according to an embodiment, the wearable device 101 may interact with the user 110 based on the buttons 511 and 512 having a two-dimensional shape in the state 501 connected to an external electronic device 180 such as a remote controller. In the state 501, the wearable device 101 may display a ray 182 extending from the external electronic device 180. By using the ray 182 having a shape of a line extending from a portion of the external electronic device 180, the wearable device 101 may perform focusing of an object by movement and/or rotation of the external electronic device 180. For example, the wearable device 101 identifying the movement and/or rotation of the external electronic device 180 may deform the ray 182 and emphasize a visual object overlapping the deformed ray 182.

Referring to FIG. 5A, in a state in which the ray 182 extending from the external electronic device 180 faces the button 511 of the pop-up window 510, the wearable device 101 may identify that the button 511 is focused by a direction of the external electronic device 180, by adjusting the state of the button 511. The wearable device 101 may display a button 511-2 in a state (e.g., hovering state) indicating that it is focused by the ray 182, based on displaying the ray 182 facing a button 511-1 of the idle state (or default state). The wearable device 101 may emphasize the outline of the button 511-2 using a designated color (e.g., blue).

In the state 501 of displaying the ray 182 facing the button 511, the wearable device 101 may execute a function related to the button 511 based on a signal of the external electronic device 180. For example, in the state 501, when the user 110 presses a designated button (e.g., click function) of the external electronic device 180, the external electronic device 180 may transmit, to the wearable device 101, a signal to notify the pressing of the designated button. The wearable device 101 receiving the signal may execute a function mapped to the button 511. The wearable device 101 may display a button 511-3 in a state for feeding back the pressing of the designated button. The button 511-3 may be filled with a designated color different from the buttons 511-1 and 511-2 in other states. After displaying the button 511-3 filled with the designated color, the wearable device 101 may display the button 511-1 in the idle state, in response to the expiration of a designated period.

According to an embodiment, the wearable device 101 may identify a second direction RD of the hand 110-1, based on solely identifying the hand 110-1 without the external electronic device 180. In the state 502 of identifying the hand 110-1 having the second direction RD toward the button 511 and having a shape of the idle gesture, the wearable device 101 may display the button 511-2 in a state (e.g., hovering state) indicating that it is focused by the hand 110-1. Based on identifying the hand 110-1 having the shape of the idle gesture, the wearable device 101 may display a visual object (e.g., the ray 183) having a shape of a line representing the second direction RD of the hand 110-1. In the state 502, the wearable device 101 may identify the deformation of the hand 110-1 by using a distance D between a point FT2 of a fingertip of the index finger and a point FT1 of a fingertip of the thumb. In the state 502, when the user 110 performs the pinch gesture, the wearable device 101 may identify a reduction in the distance D. The wearable device 101 identifying fingertips in contact with each other using the reduced distance D may execute the function of the button 511.

In the state 502 of FIG. 5A, while the distance D of the hand 110-1 is reduced, the wearable device 101 may display a button 511-4 in a state guiding the identification of the pinch gesture based on the distance D. In the button 511-4, the wearable device 101 may display the distance D identified by the wearable device 101 by using a ratio of areas R1 and R3 of a first color and an area R2 of a second color. The first color of the areas R1 and R3 of the button 511-4 may correspond to a color of the button 511-3, and the second color of the area R2 may correspond to a color of the button 511-1. As the distance D is reduced, the wearable device 101 may increase a size of the areas R1 and R3 of the first color and reduce a size of the area R2. The wearable device 101 may reduce the area R2 based on a center of the button 511-4, and display a visual effect occupied by the areas R1 and R3 based on the reduction of the distance D. A time point at which the size of the area R2 becomes substantially 0 may be a time point at which the wearable device 101 identifies the distance D that is substantially reduced to 0.

Referring to FIG. 5A, in the state 503 of identifying the hand 110-1 having a shape of a pointing gesture facing the button 511, the wearable device 101 may display a button adjacent to the point FT2 of the hand 110-1. The wearable device 101 displaying buttons 511 and 512 for executing functions linked to each other on a screen such as the pop-up window 510 may display three-dimensional buttons corresponding to each of the buttons 511 and 512 at a position adjacent to the hand 110-1, based on identifying the hand 110-1 of the pointing gesture. In the state 503 of FIG. 5A, the wearable device 101 may display a button 531-1 in the idle state corresponding to the button 511. Together with the button 531-1, the wearable device 101 may display a button 532 corresponding to the button 512. However, embodiments are not limited thereto, and the wearable device 101 may simultaneously display a button (e.g., buttons 511 and 512) disposed on the pop-up window 510, together with a button (e.g., the buttons 531-1, 532) adjacent to the point FT2 of the hand 110-1.

In the state 503 of FIG. 5A, the wearable device 101 may execute a function corresponding to the button 531-1 based on movement of the hand 110-1 of the pointing gesture. For example, based on identifying the point FT2 of the hand 110-1 moved toward the button 531-1, the wearable device 101 may display a button 531-2 in a state representing the pressing of the button 531-1. The wearable device 101 displaying the button 531-1 in the idle state that protrudes toward the user 110 may reduce a height at which the button 531-1 protrudes based on identifying the hand 110-1 moved toward the button 531-1. Based on displaying the button 531-2 representing the pressing by the hand 110-1, the wearable device 101 may execute a function assigned to the button 531-2.

As described above, the wearable device 101 may solely identify the hand 110-1 facing the button 511 without the external electronic device 180, while displaying the button 511 spaced apart from the user 110. Based on identifying the hand 110-1, the wearable device 101 may display a visual object (e.g., the ray 183 and/or buttons 531-1 and 532 displayed adjacent to the hand 110-1) for guiding that the hand 110-1 facing the button 511 has been identified. While displaying the visual object, the wearable device 101 may execute a function corresponding to the button 511 based on a gesture (e.g., the pinch gesture and/or the pointing gesture) performed by the hand 110-1. The wearable device 101 may perform a change and/or replacement of an icon based on the hand 110-1 facing the icon, similar to a button.

Referring to FIG. 5B, according to an embodiment, the wearable device 101 may display a panel 520 including one or more icons. The panel 520 may include at least one icon representing at least one recently executed application among one or more applications installed in the wearable device 101. For example, the wearable device 101 may display, through a first area 521 of the panel 520, icons (e.g., the icon 524 representing a gallery application for viewing images and/or videos) corresponding to recently executed applications. However, embodiments are not limited thereto. For example, the wearable device 101 may display, on the panel 520, an icon 522 corresponding to a list of all applications installed in the wearable device 101. For example, the wearable device 101 may display, on a second area 523 of the panel 520, at least one icon and/or text representing a state (e.g., a current time, a state of charge (SOC) of a battery, and a network connection state) of the wearable device 101. The panel 520 including one or more icons may float in a space spaced apart from the user 110, based on binocular disparity.

While displaying the panel 520, the wearable device 101 may identify input means (e.g., the external electronic device 180 and/or the hand 110-1) facing a point within the panel 520. Based on the input means, the wearable device 101 may change and/or replace one or more icons included in the panel 520. Referring to FIG. 5A, a state 504 in which the wearable device 101 identifies the external electronic device 180 and states 505 and 506 in which the hand 110-1 is identified without the external electronic device 180 are illustrated. In the state 504, the wearable device 101 may identify an input for focusing of a specific visual object, by using the ray 182 extending from a side of the external electronic device 180. In the state 504 of displaying the ray 182 extending from the external electronic device 180 to the icon 524, the wearable device 101 may identify an input for focusing on the icon 524 by using the external electronic device 180. After receiving the input, the wearable device 101 may execute a function of the icon 524 (e.g., a function of executing an application corresponding to the icon 524), in response to pressing a button (e.g., physical key) of the external electronic device 180.

In the state 505 of FIG. 5B, the wearable device 101 may replace the icon 524 having a two-dimensional shape with an icon 540 having a three-dimensional shape, based on identifying the hand 110-1 of the idle gesture having the second direction RD toward the icon 524. The replaced icon 540 may have a shape protruding from the panel 520 toward the user 110. For example, the wearable device 101 may display, on the icon 540 having a round-shaped rectangular shape, an image included in the icon 524. In the state 505 of identifying the hand 110-1 having a shape of the idle gesture, the wearable device 101 may identify a gesture (e.g., pinch gesture) for selection of the icon 540 overlapping the second direction RD of the hand 110-1, based on a distance D between fingertips of the index finger and the thumb. At a time point when the distance D is reduced to 0, the wearable device 101 may execute a function corresponding to the icon 540, based on the pinch gesture. In an embodiment in which the icon 540 is displayed instead of the icon 524, the wearable device 101 may execute a function of the icon 524 in response to the pinch gesture on the icon 540. For example, in response to the pinch gesture performed in the state 505, the wearable device 101 may execute a gallery application and display a screen provided from the gallery application.

Referring to FIG. 5B, while displaying the panel 520 longer than a threshold distance (e.g., 50 cm), in a state 506 of identifying a pointing gesture for the icon 524 within the panel 520, the wearable device 101 may move the panel 520 to a position adjacent to the hand 110-1 performing the pointing gesture. In the state 506 of FIG. 5B, the wearable device 101 may replace the icon 524 pointed by the point FT2 of the fingertip of the index finger included in the hand 110-1 with the icon 540. Based on movement of the hand 110-1 having a shape of the pointing gesture, the wearable device 101 may execute at least one function mapped to the icon 540. Based on identifying the hand 110-1 moved toward the icon 540 longer than a designated distance, the wearable device 101 may execute a gallery application, similar to the state 505 of FIG. 5B.

The operation of replacing a button and/or an icon by the wearable device 101 according to a gesture performed by the hand 110-1 is not limited to an embodiment described with reference to FIGS. 5A and 5B. For example, the wearable device 101 may visualize selection of a button by the second direction RD of the hand 110-1, by enlarging the button or increasing a size of text included in the button. Based on the visualization, the wearable device 101 may support precise control of the visual object based on the hand 110-1 independently of the external electronic device 180.

The operation of the wearable device 101 for replacing a button and/or an icon has been described, but embodiments are not limited thereto. Hereinafter, an example of an operation in which the wearable device 101 changes and/or replaces a visual object for changing a numerical value based on drag, such as slider, will be described with reference to FIGS. 6A, 6B, and 6C.

Figure 6A:
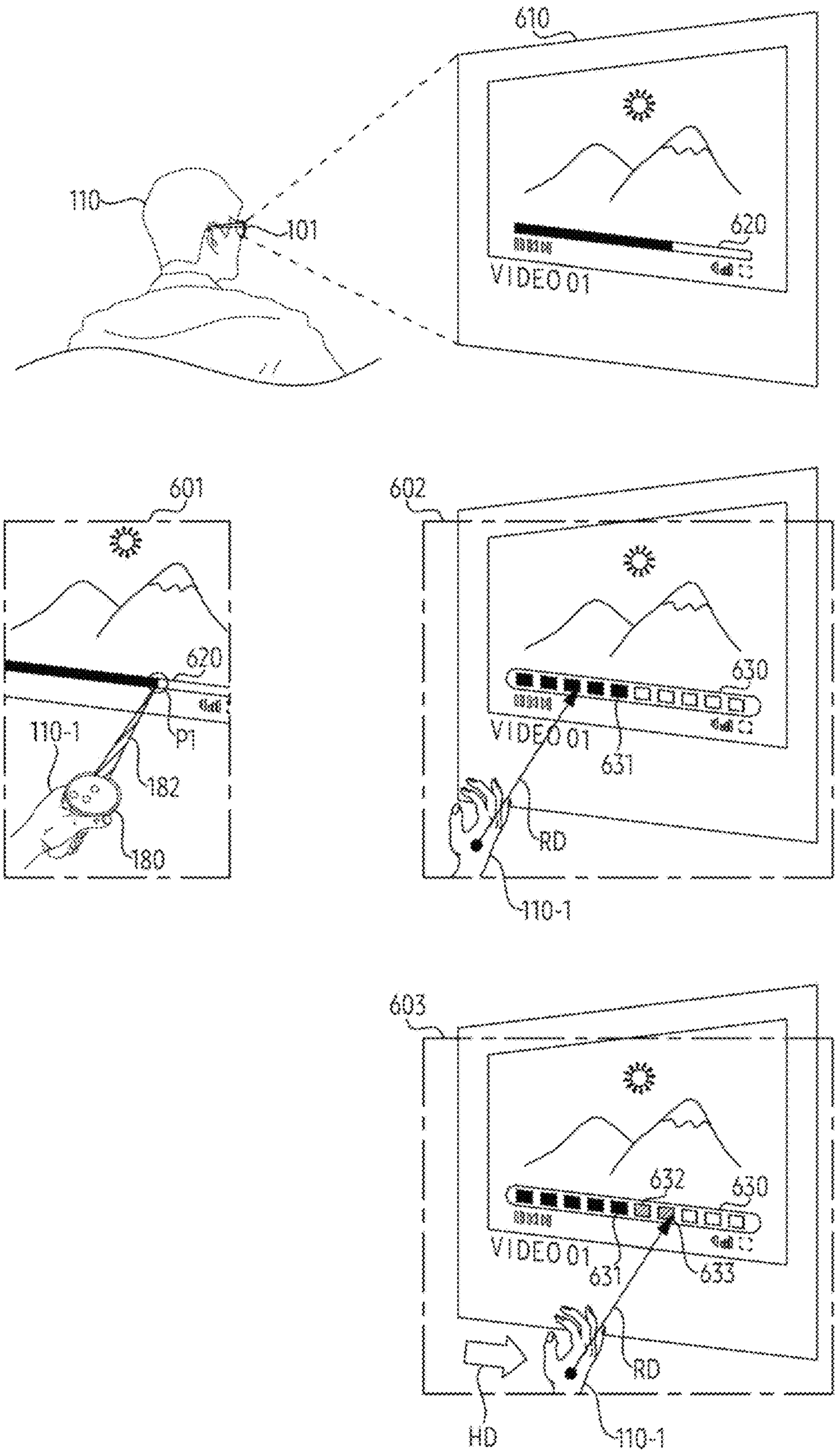
FIGS. 6A, 6B, and 6C illustrate an example of an operation in which a wearable device displays a visual object having a shape of a slider, according to an embodiment.
Figure 6B:
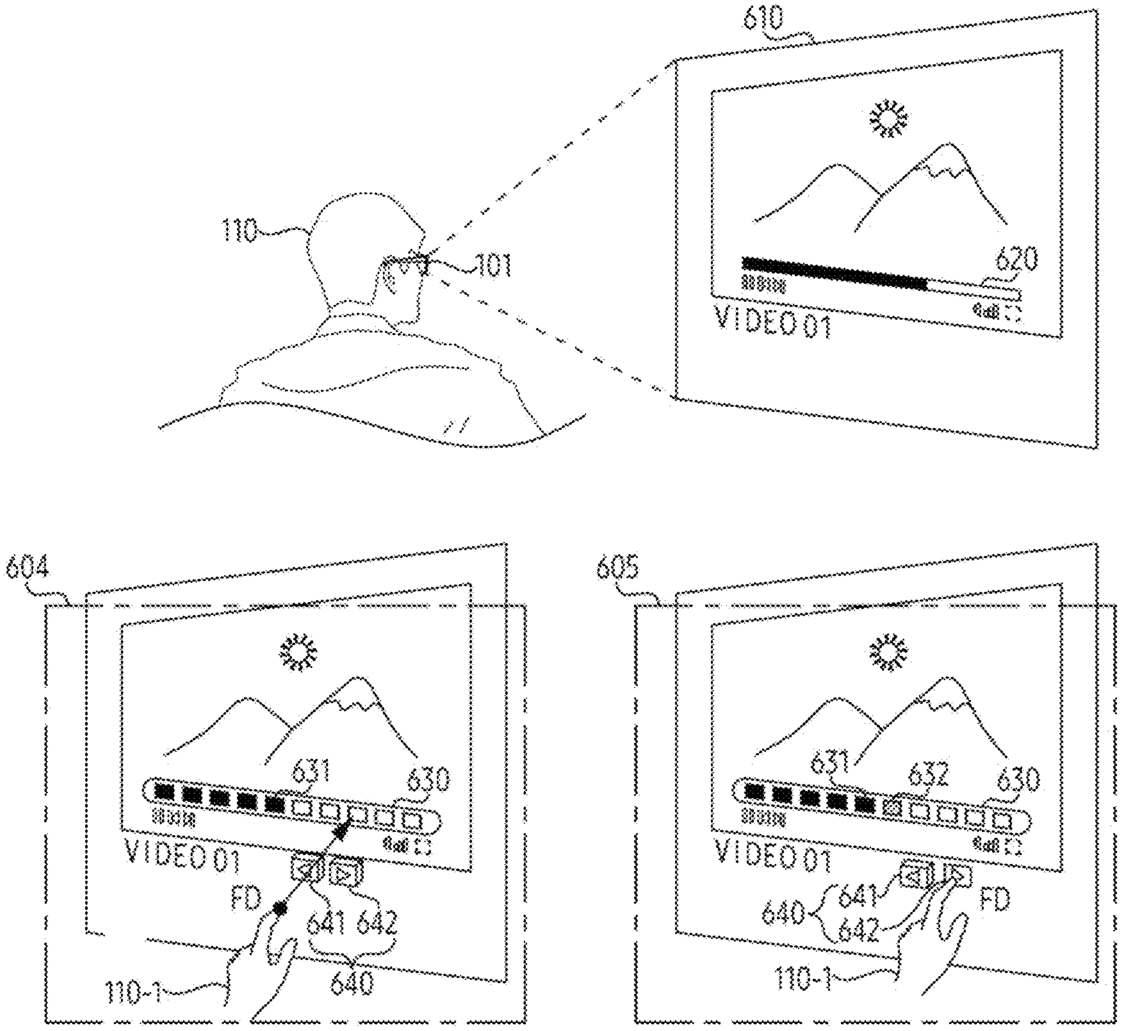
Figure 6C:
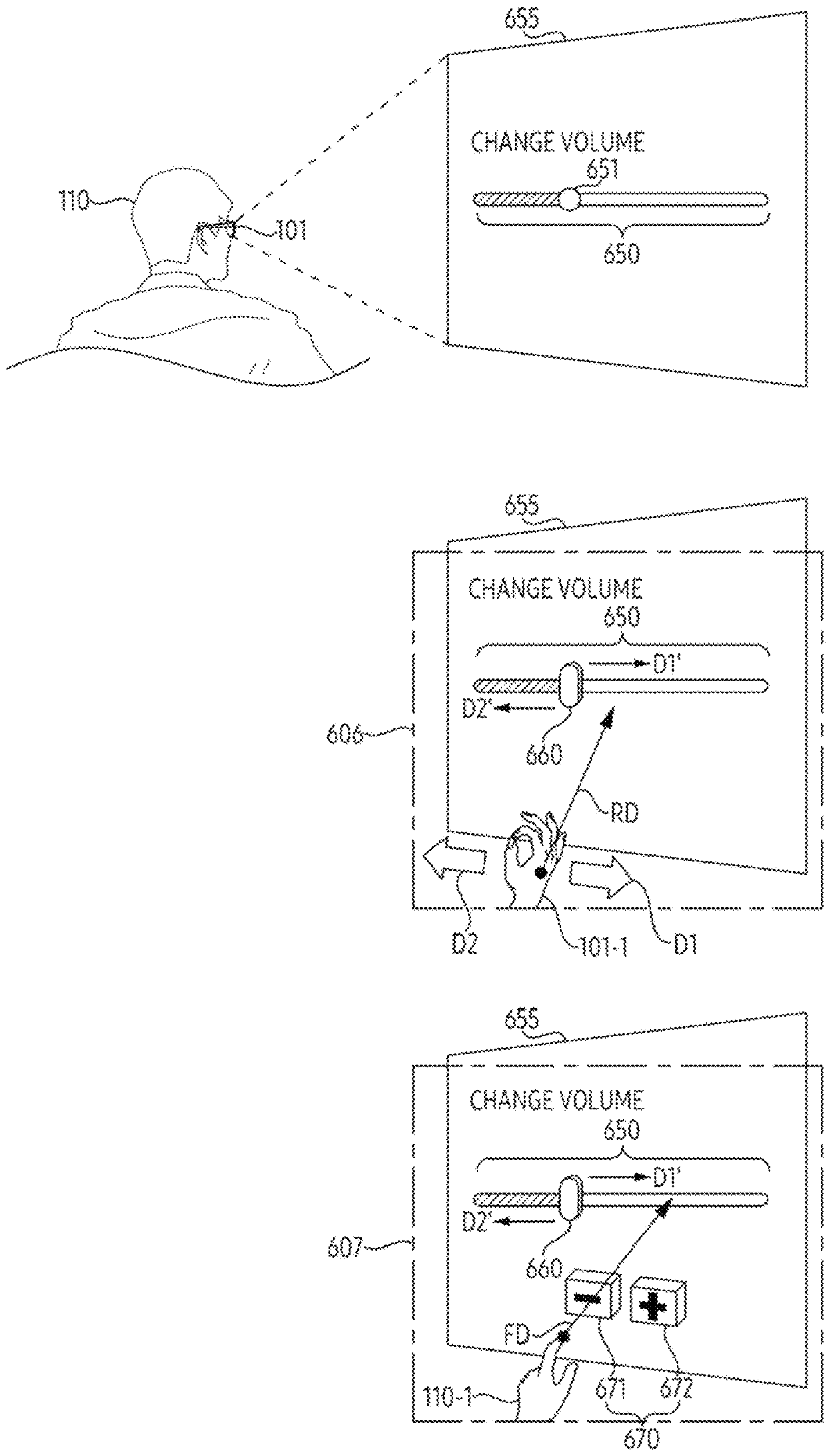

FIGS. 6A, 6B, and 6C illustrate an example of an operation in which a wearable device 101 displays a visual object having a shape of a slider 620, according to an embodiment. The wearable device 101 of FIGS. 1 and 2 may include the wearable device 101 of FIGS. 6A, 6B, and 6C. Referring to FIGS. 6A, 6B, and 6C, different states 601, 602, 603, 604, 605, 606, and 607 of the wearable device 101 displaying a screen 610 including the slider 620 are illustrated.

Referring to FIGS. 6A, 6B, and 6C, according to an embodiment, the wearable device 101 may display the screen 610 based on execution of an application for playing a video. The wearable device 101 may display, on the screen 610, one or more visual objects for controlling playback of a video, together with the video. The one or more visual objects may include one or more buttons for pausing playback of the video or adjusting a time point at which the video is played. With respect to the one or more buttons, the wearable device 101 may perform the operation described with reference to FIGS. 5A and 5B. The wearable device 101 may display a visual object (e.g., the slider 620) for searching for a video included in the screen 610. According to an embodiment, the slider 620 may be referred to as a search bar and/or a seek bar.

Referring to FIG. 6A, in a state 601 connected to the external electronic device 180, the wearable device 101 may display a ray 182 extending from the external electronic device 180. In the state 601 of displaying the ray 182 facing the slider 620, the wearable device 101 may execute a function of the slider 620 based on a signal of the external electronic device 180. For example, in the state 601 of displaying the ray 182 facing a point P1 of the slider 620, the wearable device 101 may search for a video included in the screen 610 based on a position of the point P1 within the slider 620, in response to a signal indicating the pressing of a designated button (e.g., click button) of the external electronic device 180. For example, based on the input, the wearable device 101 may play a video at a time point corresponding to the point P1 of the screen 610.

Referring to FIG. 6A, in a state 602 of displaying the hand 110-1 having a shape of an idle gesture, the wearable device 101 may determine a second direction RD of the hand 110-1, based on the recognition of an image (e.g., the image 226-1 of FIG. 2) including the hand 110-1. In the state 602, the wearable device 101 identifying the second direction RD toward the slider 620 may replace the slider 620 with a slider 630 having a shape for interaction based on the hand 110-1. The slider 630 may support discrete search of video using a finite number of time periods. The wearable device 101 may display blocks sequentially displayed on the slider 630 in different colors, with a block 631 corresponding to a time period including a current time point of the video displayed through the screen 610, as a boundary.

Referring to FIG. 6A, in the state 602 of displaying the slider 630, the wearable device 101 may switch to a state 603 when identifying a pinch gesture with respect to the slider 630. In the state 603, based on movement of the hand 110-1 having a shape of the pinch gesture, the wearable device 101 may execute a function of searching for a video based on the slider 630. Referring to FIG. 6A, based on identifying the hand 110-1 moving along a direction HD, the wearable device 101 may change, on the slider 630, a color of blocks 632 and 633 subsequent to the block 631 corresponding to a current time point. The wearable device 101 may search for a video, based on time periods corresponding to the blocks 632 and 633 having the changed color. In the state 603 of FIG. 6A, the wearable device 101 may play a time period corresponding to the block 633 overlapping the second direction RD of the hand 110-1 within the video corresponding to the slider 630.

Although the operation of the wearable device 101 based on the hand 110-1 switched from the idle gesture to the pinch gesture has been described, embodiments are not limited thereto. Referring to FIG. 6B, example states 604 and 605 in which the wearable device 101 identifies the pointing gesture are illustrated. In the state 604, the wearable device 101 may display a group 640 of buttons 641 and 642 for controlling the slider 630 at a position adjacent to a fingertip of the index finger of the hand 110-1, based on identifying the hand 110-1 having a shape of the pointing gesture. The buttons 641 and 642 may be arranged parallel to a direction in which the slider 630 is displayed. The button 641 may correspond to a function for searching for a time point prior to a current time point of a video displayed on the screen 610. The button 642 may correspond to a function for searching for a time point subsequent to the current time point. In the state 604 of displaying the group 640 of the buttons 641 and 642, the wearable device 101 may receive an input for selecting one of the buttons 641 and 642, based on the first direction FD of the index finger of the hand 110-1.

Referring to FIG. 6B, an example state 605 in which the wearable device 101 receives a gesture for selecting the button 642 is illustrated. In the state 605, the wearable device 101 may deform the button 642 to guide the reception of the gesture. For example, the wearable device 101 may visualize an animation in which the button 642 is pressed, based on the deformation of the button 642. In response to a gesture of selecting the button 642, the wearable device 101 may play a time period corresponding to the block 632, subsequent to the block 631 corresponding to the current time point on the slider 630. The wearable device 101 may change a color of the block 632 in response to the gesture on the button 642.

The shape of the slider 620 is not limited to the embodiment of FIGS. 6A to 6B. Referring to FIG. 6C, the wearable device 101 according to an embodiment may display a screen 655 including a slider 650 including a handle 651. Within the slider 650, the wearable device 101 may display magnitude of a parameter corresponding to the slider 650, by using a position of the circular handle 651. When an external electronic device (e.g., the external electronic device 180 of FIGS. 1 and 2) is identified, the wearable device 101 may change the parameter based on a signal of the external electronic device, in a state of displaying the slider 650.

Referring to FIG. 6C, based on identifying the hand 110-1 having a shape of the idle gesture, the wearable device 101 may replace the handle 651 of the slider 650 with the handle 660 having a shape for guiding the identification of the hand 110-1. The handle 660 may protrude toward the user 110 from the screen 655 including the slider 650, based on a three-dimensional shape. For example, a binocular disparity of the handle 660 may be greater than a binocular disparity of the slider 650. In a state 606 of identifying a pinch gesture performed by the hand 110-1 having the second direction RD toward the slider 650, the wearable device 101 according to an embodiment may move, on the slider 650, the handle 660, based on movement of the hand 110-1. For example, the wearable device 101 identifying the hand 110-1 moved along a direction D1 in which the slider 650 is extended may move the handle 660 along a direction D1'. For example, the wearable device 101 identifying the hand 110-1 moved along a direction D2 opposite to the direction D1 may move the handle 660 along a direction D2'. Based on the movement of the handle 660, the wearable device 101 may change a parameter corresponding to the slider 650.

Referring to FIG. 6C, in a state 607 of identifying the hand 110-1 having a shape of a pointing gesture with respect to the slider 650, the wearable device 101 may display a group 670 of buttons 671 and 672 adjacent to the hand 110-1, together with the handle 660 replaced from the handle 651. The wearable device 101 may identify the pointing gesture toward the slider 650, based on the first direction FD of the index finger included in the hand 110-1. In the state 607, the wearable device 101 may change a parameter corresponding to the slider 650, in response to a gesture of the hand 110-1 pressing one of the buttons 671 and 672. The wearable device 101 may move the handle 660 overlapped on the slider 650, based on the changed parameter. For example, in response to the input of pressing the button 671, the wearable device 101 may reduce the parameter and move the handle 660 along the direction D2' corresponding to the reduced parameter. For example, in response to the input of pressing the button 672, the wearable device 101 may increase the parameter and move the handle 660 along the direction D1' corresponding to the increased parameter.

As described above, according to an embodiment, the wearable device 101 may change one or more visual objects, based on a gesture of the hand 110-1 that moves independently of an external electronic device. The wearable device 101 may support precise control of the slider 620 based on the hand 110-1, by enlarging a handle included in the slider 620, or using the buttons 671 and 672 displayed at a position adjacent to the hand 110-1.

The operation of the wearable device 101 based on the slider 620 for receiving the hand 110-1 moving along one of linear movements (e.g., directions D1 and D2) has been described, but embodiments are not limited thereto. Hereinafter, an example of an operation in which the wearable device 101 changes and/or replaces a visual object for receiving a curved movement, such as a dial, will be described with reference to FIGS. 7A and 7B.

Figure 7A:
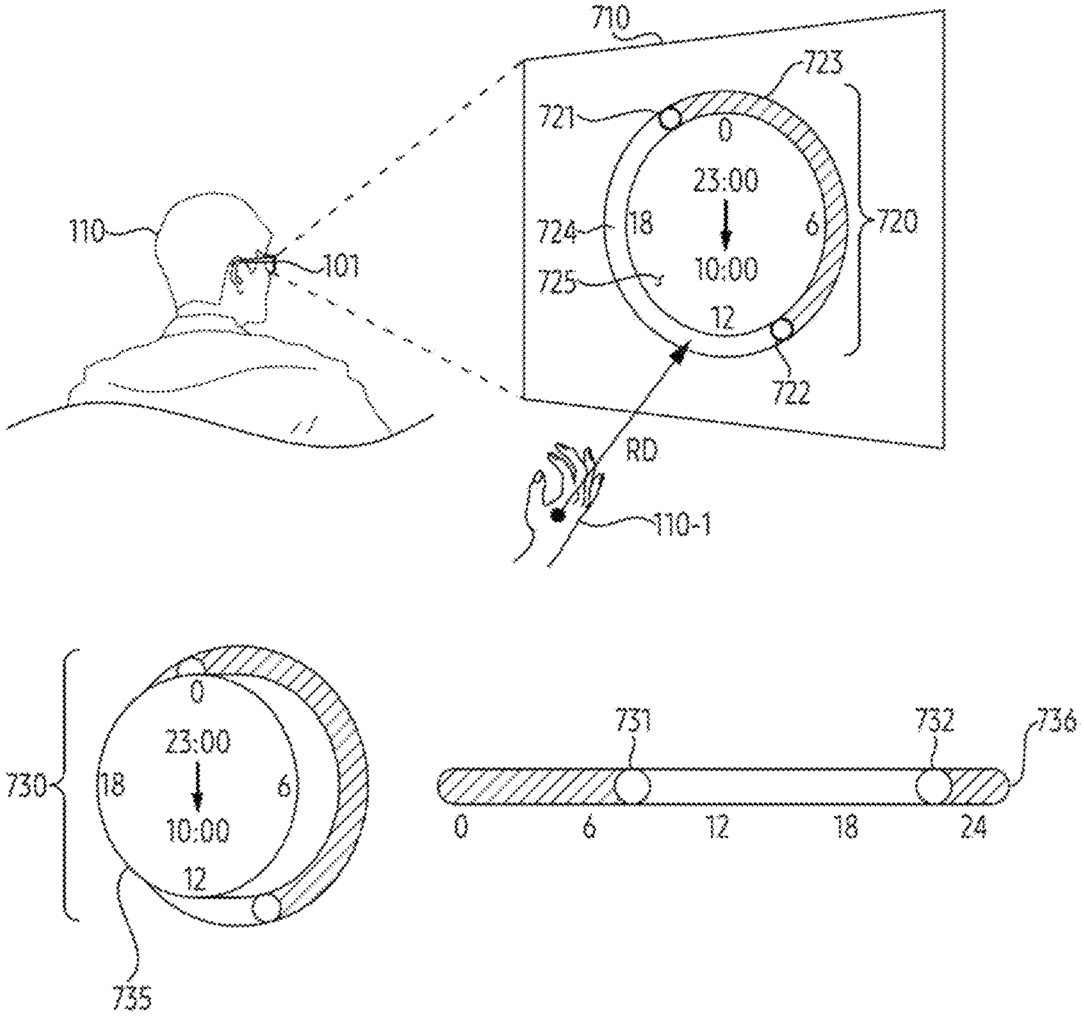
FIGS. 7A and 7B illustrate an example of an operation in which a wearable device displays a visual object having a shape of a dial, according to an embodiment.
Figure 7B:
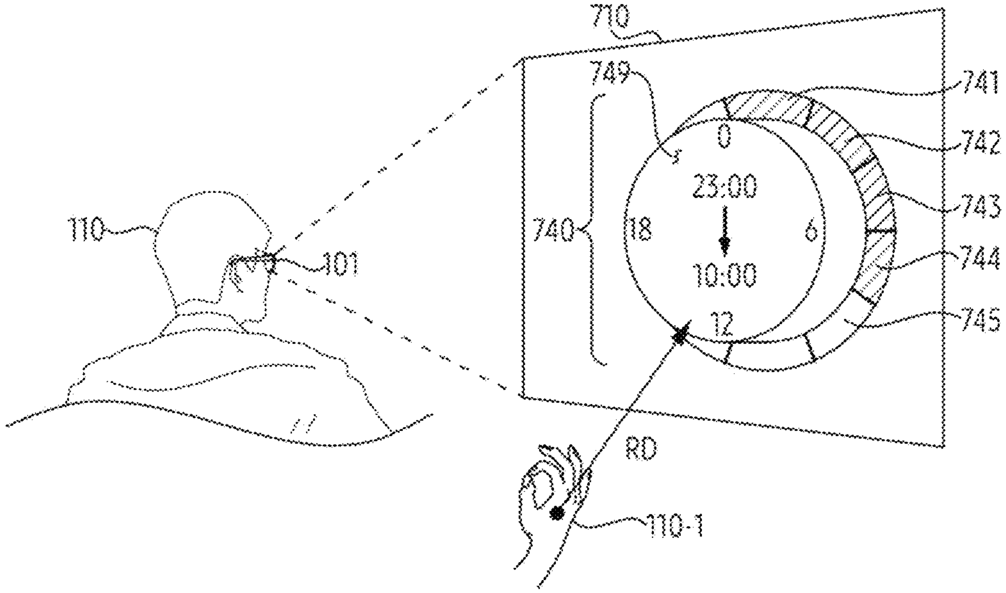

FIGS. 7A and 7B illustrate an example of an operation in which a wearable device 101 displays a visual object having a shape of a dial, according to an embodiment. The wearable device 101 of FIGS. 1 and 2 may include the wearable device 101 of FIGS. 7A and 7B. Referring to FIGS. 7A and 7B, different states of the wearable device 101 displaying a screen 710 including a dial 720 are illustrated.

Referring to FIG. 7A, according to an embodiment, the wearable device 101 may display the dial 720 for adjusting a parameter (e.g., time) circulated on the screen 710. The dial 720 may include an area 725 having a shape of a circle and one or more handles 721 and 722 disposed along a circumference of the area 725. The wearable device 101 may fill sections 723 and 724 divided by the one or more handles 721 and 722 in the circumference of the dial 720 with different colors. For example, the wearable device 101 displaying the dial 720 for receiving a parameter with respect to a time period less than or equal to 24 hours may display a handle 721 at a point on a circumference corresponding to a start time point of the time period, and a handle 722 at a point on a circumference corresponding to an end time point of the time period. The wearable device 101 may fill a section 723 between the handles 721 and 722 in the circumference with a designated color (e.g., blue) indicating that it corresponds to a time period, and fill a section 724 different from the section 723 with another color (e.g., black) different from the designated color. The wearable device 101 may display, on the area 725, text (e.g., a time period between 23 and 10 o'clock) indicating a time period corresponding to the dial 720.

In an example state of FIG. 7A, the wearable device 101 may identify the hand 110-1 having a second direction RD toward the dial 720. The wearable device 101 may change a parameter corresponding to the dial 720, based on a shape of the hand 110-1 having the second direction RD. Referring to FIG. 7A, the wearable device 101 identifying the hand 110-1 having a shape of the idle gesture may change the two-dimensional dial 720 to a three-dimensional dial 730. The dial 730 may be displayed by the wearable device 101 to adjust a parameter of the dial 720 based on a gesture performed by the hand 110-1. The wearable device 101 may display text representing a parameter on a side of an area 735 protruding toward the user 110, on the dial 730.

Referring to FIG. 7A, in order to support control of a parameter based on the hand 110-1, the wearable device 101 may display a visual object 736 having a shape of a straight line, together with the dial 730. The visual object 736 may include one or more handles 731 and 732 for indicating the parameter. In an embodiment, when a width of the screen 710 is smaller than a length of the visual object 736, the wearable device 101 may enlarge a size of a screen 810, based on the length of the visual object 736. The wearable device 101 may change the parameter based on the hand 110-1 facing the visual object 736 and/or a gesture (e.g., the pinch gesture) performed by the hand 110-1. For example, the wearable device 101 may change the parameter according to a position of the hand 110-1, based on identifying the pinch gesture performed by the hand 110-1 having a direction toward one of handles 731 and 732.

The shape of the dial 730 displayed by the wearable device 101 is not limited to the embodiment of FIG. 7A. Referring to FIG. 7B, another example of a dial 740 displayed by the wearable device 101 by replacing the dial 720 of FIG. 7A is illustrated. Referring to FIG. 7B, the wearable device 101 may display the dial 740 that protrudes toward the user 110 and includes an area 749 having a shape of cylinder. The area 749 may include text representing a parameter corresponding to the dial 740. The wearable device 101 may discretely divide the circumference of the dial 740, based on blocks 741, 742, 743, 744, and 745.

In an embodiment of FIG. 7B, the wearable device 101 may change a parameter corresponding to the dial 740 according to a moving direction of the hand 110-1, in response to identifying the hand 110-1 having the second direction RD toward the dial 740 and having a shape of the pinch gesture. The wearable device 101 may change the parameter based on the hand 110-1 moved along the circumference, and may change text included in the area 749, and/or colors of each of the blocks 741, 742, 743, 744, and 745 based on the changed parameter.

As described above, according to an embodiment, in a state of identifying the hand 110-1 that moves independently of an external electronic device (e.g., the external electronic device 180 of FIGS. 1 and 2), the wearable device 101 may change the dial 720 to another dial (e.g., dials 730 and 740) having a shape for interacting with the hand 110-1. Based on the other dial, the wearable device 101 may support precise control of a parameter corresponding to the dial.

Hereinafter, an example of an operation in which the wearable device 101 performs replacement and movement of a visual object based on a distance at which the screen is displayed will be described with reference to FIG. 8.

Figure 8:
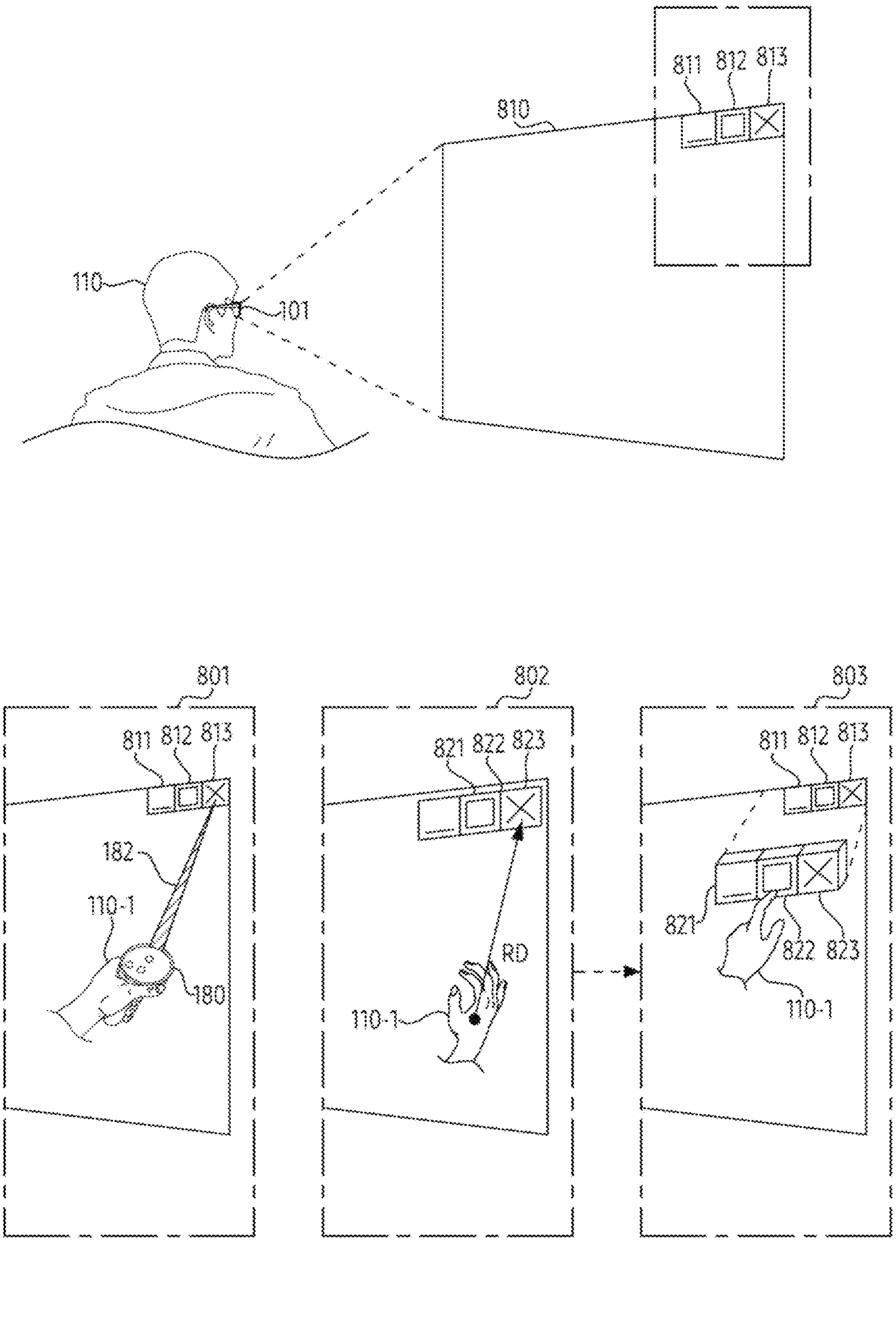
FIG. 8 illustrates an example of an operation in which a wearable device displays a visual object having a shape of a button, according to an embodiment.

FIG. 8 illustrates an example of an operation in which a wearable device 101 displays a visual object having a shape of a button, according to an embodiment. The wearable device 101 of FIGS. 1 and 2 may include the wearable device 101 of FIG. 8. Referring to FIG. 8, different states 801, 802, and 803 of the wearable device 101 displaying a screen 810 including a group of buttons 811, 812, and 813 are illustrated.

Referring to FIG. 8, according to an embodiment, the wearable device 101 may display buttons 811, 812, and 813 matched to different functions for the screen 810. Although an example case for displaying the buttons 811, 812, and 813 on the upper right of the screen 810 is shown, positions of the buttons 811, 812, and 813 within the screen 810 are not limited to an embodiment of FIG. 8. For example, the button 811 may correspond to a function of minimizing a size of the screen 810 or replacing the screen 810 with a shortcut key such as an icon. For example, the button 812 may correspond to a function of maximizing a size of screen 810. Maximizing the size of the screen 810 may include an operation of enlarging the screen 810 to a size of FoV of the user 110 wearing the wearable device 101. For example, the button 813 may correspond to a function of stopping the display of the screen 810. Stopping the display of the screen 810 may include an operation of terminating an application corresponding to the screen 810.

Referring to FIG. 8, the wearable device 101 may maintain displaying the buttons 811, 812, and 813, in a state 801 of displaying an external electronic device 180. The wearable device 101 may identify whether one of the buttons 811, 812, and 813 is focused by the user 110 based on whether a ray 182 extending from the external electronic device 180 overlaps each of the buttons 811, 812, and 813.

Referring to FIG. 8, in a case of identifying the hand 110-1 without an external electronic device 180, the wearable device 101 may change a visual object included in a category for interacting with the user 110, such as buttons 811, 812, and 813, based on a shape and/or a position of the hand 110-1. For example, in a state 802 of identifying the hand 110-1 having a shape of the idle gesture, the wearable device 101 may display buttons 821, 822, and 823 having a size larger than the buttons 811, 812, and 813, in response to identifying the second direction RD of the hand 110-1 toward the button 813. The wearable device 101 may replace the buttons 811, 812, and 813 with the buttons 821, 822, and 823, based on identifying the hand 110-1 having the second direction RD toward one of the buttons 811, 812, and 813. Based on the replaced buttons 821, 822, and 823, the wearable device 101 may improve the accuracy of selecting one of the buttons 821, 822, and 823 based on the second direction RD.

Referring to FIG. 8, in a state 830 of identifying the hand 110-1 having a shape of the pointing gesture, the wearable device 101 may replace the buttons 811, 812, and 813 pointed by the hand 110-1 with the buttons 821, 822, and 823, and move the buttons 821, 822, and 823 toward the hand 110-1. Referring to FIG. 8, in the state 803, the wearable device 101 may display the buttons 821, 822, and 823, based on a distance of a fingertip of the index finger of the hand 110-1. In the state 803, the user 110 may see the buttons 821, 822, and 823 floating at the fingertip. When the screen 810 is floating at a distance greater than a threshold distance (e.g., 50 cm), the wearable device 101 may support control of the screen 810 based on the pointing gesture, by using the buttons 821, 822, and 823 moved to the fingertip.

As described above, according to an embodiment, the wearable device 101 may adjust a distance of the replaced visual object, along with the replacement of the visual object. Based on the adjusted distance, the wearable device 101 may improve the accuracy of an interaction between the hand 110-1 and the replaced visual object. Hereinafter, an example of an operation in which the wearable device 101 changes and/or replaces a visual object for a toggle of a parameter, such as a switch, will be described with reference to FIGS. 9A, 9B, and 9C.

Figure 9A:
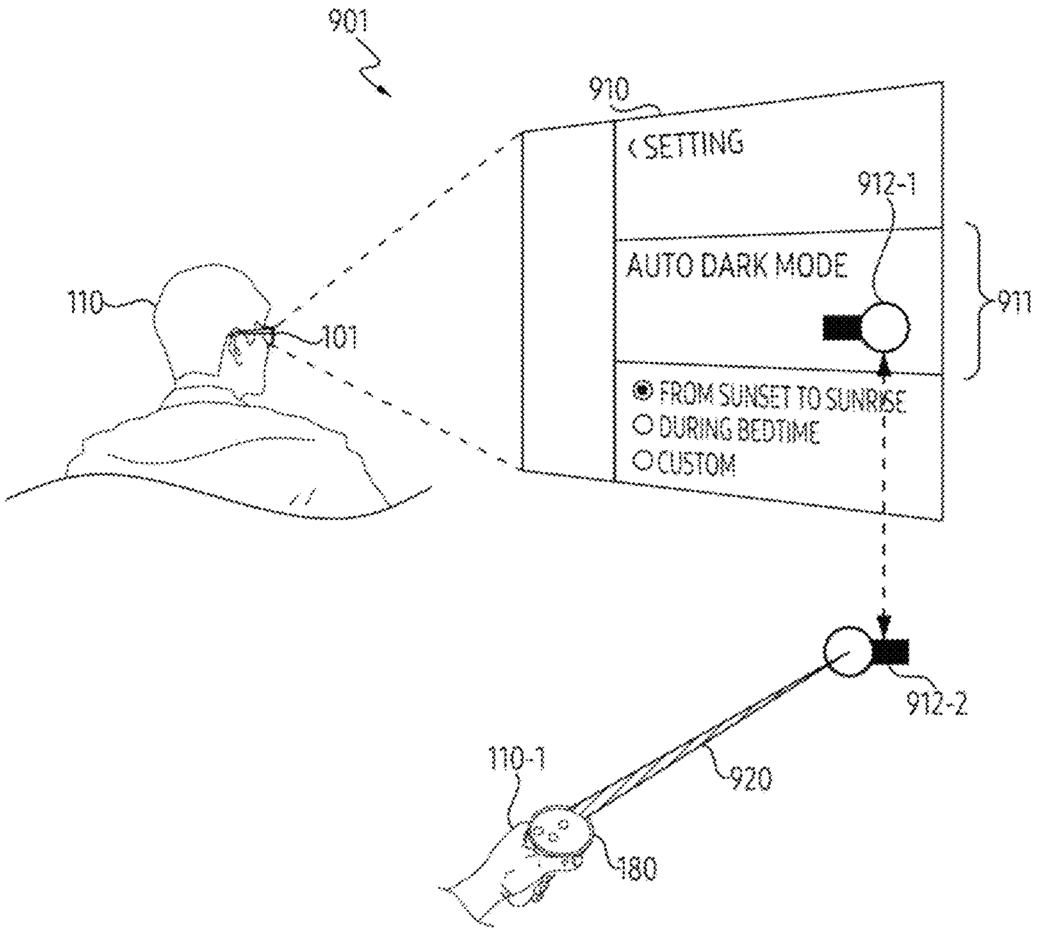
FIGS. 9A, 9B, and 9C illustrate an example of an operation in which a wearable device displays a visual object having a shape of a switch, according to an embodiment.
Figure 9B:
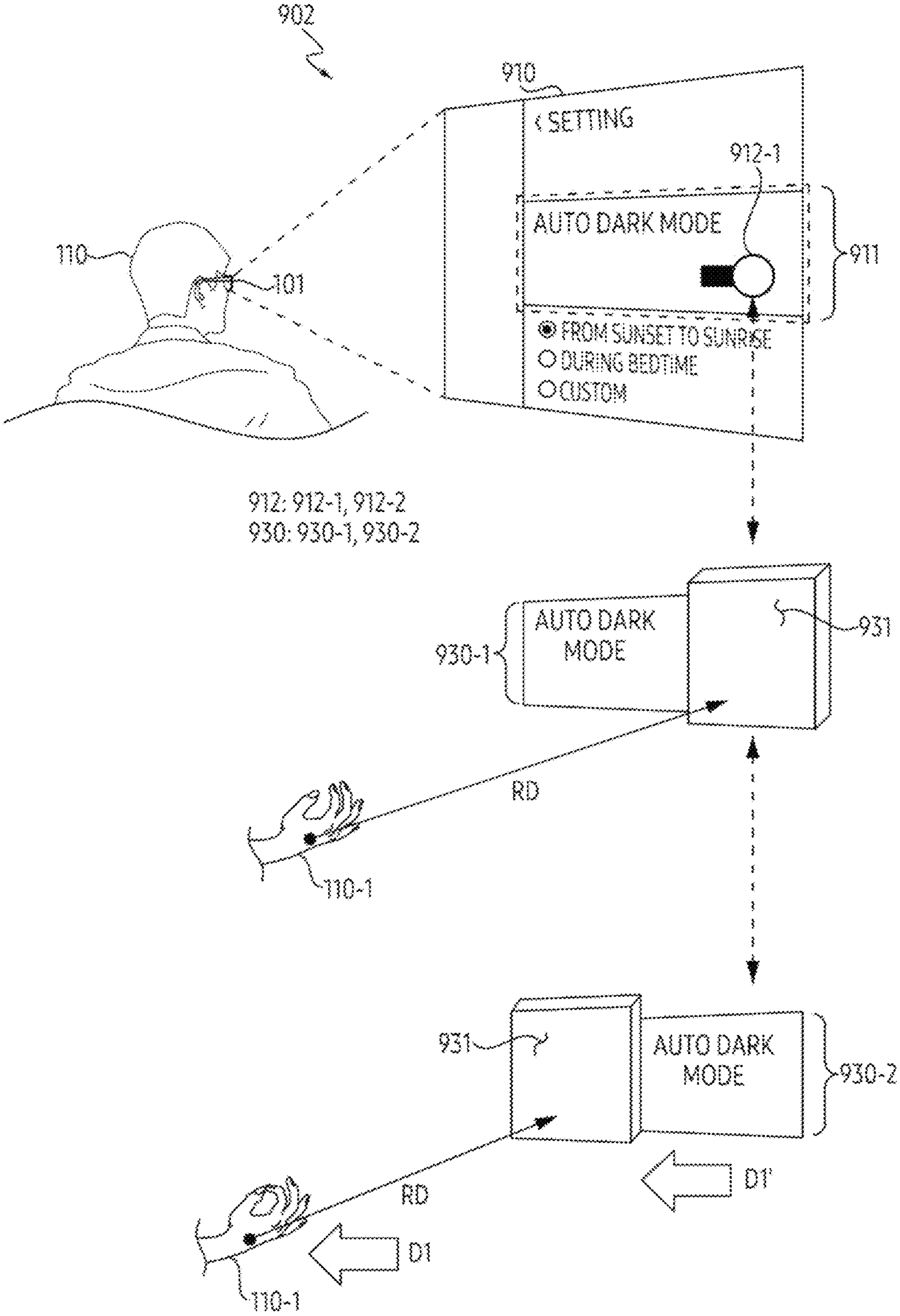
Figure 9C:
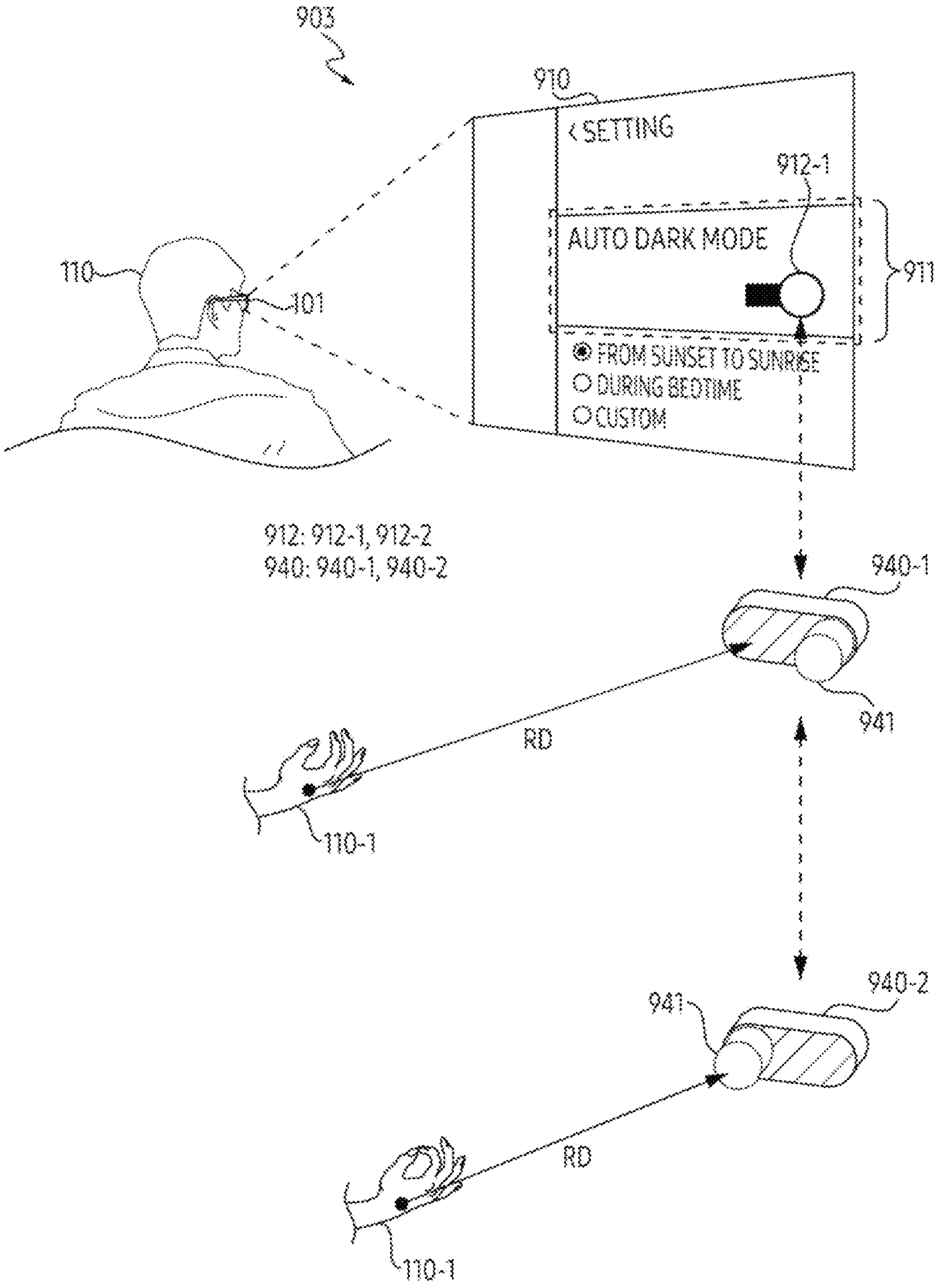

FIGS. 9A, 9B, and 9C illustrate an example of an operation in which a wearable device 101 displays a visual object having a shape of a switch, according to an embodiment. The wearable device 101 of FIGS. 1 and 2 may include the wearable device 101 of FIGS. 9A, 9B, and 9C. Referring to FIGS. 9A, 9B, and 9C, different states 901, 902, and 903 of the wearable device 101 displaying a screen 910 including a switch 912 are illustrated.

Referring to FIG. 9A, according to an embodiment, the wearable device 101 may display the switch 912 indicating a toggle of a parameter, based on a position of a handle. In a state 901, the wearable device 101 may display, on an area 911 corresponding to a parameter, the switch 912 for adjusting the parameter. The wearable device 101 may indicate that the parameter corresponds to a first value among two values (e.g., values respectively corresponding to activation and deactivation), by using a switch 912-1 corresponding to the first value. It is assumed that the wearable device 101 displays the handle at a right edge, in the switch 912-1.

In the state 901 of FIG. 9A, the wearable device 101 may identify an external electronic device 180 attached to the hand 110-1. In a state of identifying the external electronic device 180, the wearable device 101 may execute a function corresponding to the switch 912, based on an interaction between the switch 912 and the external electronic device 180, independently of replacing the switch 912. For example, in the state 901 of displaying a ray 920 extending from the external electronic device 180 toward the switch 912, the wearable device 101 may receive an input for toggling the switch 912 based on the external electronic device 180. In response to the input, the wearable device 101 may change the switch 912-1 corresponding to the first value to the switch 912-2 corresponding to a second value. The wearable device 101 may indicate that a parameter corresponding to the switch 912-2 is changed to the second value, by displaying the switch 912-2 including a handle moved to a left edge.

According to an embodiment, the wearable device 101 may identify the hand 110-1 facing the switch 912 independently of the external electronic device 180. Referring to FIG. 9B, the wearable device 101 may identify the switch 912 and/or the hand 110-1 having a second direction RD toward an area 911 including the switch 912. In a state 902 of identifying the hand 110-1 that has a shape of the idle gesture and faces the switch 912, the wearable device 101 may support toggling a parameter corresponding to the switch 912 using the hand 110-1, by replacing the switch 912 and the area 911 including the switch 912.

Referring to FIG. 9B, in the state 902, the wearable device 101 may replace the area 911 with a visual object 930 for controlling a parameter corresponding to the switch 912. The visual object 930 may include a handle 931 including text included in the area 911 and corresponding to a handle of the switch 912. A position of the handle 931 in the visual object 930 may be coupled to one of a left edge or a right edge of the area 911, similar to a position of a handle in the switch 912. While displaying the switch 912-1 corresponding to the first value, the wearable device 101 may display a visual object 930-1 corresponding to the first value, based on identifying the hand 110-1 having the second direction RD toward the switch 912-1 and having a shape of the idle gesture. Referring to FIG. 9B, the wearable device 101 may display the handle 931 coupled to a right edge of the visual object 930, similar to the switch 912-1 including the handle moved to a right edge. Since the wearable device 101 displays the handle 931 in three-dimensions, the handle 931 may have a shape protruding toward the user 110 on the screen 910.

Referring to FIG. 9B, while displaying the visual object 930-1 corresponding to the first value, the wearable device 101 may identify a pinch gesture performed by the hand 110-1 facing the visual object 930-1. Based on identifying the pinch gesture, the wearable device 101 may move the handle 931 along a direction of the hand 101-1. Based on the movement of the handle 931, the wearable device 101 may toggle a parameter corresponding to the visual object 930-1 and/or the switch 912. The wearable device 101 displaying the visual object 930-1 corresponding to the first value may move the handle 931 along a direction D1', in response to identifying that the hand 110-1 having a shape of the pinch gesture moves in a direction D1 toward a left edge of the visual object 930-1. Based on identifying the handle 931 moved to the left edge along the direction D1', the wearable device 101 may change the parameter to a second value corresponding to the left edge. The wearable device 101 may display a visual object 930-2 corresponding to the second value. In a state of displaying the visual object 930-2 corresponding to the second value, the wearable device 101 may toggle the parameter again, based on identifying movement of the hand 110-1 having a shape of the pinch gesture (e.g., movement of the visual object 930-2 to the right edge).

As described above with reference to FIG. 9B, the wearable device 101 may support toggling a parameter corresponding to the switch 912, based on a gesture of the hand 110-1 by using the visual object 930 having a size of the area 911 including the switch 912. However, embodiments are not limited thereto, and the wearable device 101 may replace the switch 912 displayed in two dimensions with a visual object having a three-dimensional shape.

In a state 903 of displaying the hand 110-1 having the second direction RD facing the switch 912 and having a shape of the idle gesture, the wearable device 101 may change the switch 912 to a switch 940 having a three-dimensional shape. The switch 940 may have a shape protruding from the screen 910 toward the user 110, based on the three-dimensional shape. In the state 903 of displaying the switch 912-1 including a handle disposed at the right edge based on the first value, the wearable device 101 may display a switch 940-1 including a handle 941 disposed at the right edge, based on identifying the hand 110-1 of the idle gesture facing switch 912-1. While displaying the switch 940-1 corresponding to the first value, the wearable device 101 may move the handle 941 to the left edge of the switch 940-1, based on identifying the hand 110-1 having a shape of the pinch gesture. Substantially simultaneously with moving the handle 941 to the left edge of the switch 940-1, the wearable device 101 may change a parameter corresponding to the switch 940-1 to the second value by toggling the parameter. Based on the changed second value, the wearable device 101 may display a switch 940-2 including a handle 941 moved to the left edge.

As described above, according to an embodiment, the wearable device 101 may replace and/or change a visual object designed to receive an input from the user 110, such as a scroll bar, button, icon, slider, dial, and/or switch, into a shape suitable for input means. However, embodiments are not limited thereto. Hereinafter, an example of an operation in which the wearable device 101 changes and/or replaces a cursor and/or a virtual object with a visual object designed to receive an input will be described with reference to FIGS. 10A and 10B.

Figure 10A:
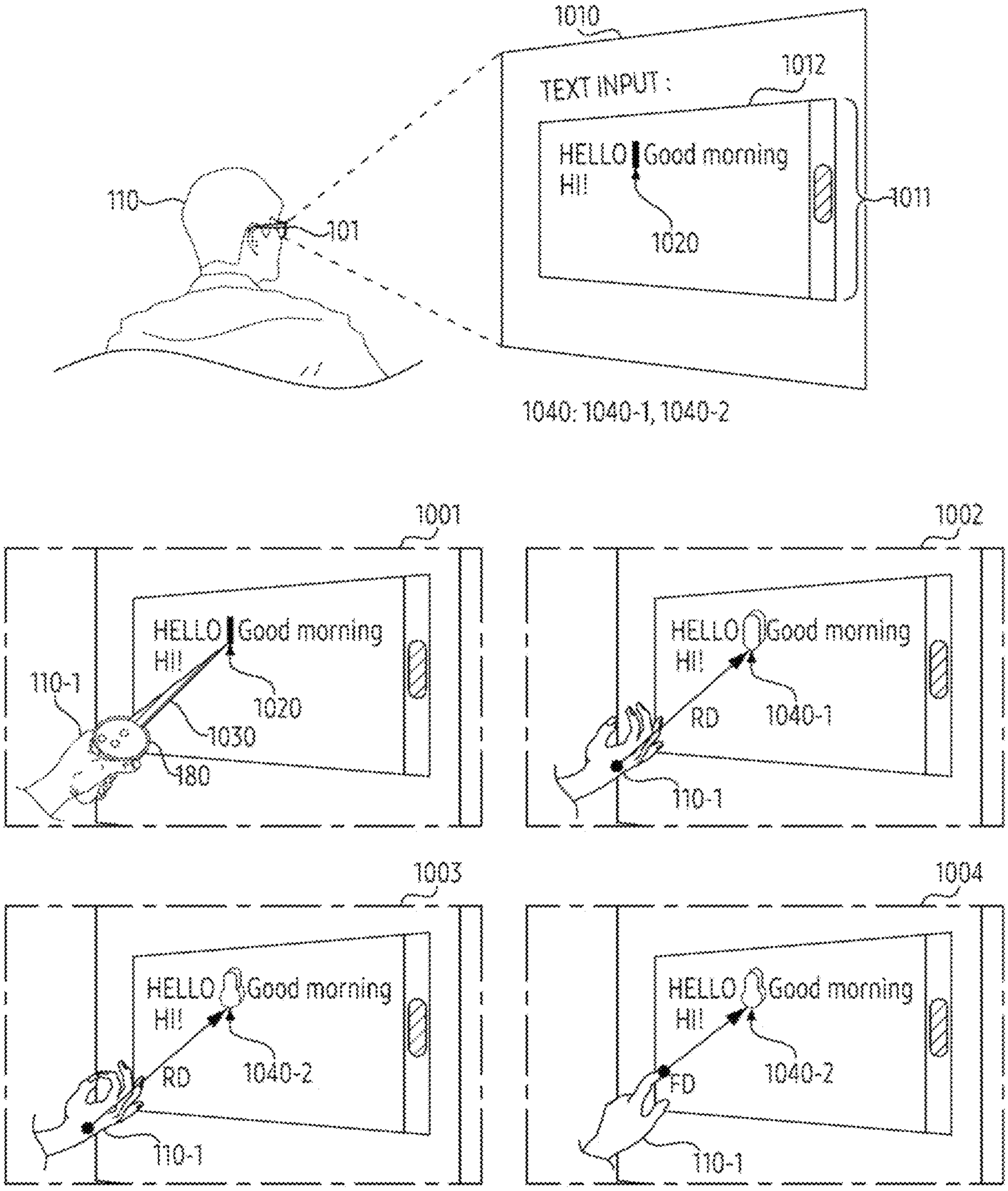
FIGS. 10A and 10B illustrate an example of an operation in which a wearable device displays a cursor and/or a virtual object, according to an embodiment.
Figure 10B:
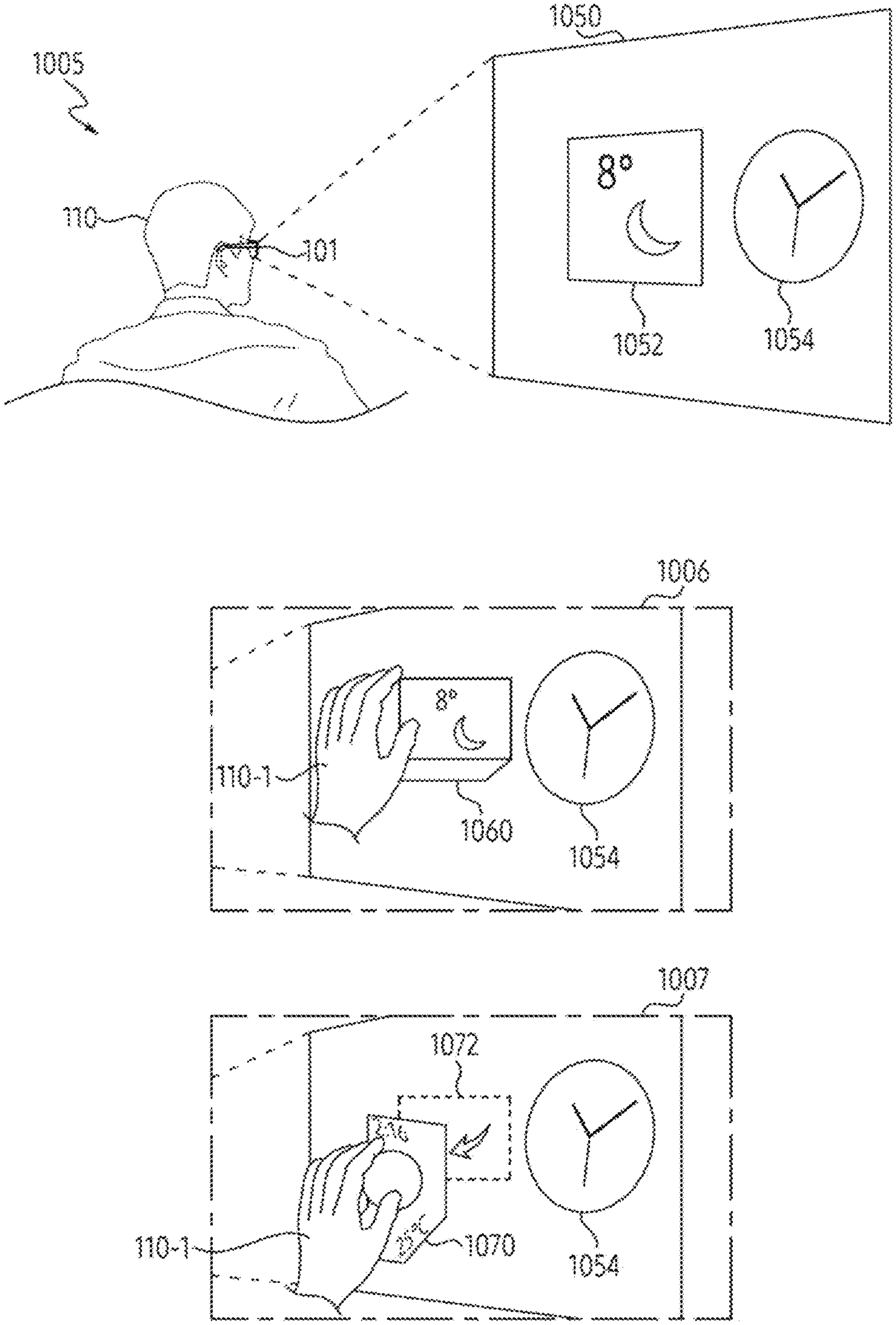

FIGS. 10A and 10B illustrate an example of an operation in which a wearable device 101 displays a cursor 1020 and/or a virtual object, according to an embodiment. The wearable device 101 of FIGS. 1 and 2 may include the wearable device 101 of FIGS. 10A and 10B. Referring to FIG. 10A, different states 1001, 1002, 1003, and 1004 of the wearable device 101 displaying a screen 1010 including the cursor 1020 are illustrated.

Referring to FIG. 10A, the wearable device 101 may display, on the screen 1010, a text box 1012 for obtaining text from the user 110. In order to obtain text from the user 110, the wearable device 101 may display a virtual keyboard on the FoV of the user 110, in response to an input of selecting the text box 1012. When the wearable device 101 is connected to a keyboard device, the wearable device 101 may obtain the text based on a signal received from the keyboard device. Together with the text box 1012, the wearable device 101 may display a scroll bar 1011 for scrolling text displayed through the text box 1012. An operation of the wearable device 101 related to the scroll bar 1011 may be similar to the operation described with reference to FIGS. 4A and 4B. Within the text box 1012, the wearable device 101 may display the cursor 1020 for adding, deleting and/or changing text.

According to an embodiment, the wearable device 101 may identify an input for moving the cursor 1020, based on an external electronic device 180 and/or a hand 110-1. In a state 1001 of being connected to the external electronic device 180, the wearable device 101 may identify an input for moving the cursor 1020 based on a ray 1030 extending from the external electronic device 180. For example, in a state 1001 of displaying a ray 1030 facing the cursor 1020, the wearable device 101 may identify the input, based on a button pressed by the hand 110-1 holding the external electronic device 180. In response to the input, the wearable device 101 may move the cursor 1020 within the text box 1012.

Referring to FIG. 10A, in a state 1002 of identifying the hand 110-1 without the external electronic device 180, the wearable device 101 may identify a second direction RD of the hand 110-1 and/or a shape of the hand 110-1. In the state 1002, in response to identifying the second direction RD toward the cursor 1020, the wearable device 101 may replace the cursor 1020 with a visual object 1040. The wearable device 101 may deform the visual object 1040 based on the shape of the hand 110-1. In the state 1002 of identifying the hand 110-1 having a shape of an idle gesture, the wearable device 101 may display a visual object 1040-1 having a shape corresponding to the idle gesture. The visual object 1040-1 may have a height greater than a height of the cursor 1020. The wearable device 101 may display the visual object 1040-1 protruding toward the user 110 on the screen 1010 including the text box 1012, based on three-dimensional rendering.

Referring to FIG. 10A, as in states 1003 and 1004, the wearable device 101 may display, based on identifying the hand 110-1 having a shape of a pinch gesture and/or a pointing gesture, a visual object 1040-2 for guiding movement of the cursor 1020 based on movement of the hand 110-1. The visual object 1040-2 may have a shape protruding from the screen 1010 similarly to the visual object 1040-1. The wearable device 101 may emphasize the visual object 1040-2 by deforming a shape of an end (e.g., lower end) of the visual object 1040-2 into a cylinder. In a state (e.g., states 1003 and 1004) of displaying the visual object 1040-2, the wearable device 101 may perform movement of the visual object 1040-2, based on the movement of the hand 110-1. Based on the moved visual object 1040-2, the wearable device 101 may move the cursor 1020.

Referring to FIG. 10A, in a state (e.g., states 1003 and 1004) of identifying the pinch gesture and/or the pointing gesture, the wearable device 101 identifying the hand 110-1 deformed into the idle gesture may switch to another state of displaying the visual object 1040-1, as in the state 1002. In the other state, the wearable device 101 may display the visual object 1040-1, based on a position moved by the hand 110-1. In the other state, when the hand 110-1 is moved out of the FoV of the user 110, the wearable device 101 may replace the visual object 1040-1 with the cursor 1020.

Referring to FIG. 10B, different states 1005, 1006, and 1007 of the wearable device 101 displaying a screen 1050 including virtual objects 1052 and 1054 are illustrated. In a state 1005 of FIG. 10B, the wearable device 101 may display, on the screen 1050, virtual objects 1052 and 1054 rendered by at least one application. In the state 1005, the wearable device 101 may display, on the screen 1050 having a shape of a two-dimensional plane, the virtual objects 1052 and 1054 in two dimensions.

In the state 1005 of FIG. 10B, the wearable device 101 may identify an input for interacting with a virtual object (e.g., virtual objects 1052 and 1054) included in the screen 1050 based on the hand 110-1. For example, the wearable device 101 may identify the hand 110-1 moved toward a point of an external space corresponding to the virtual object 1052. In a state 1006 of identifying the hand 110-1 moved toward the point, the wearable device 101 may display a virtual object 1060 corresponding to a 3-dimensional graphical representation of the virtual object 1052 that has been displayed in two dimensions. In the state 1006 of FIG. 10B, the wearable device 101 may display the virtual object 1060 at a position where the virtual object 1052 was positioned on the screen 1050. For example, the virtual object 1060 may have a shape protruding toward the user 110 wearing the wearable device 101 on the screen 1050.

In an embodiment, in the state 1006 of replacing the two-dimensional virtual object 1052 with the three-dimensional virtual object 1060 based on a position of the hand 110-1, the wearable device 101 may identify an input for moving the virtual object 1060. For example, the wearable device 101 may identify the input based on the hand 110-1 having a shape of a pinch gesture. Based on the input, the wearable device 101 may change a position of the virtual object 1060 displayed to the user 110 through the display, according to a trajectory of the hand 110-1. Based on the input, in a state 1007 of identifying the virtual object 1060 moved at a distance greater than a designated distance, the wearable device 101 may replace the virtual object 1060 with a virtual object 1070.

In a state 1007 of FIG. 10B, the wearable device 101 may display the virtual object 1070 for providing various functions more than functions provided by the virtual object 1060. At a position where the virtual object 1060 has been moved at a distance greater than a designated distance from a position 1072 where it was displayed, the wearable device 101 may display the virtual object 1070. In an embodiment of displaying at least one of the virtual objects 1052, 1060, and 1070 based on execution of an application to provide weather information, the wearable device 101 may display additional information (e.g., text indicating temperature, and time and minutes) together with information (e.g., indicator indicating temperature, and AM or PM) that was included in the virtual object 1060, by using the virtual object 1070. In the state 1007 of displaying the virtual object 1070 based on execution of the application for providing weather information, the wearable device 101 may react to a gesture on a sub-virtual object included in the virtual object 1070. For example, the wearable device 101 may identify a gesture for rotating a spherical sub-virtual object included in the virtual object 1070. Based on the gesture, the wearable device 101 may change weather information displayed through the virtual object 1070 based on the rotated sub-virtual object. For example, the wearable device 101 may display a map on the spherical sub-virtual object and identify an area of the map visible to the user 110 by the sub-virtual object rotated by the hand 110-1. The wearable device 101 may display, on the virtual object 1070, weather information of the identified area.

Hereinafter, an example of a flowchart of an operation of the wearable device 101 described with reference to FIGS. 1 to 10B will be described with reference to FIGS. 11 to 15.

Figure 11:
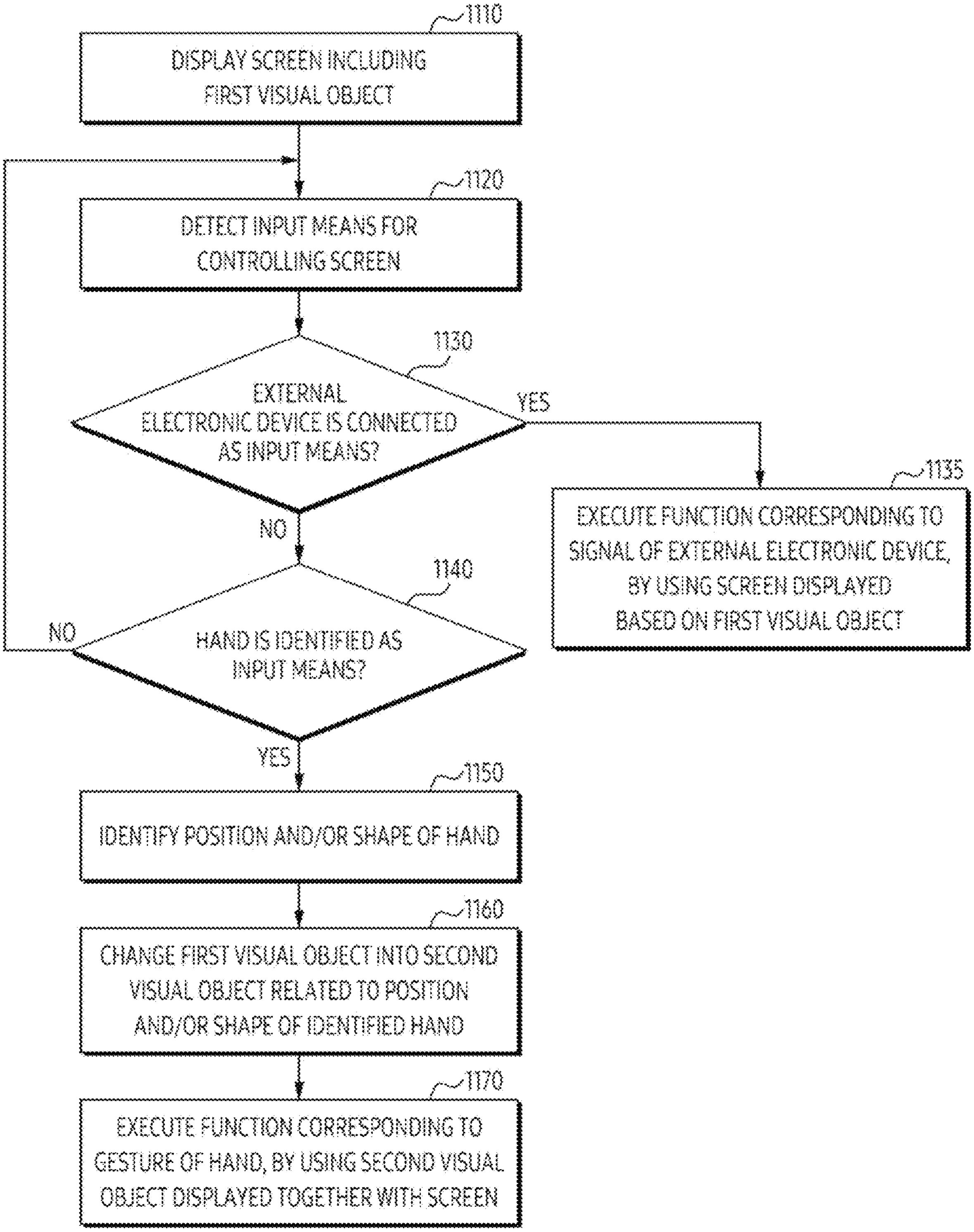
FIG. 11 illustrates an example of a flowchart of a wearable device according to an embodiment.

FIG. 11 illustrates an example of a flowchart of a wearable device, according to an embodiment. The wearable device 101 of FIGS. 1 to 10B may perform at least one of operations of FIG. 11. For example, the wearable device 101 and/or the processor 210 of FIG. 2 may perform at least one of the operations of FIG. 11.

Referring to FIG. 11, in operation 1110, a wearable device according to an embodiment may display a screen including a first visual object. The first visual object may include the scroll bar 141 of FIGS. 4A and 4B, the buttons 511 and 512 of FIGS. 5A and 5B, the sliders 620 and 650 of FIGS. 6A, 6B, and 6C, the dial 720 of FIG. 7A, the buttons 811, 812, and 813 of FIG. 8, the switch 912 of 9A, 9B, and 9C, and/or the cursor 1020 of FIG. 10A. The wearable device may manage a resource for displaying the first visual object, based on the execution of the UI provider 275 of FIG. 2. The wearable device may display a screen floating based on a distance (or depth) within the FoV of a user (e.g., the user 110 of FIGS. 1 to 10B) wearing the wearable device.

Referring to FIG. 11, in operation 1120, the wearable device according to an embodiment may detect input means for controlling a screen. The input means may include the external electronic device 180 of FIGS. 1 to 10A. The input means may include a hand (e.g., the hand 110-1 of FIGS. 1 to 10B) of a user wearing the wearable device. For example, when the wearable device simultaneously detects the hand and the external electronic device, the wearable device may preferentially perform, based on a priority, control of the wearable device based on the external electronic device. For example, when the wearable device simultaneously detects the hand and the external electronic device, the wearable device may preferentially perform, based on a priority, control of the wearable device based on the hand.

Referring to FIG. 11, in operation 1130, the wearable device according to an embodiment may determine whether an external electronic device is connected as input means. For example, using the communication circuitry 240 of FIG. 2, the wearable device may identify whether a communication link between the external electronic device and the wearable device has been established. For example, when the communication link is established based on pairing, the wearable device may determine that it is connected to the external electronic device.

When the external electronic device is connected (1130—YES), the wearable device according to an embodiment may perform operation 1135 of FIG. 11 and execute a function corresponding to a signal of the external electronic device by using a screen displayed based on the first visual object. The signal may be transmitted from the external electronic device to the wearable device in order to identify pressing of a button included in the external electronic device. In response to the signal, the wearable device may execute a function indicated by the signal on the screen including the first visual object. The state 401 of FIG. 4A, the state 501 of FIG. 5A, the state 504 of FIG. 5B, the state 601 of FIG. 6A, the state 801 of FIG. 8, and/or the state 1001 of FIG. 10A may be a state in which the wearable device performs operation 1135.

When the external electronic device is not connected (1130—NO), in operation 1140, the wearable device according to an embodiment may identify a hand as input means. When both the external electronic device and the hand are not identified (1140—NO), the wearable device may continue to detect input means, based on operation 1120. In a state of identifying the hand (1140—YES), the wearable device according to an embodiment may identify a position and/or a shape of the hand, by performing operation 1150 of FIG. 11. The wearable device may obtain an image (e.g., the image 226-1 of FIG. 2) including a hand using a camera (e.g., the first camera 225-1 of FIG. 2). Based on the model 310 of FIG. 3 and the image, the wearable device may obtain information indicating the position and/or the shape of the hand included in the image.

Referring to FIG. 11, in operation 1160, the wearable device according to an embodiment may change the first visual object into a second visual object related to the position and/or the shape of the identified hand. The wearable device may perform operation 1160 based on identifying a hand having a direction toward the first visual object. The second visual object of the operation 1160 may include the scroll bar 410 of FIGS. 4A and 4B, the buttons 531-1 and 532 of FIG. 5A, the icon 540 of FIG. 5B, the slider 630 of FIGS. 6A to 6B, the handle 660 and/or the buttons 671 and

672 of FIG. 6C, the dials 730 and 740 of FIGS. 7A and 7B, the buttons 821, 822, and 823 of FIG. 8, the visual object 930 of FIG. 9B, and/or the switch 940 of FIG. 9C.

In an embodiment, changing the first visual object to the second visual object based on operation 1160 by the wearable device may be related to the input means detected by the wearable device. The wearable device may determine, based on the input means, whether to change at least one of a size, distance, shape, effect, and/or interaction pattern of the visual object. For example, in a state of identifying a hand as input means, the wearable device may display a second visual object having a size larger than the first visual object. In the state, the wearable device may display a second visual object having a closer distance than the first visual object. In the state, the wearable device may display a second visual object having a different shape (e.g., a three-dimensional shape) from the first visual object having a two-dimensional shape. The wearable device may change an interaction pattern by replacing the dial 720 of FIG. 7A, which requires an input having a shape of a curved line, with a dial 730 including a visual object 736 having a shape of a straight line.

Referring to FIG. 11, in operation 1170, the wearable device according to an embodiment may execute a function corresponding to a gesture of a hand, by using the second visual object displayed together with a screen. The function executed by the wearable device using the second visual object may be substantially the same as a function executed based on the first visual object of operation 1135. For example, the wearable device may support the user to perform a more accurate gesture (e.g., pinch gesture and/or pointing gesture) using the second visual object.

Figure 12:
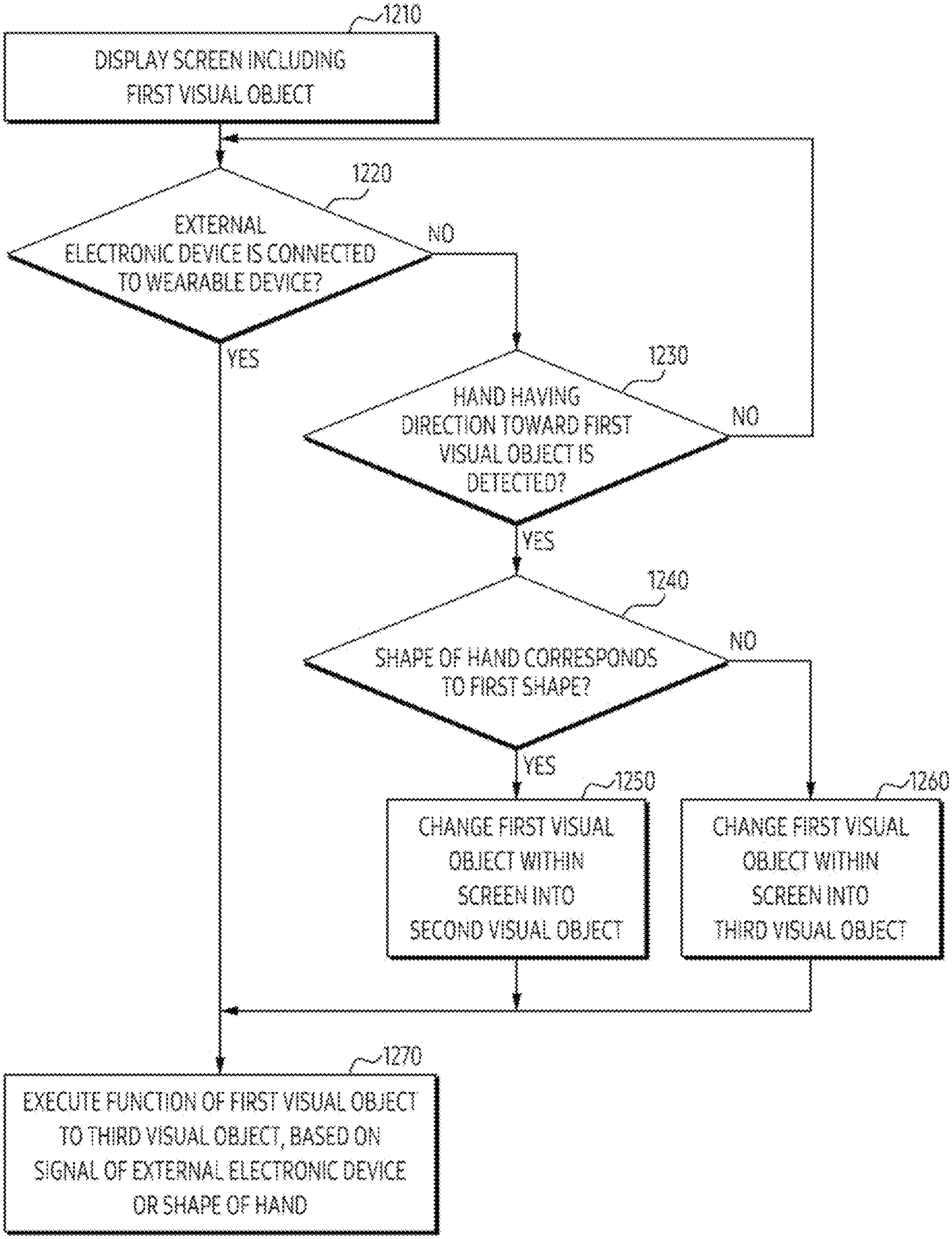
FIG. 12 illustrates an example of a flowchart of a wearable device according to an embodiment.

FIG. 12 illustrates an example of a flowchart of a wearable device, according to an embodiment. The wearable device 101 of FIGS. 1 to 10B may perform at least one of operations of FIG. 12. For example, the wearable device 101 and/or processor 210 of FIG. 2 may perform at least one of the operations of FIG. 12. At least one of the operations of FIG. 12 may be related to at least one of the operations of FIG. 11.

Referring to FIG. 12, in operation 1210, the wearable device according to an embodiment may display a screen including a first visual object. The wearable device may perform operation 1210 of FIG. 12, similar to operation 1110 of FIG. 11.

Referring to FIG. 12, in operation 1220, the wearable device according to an embodiment may identify whether an external electronic device is connected to the wearable device. The wearable device may identify an external electronic device using communication circuitry (e.g., the communication circuitry 240 of FIG. 2). Based on identifying an external electronic device, the wearable device may establish a communication link between the external electronic device and the wearable device.

Referring to FIG. 12, in a state of not being connected to an external electronic device (1220—NO), the wearable device according to an embodiment may detect a hand having a direction toward the first visual object, by performing operation 1230. The wearable device may identify the position, posture, and/or shape of a hand from an image obtained using a camera. The wearable device may obtain information indicating the position, posture, and/or shape of the hand by using the model 310 of FIG. 3.

In a state of detecting a hand having a direction toward the first visual object (1230—YES), the wearable device according to an embodiment may determine whether a shape of the detected hand corresponds to a first shape, by performing operation 1240 of FIG. 12. The first shape may include a form of the pointing gesture described above based on the image 340 of FIG. 3.

Referring to FIG. 12, in a state of detecting the shape of the hand corresponding to the first shape (1240—YES), the wearable device according to an embodiment may change the first visual object within a screen into a second visual object, by performing operation 1250. The second visual object may have a shape for notifying that a hand having a shape of the pointing gesture has been identified. The second visual object may have a size larger than the first visual object. Unlike the first visual object having a two-dimensional shape, the second visual object may have a three-dimensional shape. The second visual object may be displayed based on a binocular disparity greater than a binocular disparity of the first visual object. The wearable device may display the second visual object at a relatively close distance to the user, by displaying the second visual object based on a binocular disparity greater than the binocular disparity of the first visual object.

Referring to FIG. 12, when a shape of the hand does not correspond to the first shape (1240—NO), the wearable device according to an embodiment may change the first visual object in the screen into a third visual object, by performing operation 1260. When identifying a hand having a shape (e.g., a shape of the idle gesture) different from the first shape including the pointing gesture, the wearable device may change the first visual object to the third visual object based on operation 1260. The third visual object may have a shape for notifying that a hand having a shape of the idle gesture has been identified. The third visual object may have a size larger than the first visual object. The wearable device may change the first visual object having a two-dimensional shape into the third visual object having a three-dimensional shape. The wearable device may display the third visual object at a distance closer than the first visual object.

Referring to FIG. 12, in operation 1270, the wearable device according to an embodiment may execute a function of the first visual object to the third visual object, based on a signal of the external electronic device or a shape of the hand. When the external electronic device is connected to the wearable device (1220—YES), or does not detect a hand having a direction toward the first visual object (1230—NO), the wearable device may search for an external electronic device and/or a body part including a hand, based on at least one of operations 1220 and 1230 while maintaining display of a screen including the first visual object based on the operation 1210. Based on the signal from the external electronic device, a function of the first visual object may be executed. Based on operation 1250, the wearable device displaying the second visual object may execute a function of the second visual object according to the shape of the hand, by performing operation 1270. Based on operation 1260, the wearable device displaying the third visual object may execute a function of the third visual object according to the shape of the hand, by performing operation 1270.

Figure 13:
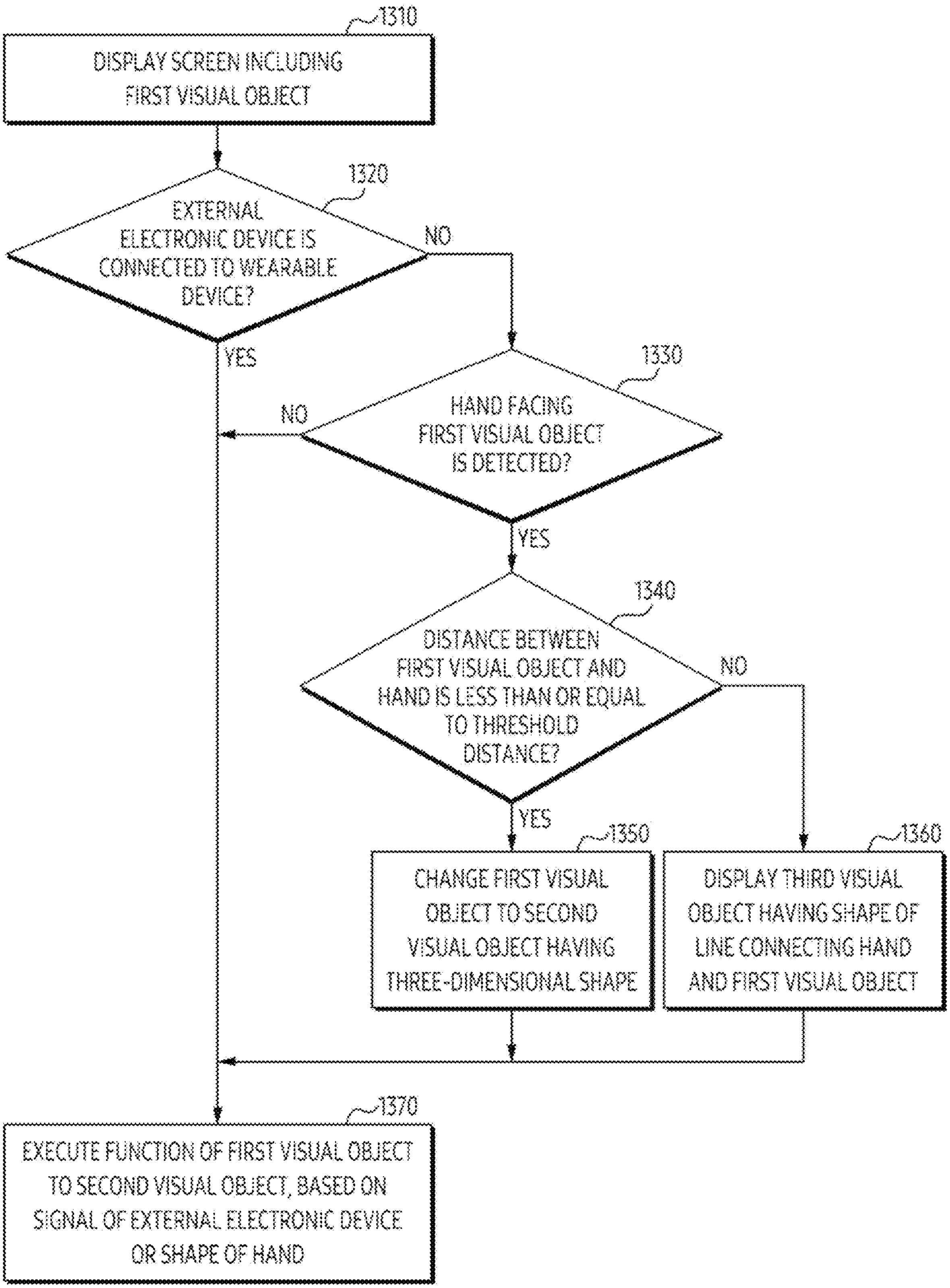
FIG. 13 illustrates an example of a flowchart of a wearable device according to an embodiment.

FIG. 13 illustrates an example of a flowchart of a wearable device, according to an embodiment. The wearable device 101 of FIGS. 1 to 10B may perform at least one of operations of FIG. 13. For example, the wearable device 101 and/or processor 210 of FIG. 2 may perform at least one of the operations of FIG. 13. At least one of the operations of FIG. 13 may be related to at least one of the operations of FIGS. 11 to 12.

Referring to FIG. 13, in operation 1310, the wearable device according to an embodiment may display a screen including a first visual object. The wearable device may perform operation 1310 of FIG. 13 similar to operation 1110 of FIG. 11 and/or operation 1210 of FIG. 12. In operation 1320, the wearable device according to an embodiment may identify whether the external electronic device is connected to the wearable device. The wearable device may perform operation 1320 of FIG. 13 similar to operation 1220 of FIG. 12. Referring to FIG. 13, in a state of being not connected to the external electronic device (1320—NO), the wearable device according to an embodiment may detect a hand facing the first visual object by performing operation 1330. The wearable device may perform operation 1230 of FIG. 12 similar to operation 1230 of FIG. 12.

Referring to FIG. 13, in a state of detecting a hand facing the first visual object (1330—YES), the wearable device according to an embodiment may identify whether a distance between the first visual object and the hand is less than or equal to a threshold distance, by performing operation 1340. The threshold distance may indicate a distance reachable by a hand of a user wearing the wearable device. For example, the threshold distance may be about 50 cm.

Referring to FIG. 13, in a state of displaying the first visual object less than or equal to the threshold distance (1340—YES), the wearable device according to an embodiment may change to a second visual object having a three-dimensional shape, by performing operation 1350. The wearable device may display the second visual object having a shape protruding toward the user wearing the wearable device, such as the buttons 821, 822, and 823 of FIG. 8. The wearable device displaying the second visual object may at least temporarily stop displaying the first visual object.

Referring to FIG. 13, in a state of displaying the first visual object greater than the threshold distance (1340—NO), the wearable device according to an embodiment may display a third visual object having a shape of a line connecting the hand and the first visual object, by performing operation 1360. The third visual object may include a ray extending from the hand.

Referring to FIG. 13, in operation 1370, the wearable device according to an embodiment may execute a function of the first visual object to the second visual object, based on a signal of the external electronic device or a shape of the hand. When the external electronic device is connected to the wearable device (1320—YES), and/or does not detect a hand facing the first visual object (1330—NO), the wearable device may execute a function of the first visual object based on operation 1370. When displaying the second visual object by performing operation 1350, the wearable device may execute a function corresponding to the second visual object by performing operation 1370. When displaying the third visual object together with the first visual object by performing operation 1360, the wearable device may execute a function of the first visual object by performing operation 1370.

Figure 14:
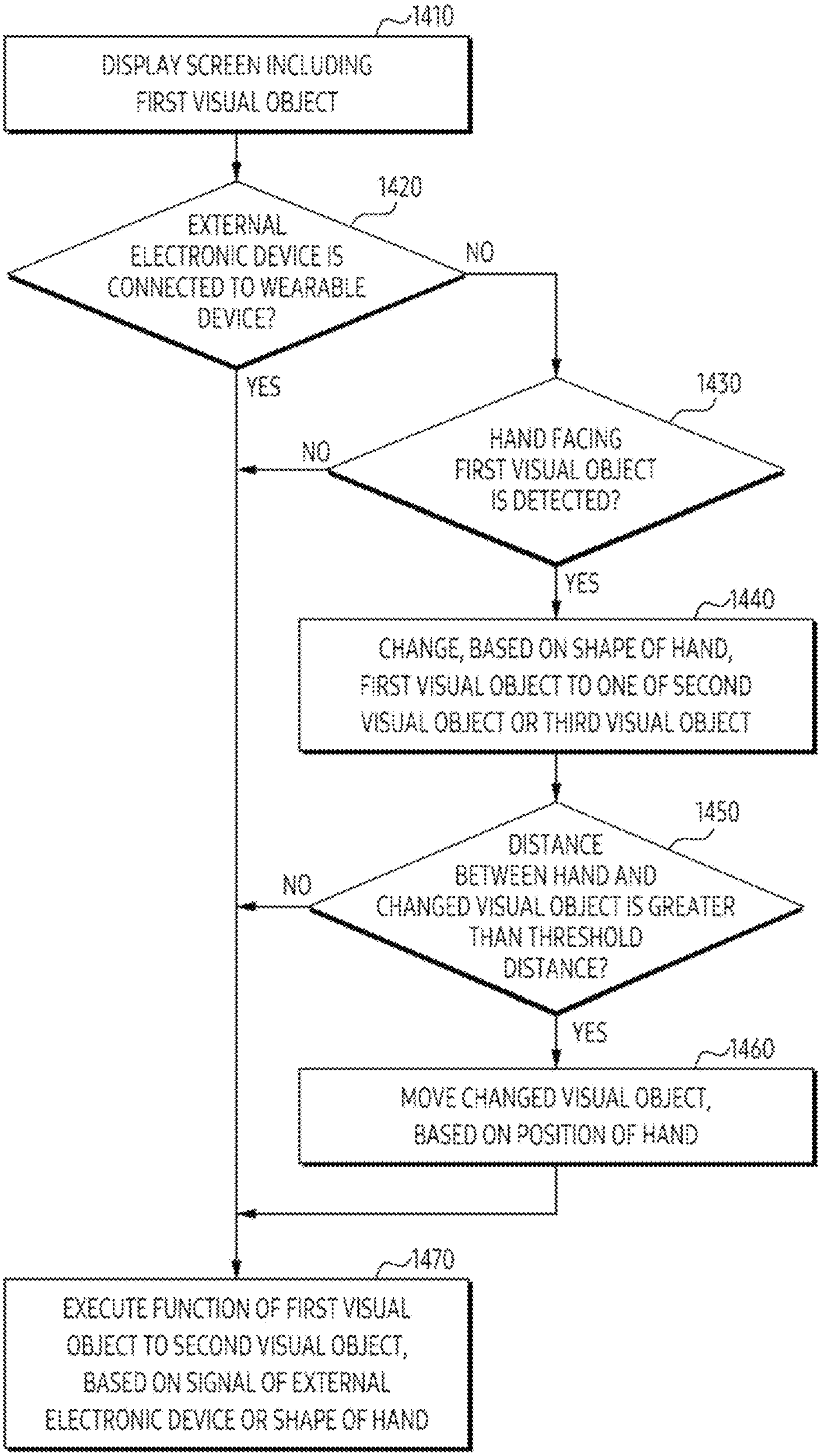
FIG. 14 illustrates an example of a flowchart of a wearable device according to an embodiment.

FIG. 14 illustrates an example of a flowchart of a wearable device, according to an embodiment. The wearable device 101 of FIGS. 1 to 10B may perform at least one of operations of FIG. 14. For example, the wearable device 101 and/or the processor 210 of FIG. 2 may perform at least one of the operations of FIG. 14. At least one of the operations of FIG. 14 may be related to at least one of the operations of FIGS. 11 to 13.

Referring to FIG. 14, in operation 1410, the wearable device according to an embodiment may display a screen including the first visual object. The wearable device may perform operation 1410 of FIG. 14, similar to operation 1110 of FIG. 11, operation 1210 of FIG. 12, and/or operation 1310 of FIG. 13. Referring to FIG. 14, in operation 1420, the wearable device according to an embodiment may identify whether the external electronic device is connected to the wearable device. The wearable device may perform operation 1420 of FIG. 14, similar to operation 1220 of FIG. 12 and/or operation 1320 of FIG. 13. In a state of not being connected to the external electronic device (1420—NO), the wearable device may detect a hand facing the first visual object, by performing operation 1430. The wearable device may perform operation 1430 of FIG. 14, similar to operation 1230 of FIG. 12 and/or operation 1330 of FIG. 13.

Referring to FIG. 14, in a state of detecting a hand facing the first visual object (1430—YES), the wearable device according to an embodiment may change, based on the shape of the hand, the first visual object to one of a second visual object or a third visual object, by performing operation 1440. Each of the second visual object and the third visual object of operation 1440 may correspond to different shapes (e.g., idle gesture and/or pointing gesture) of the hand. For example, the wearable device may display a second visual object (e.g., the scroll bar 410 of FIG. 4A) of operation 1440, in response to identifying the hand having a shape of the idle gesture. For example, the wearable device may display a third visual object (e.g., the group 420 of the buttons 421 and 422 of FIG. 4B) of operation 1440, in response to identifying the hand having a shape of the pointing gesture.

Referring to FIG. 14, in operation 1450, the wearable device according to an embodiment may identify whether a distance between the hand and the changed visual object is greater than a threshold distance. The threshold distance (e.g., 50 cm) may be related to a distance reachable by the hand. When the distance between the hand and the changed visual object is greater than the threshold distance (1450—YES), the wearable device may move the visual object changed by operation 1440 based on a position of the hand, by performing operation 1460. For example, the wearable device may move the visual object changed by operation 1440 at a distance less than or equal to the threshold distance of operation 1450.

Referring to FIG. 14, in operation 1470, the wearable device according to an embodiment may execute a function of the first visual object to the second visual object, based on a signal of the external electronic device or a shape of the hand. The wearable device may execute a function of the first visual object based on the signal from the external electronic device. When identifying a moving hand for controlling the wearable device without the external electronic device, the wearable device may execute a function of the visual object changed by operation 1440. Since the wearable device performs a change of the visual object in operation 1440 for hand-based interaction, functions executed by the wearable device using each of the first visual object to the third visual object may be matched to each other.

Figure 15:
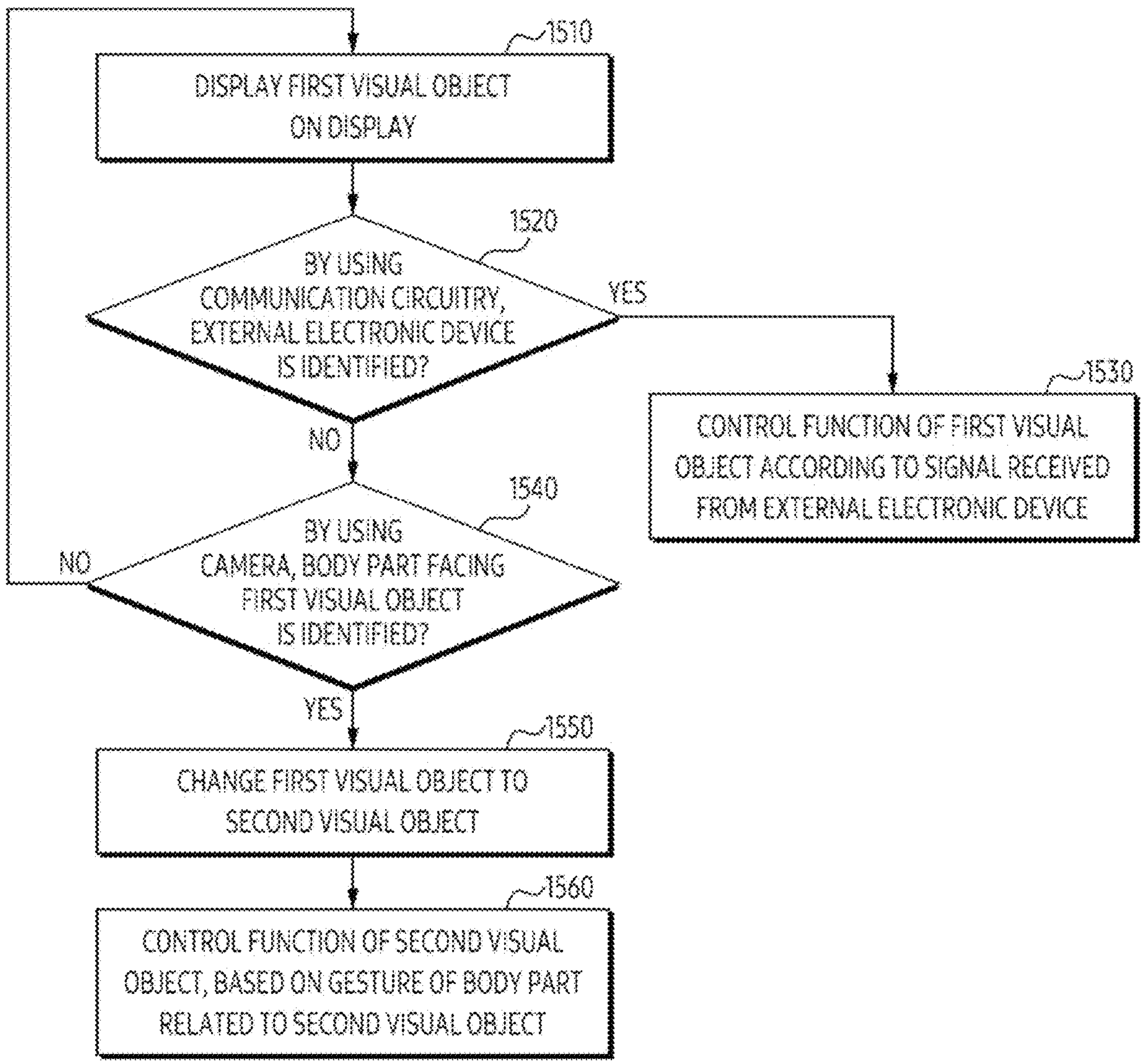
FIG. 15 illustrates an example of a flowchart of a wearable device according to an embodiment.

FIG. 15 illustrates an example of a flowchart of a wearable device, according to an embodiment. The wearable device 101 of FIGS. 1 to 10B may perform at least one of operations of FIG. 15. For example, the wearable device 101 and/or the processor 210 of FIG. 2 may perform at least one of the operations of FIG. 15. At least one of the operations of FIG. 15 may be related to at least one of the operations of FIGS. 11 to 14.

Referring to FIG. 15, in operation 1510, the wearable device according to an embodiment may display a first visual object on a display. The wearable device may perform operation 1510 of FIG. 15, similar to operation 1110 of FIG.

11, operation 1210 of FIG. 12, operation 1310 of FIG. 13, and/or operation 1410 of FIG. 14. Referring to FIG. 15, in operation 1520, the wearable device according to an embodiment may identify an external electronic device (e.g., the external electronic device 180 of FIGS. 1 to 10A) using communication circuitry (e.g., the communication circuitry 240 of FIG. 2). In a state of identifying an external electronic device using communication circuitry (1520—YES), the wearable device according to an embodiment may control a function of the first visual object according to a signal received from the external electronic device, by performing operation 1530. The wearable device may perform operation 1530 while maintaining display of the first visual object based on operation 1510.

In a state that the external electronic device is not identified through the communication circuitry (1520—NO), the wearable device according to an embodiment may determine whether a body part facing the first visual object is identified using the camera, by performing operation 1540. Before identifying a body part facing the first visual object (1540-NO), the wearable device may maintain displaying the first visual object based on operation 1510. In a state of identifying a body part (e.g., the hand 110-1 of FIGS. 1 to 10B) facing the first visual object (1540—YES), the wearable device according to an embodiment may change the first visual object displayed based on operation 1510 to a second visual object, by performing operation 1550. The second visual object may have a shape for guiding a gesture (e.g., idle gesture, pinch gesture, and/or pointing gesture) of a body part (e.g., hand) identified based on operation 1540.

Referring to FIG. 15, in operation 1560, the wearable device according to an embodiment may control a function of the second visual object, based on a gesture of a body part related to the second visual object. The gesture for controlling the function of operation 1560 may include a gesture performed for selection and/or control of the second visual object, such as the pinch gesture and/or the pointing gesture.

As described above, according to an embodiment, a wearable device may replace, based on a moving hand without an external electronic device including a remote controller, at least one visual object with another visual object having a shape related to the hand. Based on the replacement of the visual object, the wearable device may inform the user of a visual object focused by the hand. Based on the replacement of the visual object, the wearable device may guide the performance of a gesture using the hand. Based on the replacement of the visual object, the wearable device may more accurately receive an input based on the hand.

Hereinafter, an example of a form factor of the wearable device 101 according to an embodiment will be described with reference to FIGS. 16A and 16B and/or FIGS. 17A and 17B.

Figure 16A:
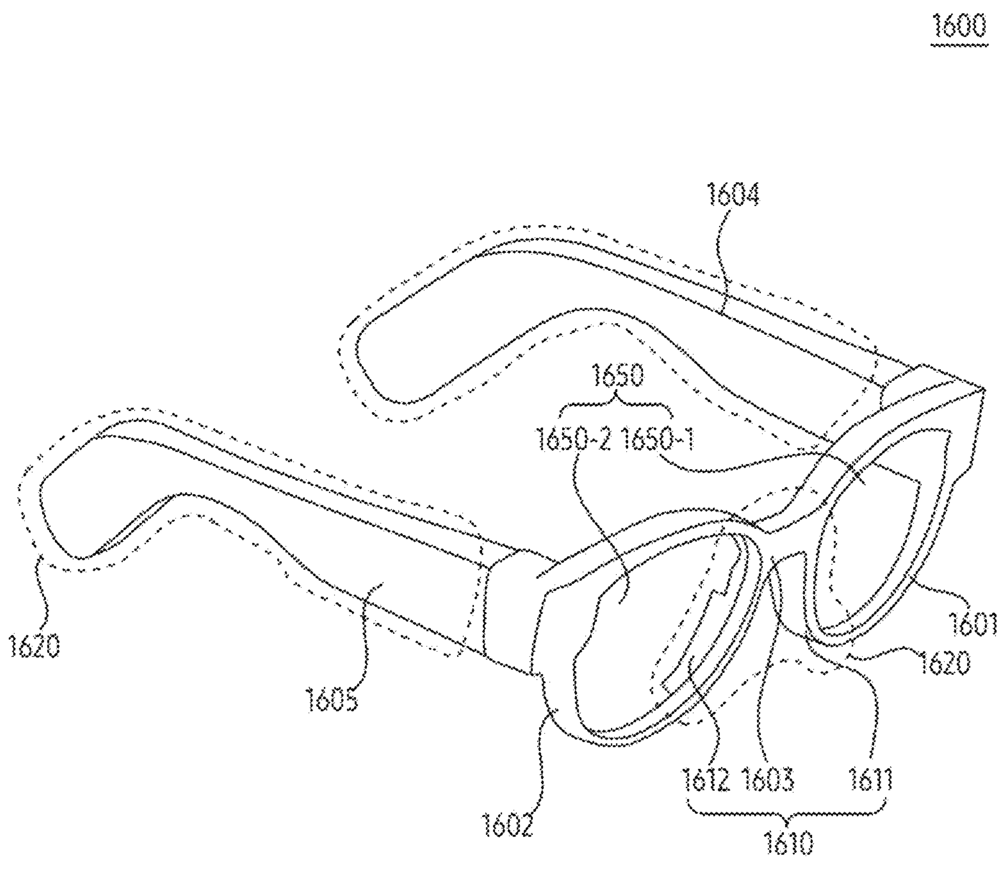
FIG. 16A illustrates an example of a perspective view of a wearable device according to an embodiment.

FIG. 16A illustrates an example of a perspective view of a wearable device according to an embodiment. FIG. 16B illustrates an example of one or more hardware disposed in a wearable device 1600 according to an embodiment. The wearable device 101 of FIGS. 1 to 2 may include or correspond to the wearable device 1600 of FIGS. 16A and 16B. As shown in FIG. 16A, the wearable device 1600 according to an embodiment may include at least one display 1650 and a frame supporting the at least one display 1650.

According to an embodiment, the wearable device 1600 may be wearable on a portion of the user's body. The wearable device 1600 may provide AR, VR, or MR combining the AR and the VR to a user wearing the wearable device 1600. For example, the wearable device 1600 may output a VR image through at least one display 1650, in response to a user's preset gesture obtained through a motion recognition camera 1640-2 of FIG. 16B.

According to an embodiment, the at least one display 1650 within the wearable device 1600 may provide visual information to a user. The at least one display 1650 may include the display 220 of FIG. 2. For example, the at least one display 1650 may include a transparent or translucent lens. The at least one display 1650 may include a first display 1650-1 and/or a second display 1650-2 spaced apart from the first display 1650-1. For example, the first display 1650-1 and the second display 1650-2 may be disposed at positions corresponding to the user's left and right eyes, respectively.

Figure 16B:
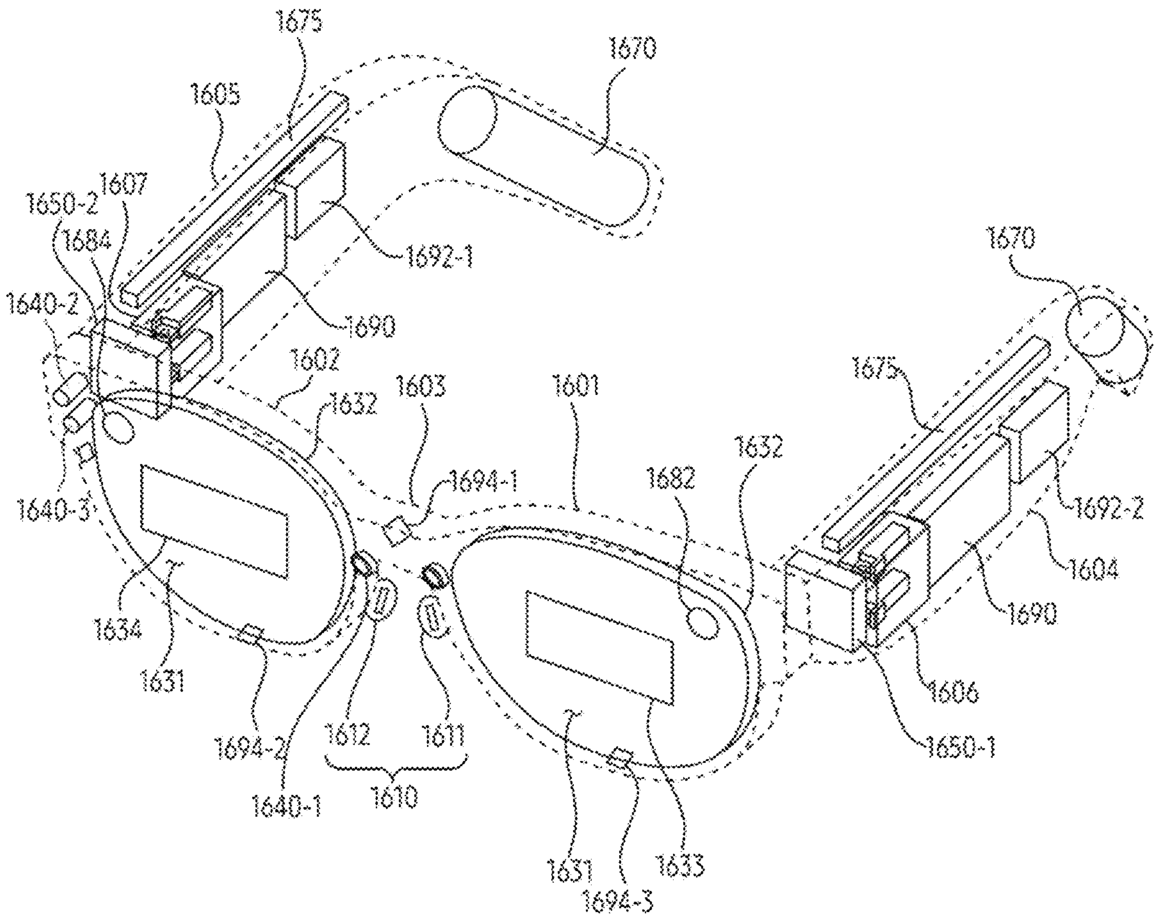
FIG. 16B illustrates an example of one or more hardware disposed in a wearable device according to an embodiment.

Referring to FIG. 16B, the at least one display 1650 may form a display area on the lens to provide a user wearing the wearable device 1600 with visual information included in ambient light passing through the lens and other visual information distinct from the visual information. The lens may be formed based on at least one of a fresnel lens, a pancake lens, or a multi-channel lens. The display area formed by the at least one display 1650 may be formed on the second surface 1632 of the first surface 1631 and the second surface 1632 of the lens. When the user wears the wearable device 1600, ambient light may be transmitted to the user by being incident on the first surface 1631 and being penetrated through the second surface 1632. For another example, the at least one display 1650 may display a VR image to be coupled with a reality screen transmitted through ambient light. The VR image outputted from the at least one display 1650 may be transmitted to eyes of the user, through one or more hardware (e.g., optical devices 1682 and 1684, and/or at least one waveguides 1633 and 1634) included in the wearable device 1600.

According to an embodiment, the wearable device 1600 may include waveguides 1633 and 1634 that transmit light transmitted from the at least one display 1650 and relayed by the at least one optical device 1682 and 1684 by diffracting to the user. The waveguides 1633 and 1634 may be formed based on at least one of glass, plastic, or polymer. A nano pattern may be formed on at least a portion of the outside or inside of the waveguides 1633 and 1634. The nano pattern may be formed based on a grating structure having a polygonal or curved shape. Light incident to an end of the waveguides 1633 and 1634 may be propagated to another end of the waveguides 1633 and 1634 by the nano pattern. The waveguides 1633 and 1634 may include at least one of at least one diffraction element (e.g., a diffractive optical element (DOE), a holographic optical element (HOE)), and a reflection element (e.g., a reflection mirror). For example, the waveguides 1633 and 1634 may be disposed in the wearable device 1600 to guide a screen displayed by the at least one display 1650 to the user's eyes. For example, the screen may be transmitted to the user's eyes through total internal reflection (TIR) generated in the waveguides 1633 and 1634.

According to an embodiment, the wearable device 1600 may analyze an object included in a real image collected through a photographing camera 1640-1, combine with a virtual object corresponding to an object that becomes a subject of AR provision among the analyzed object, and display on the at least one display 1650. The virtual object may include at least one of text and images for various information associated with the object included in the real image. The wearable device 1600 may analyze the object based on a multi-camera such as a stereo camera. For the object analysis, the wearable device 1600 may execute time-of-flight (ToF) and/or simultaneous localization and mapping (SLAM) supported by the multi-camera. The user wearing the wearable device 1600 may watch an image displayed on the at least one display 1650.

According to an embodiment, a frame may be configured with a physical structure in which the wearable device 1600 may be worn on the user's body. According to an embodiment, the frame may be configured so that when the user wears the wearable device 1600, the first display 1650-1 and the second display 1650-2 may be positioned corresponding to the user's left and right eyes. The frame may support the at least one display 1650. For example, the frame may support the first display 1650-1 and the second display 1650-2 to be positioned at positions corresponding to the user's left and right eyes.

Referring to FIG. 16A, according to an embodiment, the frame may include an area 1620 at least partially in contact with the portion of the user's body in case that the user wears the wearable device 1600. For example, the area 1620 of the frame in contact with the portion of the user's body may include an area in contact with a portion of the user's nose, a portion of the user's ear, and a portion of the side of the user's face that the wearable device 1600 contacts. According to an embodiment, the frame may include a nose pad 1610 that is contacted on the portion of the user's body. When the wearable device 1600 is worn by the user, the nose pad 1610 may be contacted on the portion of the user's nose. The frame may include a first temple 1604 and a second temple 1605, which are contacted on another portion of the user's body that is distinct from the portion of the user's body.

According to an embodiment, the frame may include a first rim 1601 surrounding at least a portion of the first display 1650-1, a second rim 1602 surrounding at least a portion of the second display 1650-2, a bridge 1603 disposed between the first rim 1601 and the second rim 1602, a first pad 1611 disposed along a portion of the edge of the first rim 1601 from one end of the bridge 1603, a second pad 1612 disposed along a portion of the edge of the second rim 1602 from the other end of the bridge 1603, the first temple 1604 extending from the first rim 1601 and fixed to a portion of the wearer's ear, and the second temple 1605 extending from the second rim 1602 and fixed to a portion of the ear opposite to the ear. The first pad 1611 and the second pad 1612 may be in contact with the portion of the user's nose, and the first temple 1604 and the second temple 1605 may be in contact with a portion of the user's face and the portion of the user's ear. The temples 1604 and 1605 may be rotatably connected to the rim through hinge units 1606 and 1607 of FIG. 16B. The first temple 1604 may be rotatably connected with respect to the first rim 1601 through the first hinge unit 1606 disposed between the first rim 1601 and the first temple 1604. The second temple 1605 may be rotatably connected with respect to the second rim 1602 through the second hinge unit 1607 disposed between the second rim 1602 and the second temple 1605. According to an embodiment, the wearable device 1600 may identify an external object (e.g., a user's fingertip) touching the frame and/or a gesture performed by the external object by using a touch sensor, a grip sensor, and/or a proximity sensor formed on at least a portion of the surface of the frame.

According to an embodiment, the wearable device 1600 may include hardware (e.g., hardware described above based on the block diagram of FIG. 2) that performs various functions. For example, the hardware may include a battery module 1670, an antenna module 1675, optical devices 1682 and 1684, speakers 1692-1 and 1692-2, microphones 1694-1, 1694-2, and 1694-3, a depth sensor module, and/or a printed circuit board (PCB) 1690. Various hardware may be disposed in the frame.

According to an embodiment, the microphones 1694-1, 1694-2, and 1694-3 of the wearable device 1600 may obtain a sound signal, by being disposed on at least a portion of the frame. The first microphone 1694-1 disposed on the nose pad 1610, the second microphone 1694-2 disposed on the second rim 1602, and the third microphone 1694-3 disposed on the first rim 1601 are illustrated in FIG. 16B, but the number and disposition of the microphone 1694 are not limited to an embodiment of FIG. 16B. In a case that the number of the microphone 1694 included in the wearable device 1600 is two or more, the wearable device 1600 may identify a direction of the sound signal by using a plurality of microphones disposed on different portions of the frame.

According to an embodiment, the optical devices 1682 and 1684 may transmit a virtual object transmitted from the at least one display 1650 to the waveguides 1633 and 1634. For example, the optical devices 1682 and 1684 may be projectors. The optical devices 1682 and 1684 may be disposed adjacent to the at least one display 1650 or may be included in the at least one display 1650 as a portion of the at least one display 1650. The first optical device 1682 may correspond to the first display 1650-1, and the second optical device 1684 may correspond to the second display 1650-2. The first optical device 1682 may transmit light outputted from the first display 1650-1 to the first waveguide 1633, and the second optical device 1684 may transmit light outputted from the second display 1650-2 to the second waveguide 1634.

In an embodiment, a camera 1640 may include an eye tracking camera (ET CAM) 1640-1, a motion recognition camera 1640-2 and/or the photographing camera 1640-3. The photographing camera 1640-3, the eye tracking camera 1640-1, and the motion recognition camera 1640-2 may be disposed at different positions on the frame and may perform different functions. The photographing camera 1640-3, the eye tracking camera 1640-1, and the motion recognition camera 1640-2 may be an example of the camera 225 of FIG. 2. The eye tracking camera 1640-1 may output data indicating a gaze of the user wearing the wearable device 1600. For example, the wearable device 1600 may detect the gaze from an image including the user's pupil, obtained through the eye tracking camera 1640-1. An example in which the eye tracking camera 1640-1 is disposed toward the user's right eye is illustrated in FIG. 16B, but embodiments are not limited thereto, and the eye tracking camera 1640-1 may be disposed alone toward the user's left eye or may be disposed toward two eyes.

In an embodiment, the photographing camera 1640-3 may photograph a real image or background to be matched with a virtual image in order to implement the AR or MR content. The photographing camera may photograph an image of a specific object existing at a position viewed by the user and may provide the image to the at least one display 1650. The at least one display 1650 may display one image in which a virtual image provided through the optical devices 1682 and 1684 is overlapped with information on the real image or background including the image of the specific object obtained by using the photographing camera. In an embodiment, the photographing camera may be disposed on the bridge 1603 disposed between the first rim 1601 and the second rim 1602.

In an embodiment, the eye tracking camera 1640-1 may implement a more realistic AR by matching the user's gaze with the visual information provided on the at least one display 1650, by tracking the gaze of the user wearing the wearable device 1600. For example, when the user looks at the front, the wearable device 1600 may naturally display environment information associated with the user's front on the at least one display 1650 at a position where the user is positioned. The eye tracking camera 1640-1 may be configured to capture an image of the user's pupil in order to determine the user's gaze. For example, the eye tracking camera 1640-1 may receive gaze detection light reflected from the user's pupil and may track the user's gaze based on the position and movement of the received gaze detection light. In an embodiment, the eye tracking camera 1640-1 may be disposed at a position corresponding to the user's left and right eyes. For example, the eye tracking camera 1640-1 may be disposed in the first rim 1601 and/or the second rim 1602 to face the direction in which the user wearing the wearable device 1600 is positioned.

The motion recognition camera 1640-2 may provide a specific event to the screen provided on the at least one display 1650 by recognizing the movement of the whole or portion of the user's body, such as the user's torso, hand, or face. The motion recognition camera 1640-2 may obtain a signal corresponding to motion by recognizing the user's gesture, and may provide a display corresponding to the signal to the at least one display 1650. A processor may identify a signal corresponding to the operation and may perform a preset function based on the identification. In an embodiment, the motion recognition camera 1640-2 may be disposed on the first rim 1601 and/or the second rim 1602.

In an embodiment, the camera 1640 included in the wearable device 1600 is not limited to the above-described eye tracking camera 1640-1 and the motion recognition camera 1640-2. For example, the wearable device 1600 may identify an external object included in the FoV by using the photographing camera 1640-3 disposed toward the user's FoV. Identifying the external object by the wearable device 1600 may be performed based on a sensor for identifying a distance between the wearable device 1600 and an external object, such as a depth sensor and/or a time of flight (ToF) sensor. The camera 1640 disposed toward the FoV may support an autofocus function and/or an optical image stabilization (OIS) function. For example, in order to obtain an image including a face of a user wearing the wearable device 1600, the wearable device 1600 may include a camera 1640 (e.g., a face tracking (FT) camera) disposed toward the face.

In an embodiment, the wearable device 1600 may further include a light source (e.g., LED) that emits light toward a subject (e.g., user's eyes, face, and/or an external object in the FoV) photographed by using the camera 1640. The light source may include an LED having an infrared wavelength. The light source may be disposed on at least one of the frame, and the hinge units 1606 and 1607.

In an embodiment, the battery module 1670 may supply power to electronic components of the wearable device 1600. In an embodiment, the battery module 1670 may be disposed in the first temple 1604 and/or the second temple 1605. For example, the battery module 1670 may be a plurality of battery modules 1670. The plurality of battery modules 1670, respectively, may be disposed on each of the first temple 1604 and the second temple 1605. In an embodiment, the battery module 1670 may be disposed at an end of the first temple 1604 and/or the second temple 1605.

In an embodiment, the antenna module 1675 may transmit the signal or power to the outside of the wearable device 1600 or may receive the signal or power from the outside. The antenna module 1675 may be electrically and/or operably connected to communication circuitry (e.g., the communication circuitry of FIG. 2) in the wearable device 1600. In an embodiment, the antenna module 1675 may be disposed in the first temple 1604 and/or the second temple 1605. For example, the antenna module 1675 may be disposed close to one surface of the first temple 1604 and/or the second temple 1605.

In an embodiment, the speakers 1692-1 and 1692-2 may output a sound signal to the outside of the wearable device 1600. A sound output module may be referred to as a speaker. In an embodiment, the speakers 1692-1 and 1692-2 may be disposed in the first temple 1604 and/or the second temple 1605 in order to be disposed adjacent to the ear of the user wearing the wearable device 1600. For example, the wearable device 1600 may include a second speaker 1692-2 disposed adjacent to the user's left ear by being disposed in the first temple 1604, and a first speaker 1692-1 disposed adjacent to the user's right ear by being disposed in the second temple 1605.

In an embodiment, the light emitting module may include at least one light emitting element. The light emitting module may emit light of a color corresponding to a specific state or may emit light through an operation corresponding to the specific state in order to visually provide information on a specific state of the wearable device 1600 to the user. For example, when the wearable device 1600 requires charging, it may emit repeatedly red light at a specific timing. In an embodiment, the light emitting module may be disposed on the first rim 1601 and/or the second rim 1602.

Referring to FIG. 16B, according to an embodiment, the wearable device 1600 may include the printed circuit board (PCB) 1690. The PCB 1690 may be included in at least one of the first temple 1604 or the second temple 1605. The PCB 1690 may include an interposer disposed between at least two sub PCBs. On the PCB 1690, one or more hardware (e.g., hardware illustrated by the blocks described above with reference to FIG. 2) included in the wearable device 1600 may be disposed. The wearable device 1600 may include a flexible PCB (FPCB) for interconnecting the hardware.

According to an embodiment, the wearable device 1600 may include at least one of a gyro sensor, a gravity sensor, and/or an acceleration sensor for detecting the posture of the wearable device 1600 and/or the posture of a body part (e.g., a head) of the user wearing the wearable device 1600. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an IMU. According to an embodiment, the wearable device 1600 may identify the user's motion and/or gesture performed to execute or stop a specific function of the wearable device 1600 based on the IMU.

Figure 17A:
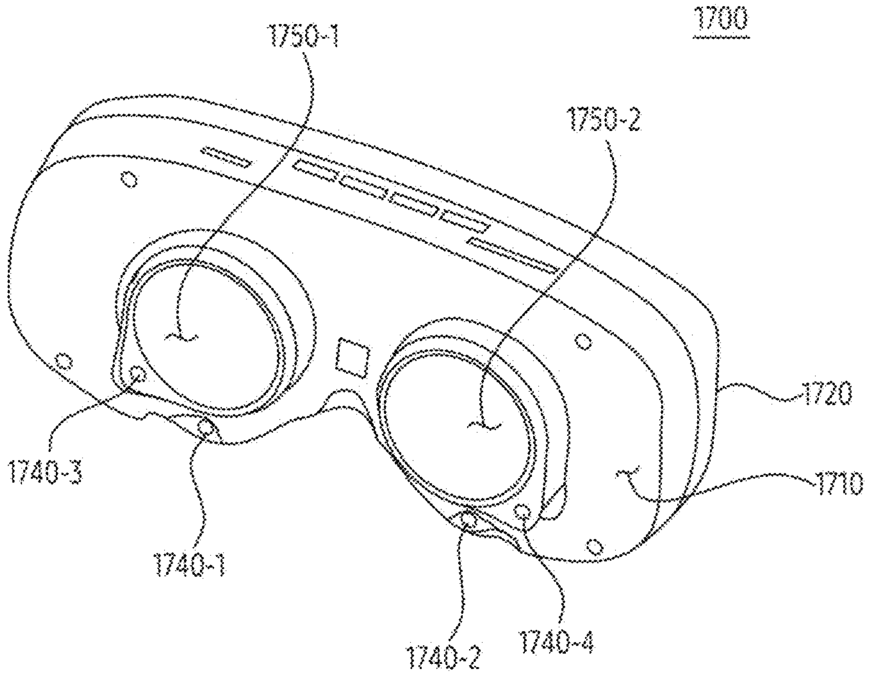
FIGS. 17A and 17B illustrate an example of an appearance of a wearable device according to an embodiment.
Figure 17B:
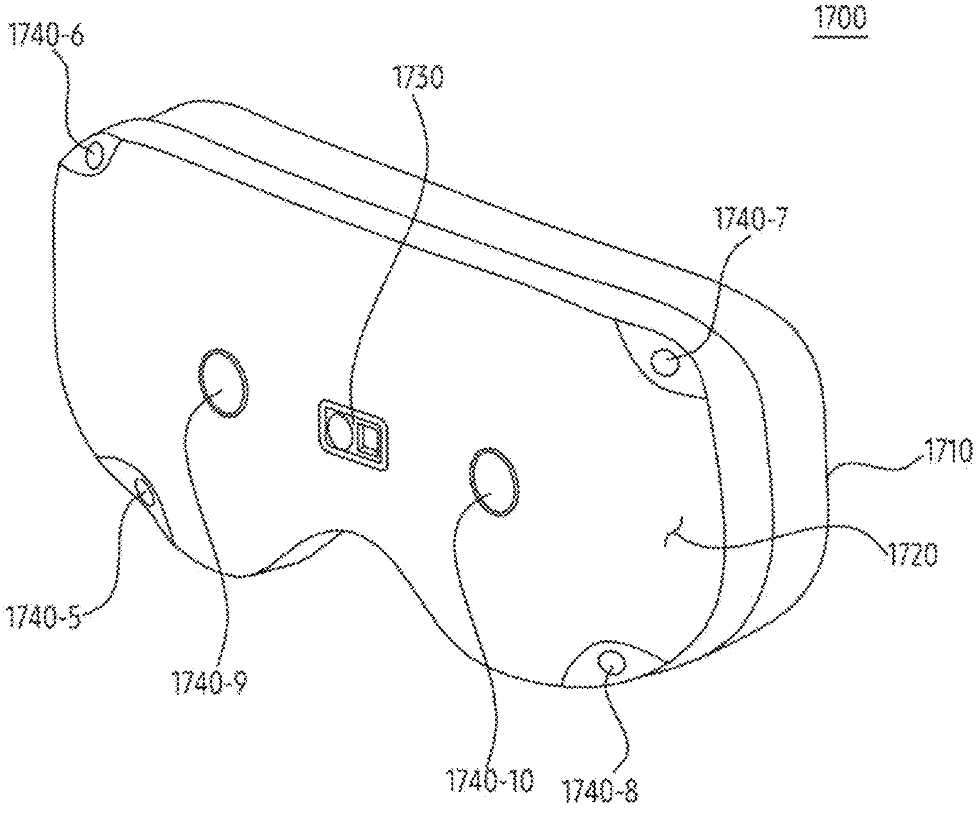

FIGS. 17A to 17B illustrate an example of an exterior of a wearable device 1700 according to an embodiment. The wearable device 101 of FIGS. 1 and 2 may include the wearable device 1700 of FIGS. 17A to 17B. According to an embodiment, an example of an exterior of a first surface 1710 of a housing of the wearable device 1700 is illustrated in FIG. 17A, and an example of an exterior of a second surface 1720 opposite to the first surface 1710 may be illustrated in FIG. 17B.

Referring to FIG. 17A, according to an embodiment, a first surface 1710 of the wearable device 1700 may have a form attachable to a body part (e.g., user's face) of a user. In an embodiment, the wearable device 1700 may further include a strap for being fixed on the user's body part and/or one or more temples (e.g., the first temple 1604 and/or the second temple 1605 of FIGS. 16A and 16B). A first display 1750-1 for outputting an image to the left eye among the two eyes of the user and a second display 1750-2 for outputting an image to the right eye among the two eyes may be disposed on the first surface 1710. The wearable device 1700 may further include rubber or silicon packing, which are formed on the first surface 1710, for preventing interference by light (e.g., an ambient light) different from the light emitted from the first display 1750-1 and the second display 1750-2.

According to an embodiment, the wearable device 1700 may include cameras 1740-3 and 1740-4 for photographing and/or tracking the user's two eyes adjacent to each of the first display 1750-1 and the second display 1750-2. The cameras 1740-3 and 1740-4 may be referred to as ET cameras. The wearable device 1700 according to an embodiment may include cameras 1740-1 and 1740-2 for photographing and/or recognizing the user's face. The cameras 1740-1 and 1740-2 may be referred to as the FT camera.

Referring to FIG. 17B, a camera (e.g., cameras 1740-5, 1740-6, 1740-7, 1740-8, 1740-9, 1740-10) and/or a sensor (e.g., depth sensor 1730) for obtaining information related to the external environment of the wearable device 1700 may be disposed on the second surface 1720 opposite to the first surface 1710 of FIG. 17A. For example, cameras 1740-5, 1740-6, 1740-7, 1740-8, 1740-9, 1740-10 may be disposed on the second surface 1720 to recognize an external object different from the wearable device 1700. For example, using cameras 1740-9 and 1740-10, the wearable device 1700 may obtain an image and/or media to be transmitted to each of the user's two eyes. The camera 1740-9 may be disposed on the second surface 1720 of the wearable device 1700 to obtain a frame to be displayed through the second display 1750-2 corresponding to the right eye among the two eyes. The camera 1740-10 may be disposed on the second surface 1720 of the wearable device 1700 to obtain a frame to be displayed through the first display 1750-1 corresponding to the left eye among the two eyes.

According to an embodiment, the wearable device 1700 may include a depth sensor 1730 disposed on the second surface 1720 to identify a distance between the wearable device 1700 and an external object. Using the depth sensor 1730, the wearable device 1700 may obtain spatial information (e.g., the depth map) on at least a portion of the FoV of the user wearing the wearable device 1700.

In an embodiment, a microphone for obtaining sound outputted from an external object may be disposed on the second surface 1720 of the wearable device 1700. The number of microphones may be one or more according to an embodiment.

As described above, according to an embodiment, the wearable device 1700 may have a form factor for being worn on the user's head. The wearable device 1700 may provide services of AR and/or MR to the user when the wearable device 1700 is worn on the head of the user. By using the first display 1750-1 and the second display 1750-2, the wearable device 1700 may display the screen 120 of FIG. 1. The wearable device 1700 may identify a moving hand without the external electronic device 180 of FIGS. 1 to 10A using the cameras 1740-5, 1740-6, 1740-7, 1740-8, 1740-9, and 1740-10. Based on a shape and/or a gesture of the hand, the wearable device 1700 may execute a function for deforming a visual object of a designated category (e.g., a visual object for reacting to the user's gesture) among visual objects included in the screen 120.

According to an embodiment, a method of deforming a visual object may be required based on identifying a body part including a hand by the wearable device. As described above, according to an embodiment, a wearable device (e.g., the wearable device 101 of FIGS. 1 to 2) may include communication circuitry (e.g., the communication circuitry 240 of FIG. 2), a camera (e.g., the camera 225 of FIG. 2), a display (e.g., the display 220 of FIG. 2), memory (e.g., the memory 215 of FIG. 2), and a processor (e.g., the processor 210 of FIG. 2). The instructions, when executed by the processor, may cause the wearable device to display a first visual object on the display. The instructions, when executed by the processor, may cause the wearable device to, based on identifying an external electronic device (e.g., the external electronic device 180 of FIGS. 1 and 2) using the communication circuit, control a function of the first visual object according to a signal received from the external electronic device. The instructions, when executed by the processor, may cause the wearable device to, based on identifying a body part facing the first visual object using the camera, change the first visual object into a second visual object corresponding to a shape of the body part. The instructions, when executed by the processor, may cause the wearable device to control the function, based on identifying a gesture of the body part related to the second visual object of the display using the camera.

According to an embodiment, a wearable device may include communication circuitry, a camera, a display, memory storing instructions, and a processor. The instructions, when executed by the processor, may cause the wearable device to obtain an image with respect to external environment using the camera. The instructions, when executed by the processor, may cause the wearable device to display a first visual object in a state of displaying at least a portion of the image with respect to the external environment in the display. The instructions, when executed by the processor, may cause the wearable device to, while displaying the first visual object, based on a signal received from an external electronic device connected through the communication circuitry, control a function of the first visual object according to whether an input to control the first visual object through the external electronic device is received. The instructions, when executed by the processor, may cause the wearable device to, while displaying the first visual object, based on identifying a body part having a first posture facing the first visual object, change the first visual object to a second visual object corresponding to a shape of the body part. The instructions, when executed by the processor, may cause the wearable device to, based on identifying a second posture of the body part associated with the second visual object of the display using the camera, control the function.

For example, the instructions, when executed by the processor, may cause the wearable device to, display, based on identifying the body part facing the first visual object having a shape of a scroll bar, the second visual object having a size larger than the first visual object.

For example, the instructions, when executed by the processor, may cause the wearable device to display the second visual object including buttons to perform scrolling by selecting one of both directions of an axis where the scroll bar is extended.

For example, the instructions, when executed by the processor, may cause the wearable device to display the second visual object including a line along a first direction of the scroll bar and a handle extended along a second direction perpendicular to the first direction.

For example, the instructions, when executed by the processor, may cause the wearable device to move, based on identifying the second posture pinching the handle of the second visual object, the second handle based on moving of the body part, and perform scrolling of information displayed through an area in association with the first visual object.

For example, the instructions, when executed by the processor, may cause the wearable device to move, based on receiving the signal, the handle of the first visual object and perform scrolling of information displayed through an area matched to the first visual object. The instructions, when executed by the processor, may cause the wearable device to display, based on identifying the body part, the second visual object including a deformable handle by the gesture and having a size larger than the first visual object.

For example, the instructions, when executed by the processor, may cause the wearable device to change, based on identifying the body part facing the first visual object having a shape of a two-dimensional button, the first visual object to the second visual object having a shape of a three-dimensional button.

For example, the instructions, when executed by the processor, may cause the wearable device to display the second visual object having a shape protruded, from a virtual plane where the first visual object is positioned, along a direction of the virtual plane.

For example, the instructions, when executed by the processor, may cause the wearable device to display, based on identifying the body part facing the first visual object having a shape of a curved line, the second visual object including a line having a shape of a straight line.

For example, the instructions, when executed by the processor, may cause the wearable device to display the first visual object indicating a toggle of a parameter based on a handle moved by a first distance on a first axis. The instructions, when executed by the processor, may cause the wearable device to display, based on identifying the first posture of the body part facing the first visual object, a second visual object including a handle moved along a second distance longer than the first distance and having a direction of the first axis.

For example, the instructions, when executed by the processor, may cause the wearable device to display the first visual object, among visual objects displayable to a user wearing the wearable device, included in a category to classify one or more visual objects for reacting to the user.

For example, the instructions, when executed by the processor, may cause the wearable device to identify, based on identifying the first posture of the body part facing the first visual object displayed longer than a threshold distance using the camera, a shape of the body part. The instructions, when executed by the processor, may cause the wearable device to, in a state that the shape of the body part corresponds to a first shape, display the second visual object based on a distance that the first distance is displayed. The instructions, when executed by the processor, may cause the wearable device to, in another state that the shape of the body part corresponds to a second shape, display a third visual object to control the function using a distance shorter than or equal to the threshold distance.

As described above, according to an embodiment, a method of a wearable device may include displaying (e.g., operation 1510 of FIG. 15) a first visual object on a display of the wearable device. The method may include controlling (e.g., operation 1530 of FIG. 15) a function of the first visual object based on a signal received from the external electronic device, based on identifying an external electronic device using communication circuitry of the wearable device. The method may include changing (e.g., operation 1550 of FIG. 15) a first visual object into a second visual object having a shape for interacting with the body part, based on identifying a body part facing the first visual object using a camera of the wearable device. The method may include controlling (e.g., operation 1560 of FIG. 15) a function, based on identifying a gesture of the body part related to the second visual object of the display using the camera.

According to an embodiment, a method of a wearable device may be provided. The method may include obtaining an image with respect to external environment using a camera of the wearable device. The method may include displaying a first visual object in a state of displaying at least a portion of the image with respect to the external environment in a display of the wearable device. The method may include, while displaying the first visual object, based on a signal received from an external electronic device connected through communication circuitry of the wearable device, controlling a function of the first visual object according to whether an input to control the first visual object through the external electronic device is received. The method may include, while displaying the first visual object, based on identifying a body part having a first posture facing the first visual object, changing the first visual object to a second visual object corresponding to a shape of the body part. The method may include, based on identifying a second posture of the body part associated with the second visual object of the display using the camera, controlling the function.

For example, the changing may include displaying, based on identifying the body part facing the first visual object having a shape of a scroll bar, the second visual object having a size larger than the first visual object.

For example, the displaying the second visual object may include displaying the second visual object including buttons to perform scrolling by selecting one of both directions of an axis where the scroll bar is extended.

For example, the displaying the second visual object may include displaying the second visual object including a line along a first direction of the scroll bar and a handle extended along a second direction perpendicular to the first direction.

For example, controlling the function based on identifying the gesture may include moving, based on identifying the gesture of pinching the handle of the second visual object, the second handle based on moving of the body part, and performing scrolling of information displayed through an area in association with the first visual object.

For example, the controlling the function of the first visual object may include moving, based on receiving the signal, the handle of the first visual object and performing scrolling of information displayed through an area matched to the first visual object. The controlling the function based on identifying the gesture may include displaying, based on identifying the body part, the second visual object including a deformable handle by the gesture and having a size larger than the first visual object.

For example, the changing may include changing, based on identifying the body part facing the first visual object having a shape of a two-dimensional button, the first visual object to the second visual object having a shape of a three-dimensional button.

For example, the changing may include displaying the second visual object having a shape protruded, from a virtual plane where the first visual object is positioned, along a direction of the virtual plane.

For example, the changing may include displaying, based on identifying the body part facing the first visual object having a shape of a curved line, the second visual object including a line having a shape of a straight line.

For example, the displaying the first object may include displaying the first visual object indicating a toggle of a parameter based on a handle moved by a first distance on a first axis. The changing may include displaying, based on identifying the first posture of the body part facing the first visual object, a second visual object including a handle moved along a second distance longer than the first distance and having a direction of the first axis.

For example, the displaying the first object may include displaying the first visual object, among visual objects displayable to a user wearing the wearable device, included in a category to classify one or more visual objects for reacting to the user.

For example, the changing may include identifying, based on identifying the first posture of the body part facing the first visual object displayed longer than a threshold distance using the camera, a shape of the body part. The changing may include in a state that the shape of the body part corresponds to a first shape, displaying the second visual object based on a distance that the first distance is displayed. The changing may include in another state that the shape of the body part corresponds to a second shape, displaying a third visual object to control the function using a distance shorter than or equal to the threshold distance.

As described above, according to an embodiment, a wearable device (e.g., the wearable device 101 of FIGS. 1 to 2) may include a camera (e.g., the camera 225 of FIG. 2), a display (e.g., the display 220 of FIG. 2), memory (e.g., the memory 215 of FIG. 2), and a processor (e.g., the processor 210 of FIG. 2). The instructions, when executed by the processor, may cause the wearable device to display a first visual object on the display. The instructions, when executed by the processor, may cause the wearable device to change the first visual object to a second visual object different from the first visual object, based on identifying a body part facing the first visual object using the camera. The instructions, when executed by the processor, may cause the wearable device to, based on whether the first visual object is displayed longer than a threshold distance at a time point of identifying the body part facing the first visual object, move the second visual object shorter than or equal to the threshold distance.

For example, the instructions, when executed by the processor, may cause the wearable device to display the second visual object based on a distance less than or equal to the threshold distance, in a state that the first visual object is displayed longer than the threshold distance at the time point. The instructions, when executed by the processor, may cause the wearable device to display the second visual object based on a distance of the first visual object, in another state that the first visual object is displayed less than or equal to the threshold distance at the time point.

For example, the wearable device may further comprise communication circuitry (e.g., the communication circuitry 240 of FIG. 2). The instructions, when executed by the processor, may cause the wearable device to maintain the display of the first visual object independently of the body part, based on identifying an external electronic device (e.g., the external electronic device 180 of FIGS. 1 and 2) using the communication circuitry.

As described above, according to an embodiment, a method of a wearable device may include displaying a first visual object on a display of the wearable device. The method may include, based on identifying a body part facing the first visual object using a camera of the wearable device, changing the first visual object to a second visual object different from the first visual object. The method may include, based on whether the first visual object is displayed longer than a threshold distance at a time point of identifying the body part facing the first visual object, moving the second visual object shorter than or equal to the threshold distance.

For example, the changing may include displaying the second visual object based on a distance less than or equal to the threshold distance, in a state that the first visual object is displayed longer than the threshold distance at the time point. The changing may include displaying the second visual object based on a distance of the first visual object, in another state that the first visual object is displayed by a distance less than or equal to the threshold distance, at the time point.

For example, the method may include maintaining the display of the first visual object independently of the body part, based on identifying an external electronic device using communication circuitry of the wearable device.

The device described above may be implemented as a hardware component, a software component, and/or a combination of a hardware component and a software component. For example, the devices and components described in the embodiments may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include a magnetic medium such as a hard disk, floppy disk, and magnetic tape, optical recording medium such as a CD-ROM and DVD, magneto-optical medium, such as a floptical disk, and those configured to store program instructions, including ROM, RAM, flash memory, and the like. In addition, examples of other media may include recording media or storage media managed by app stores that distribute applications, sites that supply or distribute various software, servers, and the like.

Although the embodiments have been described above with reference to limited examples and drawings, various modifications and variations may be made from the above description by those skilled in the art. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

Therefore, other implementations, other embodiments, and those equivalent to the scope of the claims are in the scope of the claims described later.

No claim element is to be construed under the provisions of 35 U.S.C. § 112, sixth paragraph, unless the element is expressly recited using the phrase "means for" or "means."

What is claimed is:

1. A wearable device comprising:

communication circuitry;

a camera;

a display;

memory, comprising one or more storage mediums, storing instructions; and at least one processor, wherein the instructions, when executed by the at least one processor individually or collectively, cause the wearable device to:

obtain an image with respect to external environment using the camera;

display a first visual object in a state of displaying at least a portion of the image with respect to the external environment in the display;

based on a signal being received from an external electronic device connected through the communication circuitry and based on identifying that an input to control the first visual object is received through the external electronic device, control a function of the first visual object that is displayed; and based on identifying that no input to control the first visual object is received through the external electronic device and based on identifying a body part having a first posture facing the first visual object that is displayed:

change the first visual object to a second visual object corresponding to the first posture of the body part; and based on identifying, using the camera, a second posture of the body part associated with the second visual object, control the function of the first visual object.

2. The wearable device of claim 1, wherein the instructions, when executed by the at least one processor individually or collectively, further cause the wearable device to, based on identifying that the first posture of the body part corresponds to a shape of a scroll bar, display the second visual object having a size larger than a size of the first visual object.

3. The wearable device of claim 2, wherein the instructions, when executed by the at least one processor individually or collectively, further cause the wearable device to display the second visual object comprising at least one button to perform scrolling by selecting one of both directions of an axis where the scroll bar is extended.

4. The wearable device of claim 2, wherein the instructions, when executed by the at least one processor individually or collectively, further cause the wearable device to display the second visual object comprising a line along a first direction of the scroll bar and a handle extended along a second direction perpendicular to the first direction.

5. The wearable device of claim 4, wherein the instructions, when executed by the at least one processor individually or collectively, further cause the wearable device to:

based on identifying the second posture as pinching the handle of the second visual object, move the handle based on moving of the body part, and perform scrolling of information displayed through an area in association with the first visual object.

6. The wearable device of claim 2, wherein the instructions, when executed by the at least one processor individually or collectively, further cause the wearable device to:

based on receiving the signal, move a handle of the first visual object, perform scrolling of information displayed through an area matched to the first visual object, and based on identifying the body part, display the second visual object comprising a deformable handle by a gesture, the second visual object having the size larger than the size of the first visual object.

7. The wearable device of claim 1, wherein the instructions, when executed by the at least one processor individually or collectively, further cause the wearable device to, based on identifying that the first posture of the body part corresponds to a first shape of a two-dimensional button, change the first visual object to the second visual object having a second shape of a three-dimensional button.

8. The wearable device of claim 7, wherein the instructions, when executed by the at least one processor individually or collectively, further cause the wearable device to display the second visual object having a third shape protruded, from a virtual plane where the first visual object is positioned, along a direction of the virtual plane.

9. The wearable device of claim 1, wherein the instructions, when executed by the at least one processor individually or collectively, further cause the wearable device to, based on identifying the body part facing the first visual object having a fourth shape of a curved line, display the second visual object including a line having a fifth shape of a straight line.

10. The wearable device of claim 1, wherein the instructions, when executed by the at least one processor individually or collectively, further cause the wearable device to:

display the first visual object indicating a toggle of a parameter based on a handle moved by a first distance on a first axis; and based on identifying the first posture of the body part facing the first visual object, display the second visual object comprising the handle movable along a second distance longer than the first distance and having a direction of the first axis.

11. The wearable device of claim 1, wherein the instructions, when executed by the at least one processor individually or collectively, further cause the wearable device to display the first visual object, among visual objects displayable to a user wearing the wearable device, in a category to classify one or more visual objects for reacting to the user.

12. The wearable device of claim 1, wherein the instructions, when executed by the at least one processor individually or collectively, further cause the wearable device to:

based on identifying the first posture of the body part facing the first visual object displayed longer than a threshold distance using the camera, identify a shape of the body part;

in a first state that the shape of the body part corresponds to a first shape, display the second visual object based on a first distance that the first visual object is displayed; and in a second state that the shape of the body part corresponds to a second shape, display a third visual object to control the function using a second distance shorter than or equal to the threshold distance.

13. A method of a wearable device, the method comprising:

obtaining, using a camera of the wearable device, an image with respect to external environment;

displaying, by a display of the wearable device, a first visual object in a state of displaying at least a portion of the image with respect to the external environment;

based on a signal being received from an external electronic device connected through communication circuitry of the wearable device and based on identifying that an input to control the first visual object is received through the external electronic device, controlling a function of the first visual object that is displayed; and based on identifying that no input to control the first visual object is received through the external electronic device and based on identifying a body part having a first posture facing the first visual object that is displayed: changing the first visual object to a second visual object corresponding to the first posture of the body part; and based on identifying, using the camera, a second posture of the body part associated with the second visual object, controlling the function of the first visual object.

14. The method of claim 13, wherein the changing the first visual object to the second visual object comprises, based on identifying that the first posture of the body part corresponds to a shape of a scroll bar, displaying the second visual object having a size larger than a size of the first visual object.

15. The method of claim 14, wherein the displaying the second visual object comprises displaying the second visual object comprising buttons to perform scrolling by selecting one of both directions of an axis where the scroll bar is extended.

16. The method of claim 14, wherein the displaying the second visual object comprises displaying the second visual object comprising a line along a first direction of the scroll bar and a handle extended along a second direction perpendicular to the first direction.

17. The method of claim 16, further comprising:

based on identifying the second posture pinching the handle of the second visual object, moving the handle based on moving of the body part, and performing scrolling of information displayed through an area in association with the first visual object.

18. The method of claim 14, further comprising:

based on receiving the signal, moving a handle of the first visual object and performing scrolling of information displayed through an area matched to the first visual object, and based on identifying the body part, displaying the second visual object comprising a deformable handle by a gesture, the second visual object having the size larger than the size of the first visual object.

19. The method of claim 13, wherein the changing the first visual object to the second visual object comprises, based on identifying that the first posture of the body part corresponds to a first shape of a two-dimensional button, changing the first visual object to the second visual object having a second shape of a three-dimensional button.

20. The method of claim 19, wherein the displaying the second visual object comprises displaying the second visual object having a shape protruded, from a virtual plane where the first visual object is positioned, along a direction of the virtual plane.

* * * * *